US009818105B2

(12) United States Patent
Jung et al.

(10) Patent No.: US 9,818,105 B2
(45) Date of Patent: Nov. 14, 2017

(54) GUARANTY PROVISIONING VIA WIRELESS SERVICE PURVEYANCE

(71) Applicant: Elwha LLC, Bellevue, WA (US)

(72) Inventors: Edward K. Y. Jung, Bellevue, WA (US); Richard T. Lord, Gig Harbor, WA (US); Robert W. Lord, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 475 days.

(21) Appl. No.: 14/145,811

(22) Filed: Dec. 31, 2013

(65) Prior Publication Data

US 2015/0120550 A1 Apr. 30, 2015

Related U.S. Application Data

(63) Continuation-in-part of application No. 14/098,232, filed on Dec. 5, 2013, which is a continuation-in-part of application No. 14/095,489, filed on Dec. 3, 2013, which is a continuation-in-part of application No. 14/074,490, filed on Nov. 7, 2013, which is a continuation-in-part of application No. 14/066,580, filed on Oct. 29, 2013.

(51) Int. Cl.
*G06Q 30/06* (2012.01)
*G06Q 20/32* (2012.01)

(52) U.S. Cl.
CPC ..... *G06Q 20/3224* (2013.01); *G06Q 30/0637* (2013.01)

(58) Field of Classification Search
CPC .............................. G06Q 30/06; G06Q 30/08

USPC ................................................ 705/26.1–27.2
See application file for complete search history.

(56) References Cited

U.S. PATENT DOCUMENTS

| 6,405,177 | B1 | 6/2002 | DiMattina |
| 7,415,435 | B1 * | 8/2008 | Weiss .................... G06Q 30/06 705/35 |
| 7,698,227 | B1 | 4/2010 | Hamilton |
| 7,725,331 | B2 | 5/2010 | Schurenberg et al. |
| 7,747,535 | B2 | 6/2010 | Mikan et al. |
| 7,801,808 | B1 | 9/2010 | Mattison et al. |
| 7,917,437 | B1 | 3/2011 | Glasberg |
| 8,166,068 | B2 | 4/2012 | Stevens |
| 8,290,513 | B2 | 10/2012 | Forstall et al. |

(Continued)

FOREIGN PATENT DOCUMENTS

| JP | 2004-341597 | 12/2004 |
| KR | 2012/0010869 | 2/2012 |
| WO | WO 2013/124290 | 8/2013 |

OTHER PUBLICATIONS

PCT International Search Report; International App. No. PCT/US2014/062648; dated Jan. 27, 2015; pp. 1-4.

(Continued)

*Primary Examiner* — Ethan D Civan
*Assistant Examiner* — Ming Shui

(57) ABSTRACT

Disclosed herein are example embodiments for guaranty provisioning via wireless service purveyance. For certain example embodiments, at least one device, such as a server device of a wireless service provider: (i) may detect at least one proffered guaranty transaction that is associated with at least one product transaction; or (ii) may proffer at least one guaranty based at least partially on at least one wireless service data stream.

43 Claims, 37 Drawing Sheets

(56) References Cited

U.S. PATENT DOCUMENTS

| | | |
|---|---|---|
| 8,428,964 B2 | 4/2013 | Picken |
| 8,473,382 B2 | 6/2013 | Jung et al. |
| 8,554,670 B1 | 10/2013 | Blank et al. |
| 8,660,943 B1 | 2/2014 | Chirehdast |
| 8,706,648 B2 | 4/2014 | Bhola et al. |
| 9,119,027 B2 | 8/2015 | Sharon et al. |
| 9,167,304 B2 | 10/2015 | McDevitt |
| 9,300,676 B2 | 3/2016 | Madhu et al. |
| 2001/0049636 A1 | 12/2001 | Hudda et al. |
| 2002/0178112 A1 | 11/2002 | Goeller et al. |
| 2003/0023541 A1 | 1/2003 | Black et al. |
| 2003/0036993 A1 | 2/2003 | Parthasarathy |
| 2003/0065805 A1 | 4/2003 | Barnes, Jr. |
| 2003/0187796 A1 | 10/2003 | Swift et al. |
| 2004/0024692 A1 | 2/2004 | Turbeville et al. |
| 2004/0073519 A1 | 4/2004 | Fast |
| 2004/0215560 A1 | 10/2004 | Amalraj et al. |
| 2005/0149438 A1 | 7/2005 | Williams |
| 2005/0192884 A1 | 9/2005 | Raines |
| 2005/0246252 A1 | 11/2005 | Wallace et al. |
| 2005/0279827 A1* | 12/2005 | Mascavage ............ G06Q 20/02 235/380 |
| 2007/0067373 A1 | 3/2007 | Higgins et al. |
| 2007/0087756 A1 | 4/2007 | Hoffberg |
| 2007/0174164 A1 | 7/2007 | Biffle et al. |
| 2007/0174208 A1 | 7/2007 | Black et al. |
| 2007/0220575 A1 | 9/2007 | Cooper et al. |
| 2007/0266421 A1 | 11/2007 | Vaidya et al. |
| 2008/0052224 A1 | 2/2008 | Parker |
| 2008/0052235 A1 | 2/2008 | Mascavage et al. |
| 2008/0071664 A1 | 3/2008 | Silverman et al. |
| 2008/0109296 A1 | 5/2008 | Leach et al. |
| 2008/0133391 A1 | 6/2008 | Kurian et al. |
| 2008/0133402 A1 | 6/2008 | Kurian et al. |
| 2008/0154625 A1 | 6/2008 | Serbanescu |
| 2008/0162346 A1 | 7/2008 | Aaron et al. |
| 2008/0215481 A1 | 9/2008 | Schnall |
| 2008/0221947 A1 | 9/2008 | Megdal et al. |
| 2008/0222038 A1 | 9/2008 | Eden et al. |
| 2008/0262956 A1 | 10/2008 | De La Motte |
| 2008/0281726 A1 | 11/2008 | Gupta |
| 2008/0288299 A1 | 11/2008 | Schultz |
| 2009/0012898 A1* | 1/2009 | Sharma ................. G06Q 20/24 705/44 |
| 2009/0030832 A1 | 1/2009 | Chien |
| 2009/0117883 A1 | 5/2009 | Coffing et al. |
| 2009/0228307 A1 | 9/2009 | Sorbe |
| 2009/0271287 A1 | 10/2009 | Halpern |
| 2009/0271342 A1 | 10/2009 | Eder |
| 2009/0289106 A1 | 11/2009 | Bishop et al. |
| 2009/0307778 A1 | 12/2009 | Mardikar |
| 2010/0005021 A1 | 1/2010 | Ezekiel et al. |
| 2010/0042534 A1 | 2/2010 | Moran |
| 2010/0228651 A1 | 9/2010 | Becerra et al. |
| 2010/0250424 A1 | 9/2010 | Torres |
| 2010/0276484 A1 | 11/2010 | Banerjee et al. |
| 2010/0287103 A1 | 11/2010 | Mason |
| 2010/0289659 A1 | 11/2010 | Verbil |
| 2010/0323715 A1* | 12/2010 | Winters ................ G01S 5/0027 455/456.1 |
| 2011/0035318 A1 | 2/2011 | Hargrove et al. |
| 2011/0040691 A1 | 2/2011 | Martinez et al. |
| 2011/0072497 A1 | 3/2011 | Vishik et al. |
| 2011/0112957 A1 | 5/2011 | Ingram et al. |
| 2011/0162038 A1 | 6/2011 | Chunilal |
| 2011/0191150 A1 | 8/2011 | Blackhurst et al. |
| 2011/0191160 A1 | 8/2011 | Blackhurst et al. |
| 2011/0191162 A1 | 8/2011 | Blackhurst et al. |
| 2011/0208822 A1 | 8/2011 | Rathod |
| 2011/0246306 A1 | 10/2011 | Blackhurst et al. |
| 2011/0251922 A1 | 10/2011 | Cavagnaro |
| 2011/0258118 A1 | 10/2011 | Ciurea |
| 2011/0276396 A1 | 11/2011 | Rathod |
| 2011/0320341 A1 | 12/2011 | Kremen |
| 2011/0320342 A1 | 12/2011 | Kremen |
| 2012/0011056 A1 | 1/2012 | Ward et al. |
| 2012/0022944 A1 | 1/2012 | Volpi |
| 2012/0029990 A1 | 2/2012 | Fisher |
| 2012/0030109 A1 | 2/2012 | Dooley Maley et al. |
| 2012/0030110 A1 | 2/2012 | Prakash et al. |
| 2012/0066128 A1 | 3/2012 | Mumm et al. |
| 2012/0072311 A1 | 3/2012 | Khan |
| 2012/0078727 A1 | 3/2012 | Lee |
| 2012/0084131 A1 | 4/2012 | Bergel et al. |
| 2012/0084349 A1 | 4/2012 | Lee et al. |
| 2012/0157062 A1 | 6/2012 | Kim et al. |
| 2012/0159647 A1 | 6/2012 | Sanin et al. |
| 2012/0166261 A1 | 6/2012 | Velusamy et al. |
| 2012/0191594 A1 | 7/2012 | Welch et al. |
| 2012/0215681 A1 | 8/2012 | Jenkins et al. |
| 2012/0215717 A1 | 8/2012 | Arnott et al. |
| 2012/0221357 A1 | 8/2012 | Krause et al. |
| 2012/0233009 A1 | 9/2012 | Fougner et al. |
| 2012/0245971 A1 | 9/2012 | Reichman et al. |
| 2012/0253913 A1 | 10/2012 | Richard |
| 2012/0259776 A1 | 10/2012 | Bajaj et al. |
| 2012/0270560 A1 | 10/2012 | Moshir et al. |
| 2012/0271692 A1 | 10/2012 | Huang et al. |
| 2012/0271946 A1 | 10/2012 | Choti et al. |
| 2012/0290329 A1 | 11/2012 | Ross |
| 2012/0290389 A1 | 11/2012 | Greenough et al. |
| 2012/0295580 A1 | 11/2012 | Corner |
| 2012/0302256 A1 | 11/2012 | Pai et al. |
| 2012/0303425 A1 | 11/2012 | Katzin et al. |
| 2012/0310836 A1 | 12/2012 | Eden et al. |
| 2013/0006844 A1 | 1/2013 | Kremen |
| 2013/0006845 A1 | 1/2013 | Kremen |
| 2013/0031162 A1 | 1/2013 | Willis et al. |
| 2013/0036001 A1 | 2/2013 | Wegner et al. |
| 2013/0046561 A1 | 2/2013 | Sorbe |
| 2013/0046692 A1 | 2/2013 | Grigg et al. |
| 2013/0054447 A1 | 2/2013 | Ross et al. |
| 2013/0073387 A1 | 3/2013 | Heath |
| 2013/0085877 A1 | 4/2013 | Ruhrig |
| 2013/0091058 A1 | 4/2013 | Huster |
| 2013/0103577 A1 | 4/2013 | Lawson et al. |
| 2013/0110597 A1 | 5/2013 | Blair et al. |
| 2013/0110598 A1 | 5/2013 | Blair et al. |
| 2013/0117832 A1 | 5/2013 | Gandhi et al. |
| 2013/0144785 A1 | 6/2013 | Karpenko et al. |
| 2013/0151415 A1 | 6/2013 | Ruckart |
| 2013/0185189 A1 | 7/2013 | Stewart |
| 2013/0185206 A1 | 7/2013 | Leggett et al. |
| 2013/0218753 A1 | 8/2013 | Oikonomidis |
| 2013/0226687 A1 | 8/2013 | Perry et al. |
| 2013/0226798 A1 | 8/2013 | Orttung et al. |
| 2013/0239185 A1 | 9/2013 | Orttung et al. |
| 2013/0239217 A1 | 9/2013 | Kindler et al. |
| 2013/0282546 A1 | 10/2013 | Kadiwar |
| 2013/0297493 A1 | 11/2013 | Linden et al. |
| 2014/0040086 A1 | 2/2014 | Abbatiello et al. |
| 2014/0067650 A1 | 3/2014 | Gardiner et al. |
| 2014/0067656 A1* | 3/2014 | Cohen Ganor ........ G06Q 50/01 705/39 |
| 2014/0081729 A1 | 3/2014 | Ocher |
| 2014/0081750 A1 | 3/2014 | Hosp |
| 2014/0122225 A1 | 5/2014 | Vasthimal et al. |
| 2014/0164058 A1 | 6/2014 | Hammock et al. |
| 2014/0172679 A1 | 6/2014 | Shimko |
| 2014/0201100 A1 | 7/2014 | Rellas et al. |
| 2014/0214819 A1 | 7/2014 | Aitchison |
| 2014/0229376 A1 | 8/2014 | Kaminsky et al. |
| 2014/0274122 A1 | 9/2014 | Tseng et al. |
| 2014/0279543 A1 | 9/2014 | Ruhrig |
| 2015/0120530 A1 | 4/2015 | Jung et al. |
| 2015/0278773 A1 | 10/2015 | Rolf et al. |

OTHER PUBLICATIONS

PCT International Search Report; International App. No. PCT/US2014/062639; dated Feb. 5, 2015; pp. 1-4.

Fodor's Travel Forums; "Do you notify your credit card company when you travel?"; bearing a date of Sep. 22-24, 2006; created on

(56) References Cited

OTHER PUBLICATIONS

Oct. 26, 2016; 5 pages; located at: http://www.fodors.com/community/profile/sweetsailing.
Google; "Google Wallet training video"; bearing a date of Sep. 21, 2011; created on Oct. 26, 2016; 4 pages; located at: https://www.youtube.com/watch?v=hLbmy4XQsMo.
Extended European Search Report; European App. No. EP 14 85 9208; dated Mar. 17, 2017 (received by our Agent on Mar. 24, 2017) pp. 1-7.

\* cited by examiner

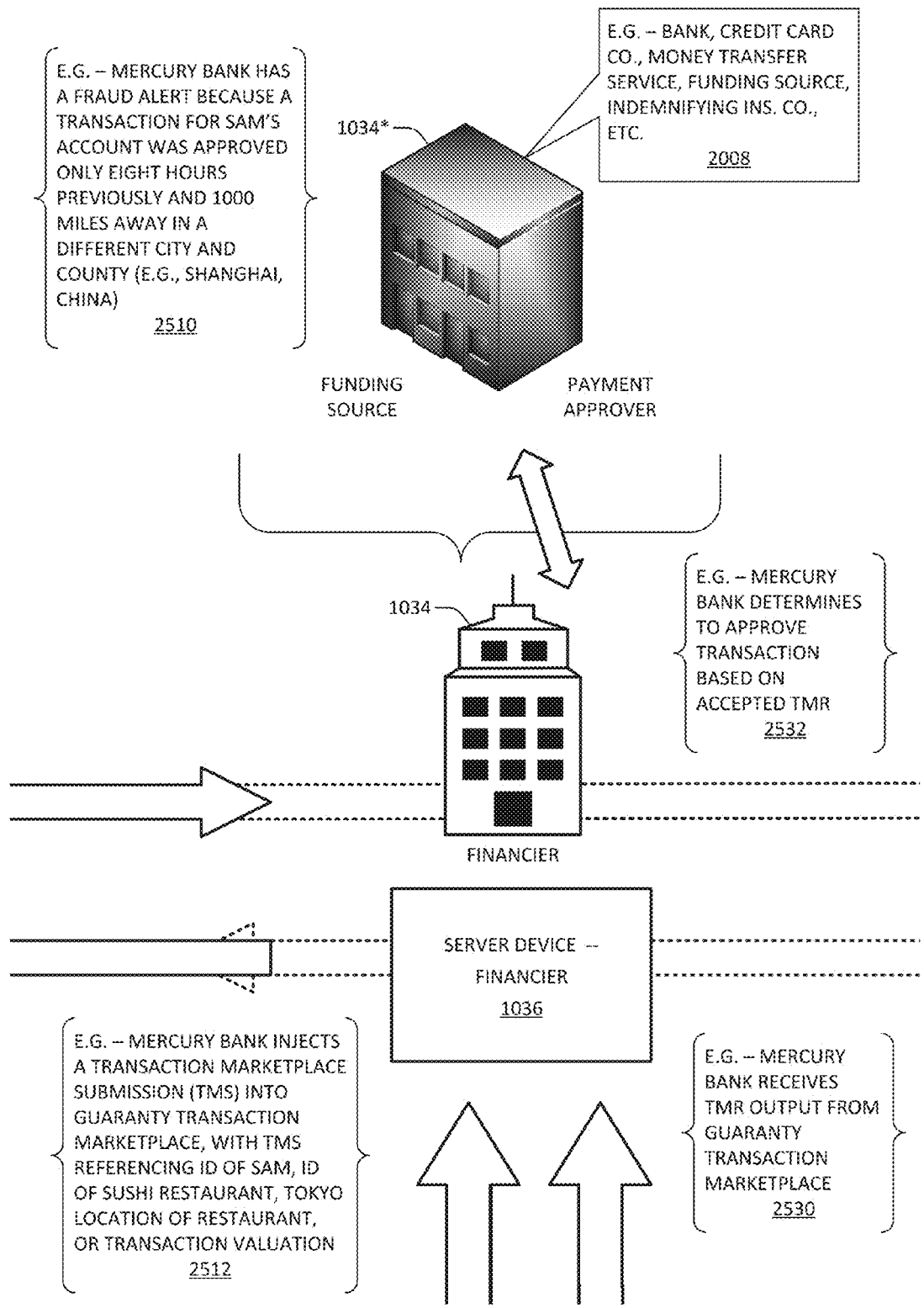

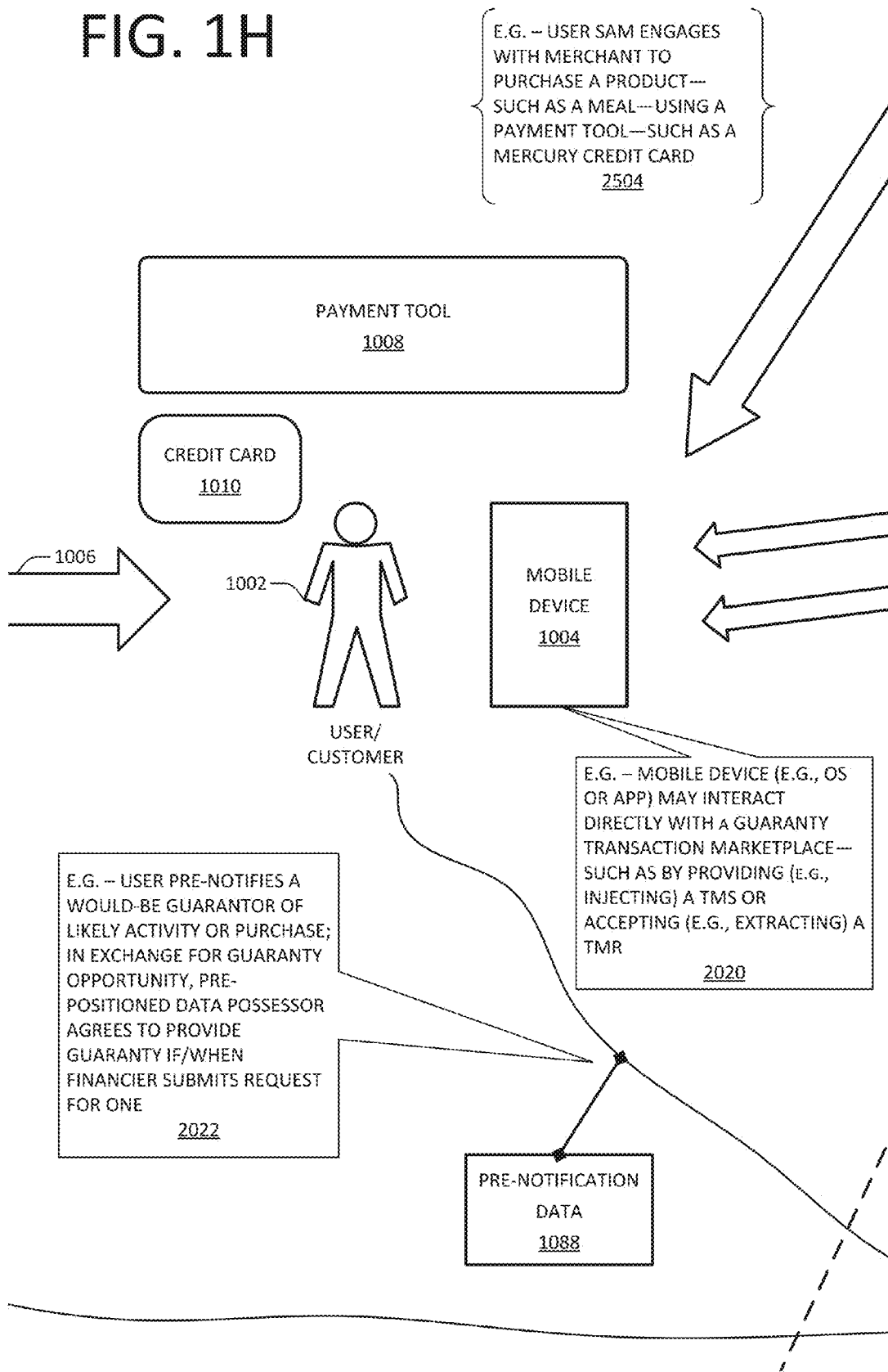

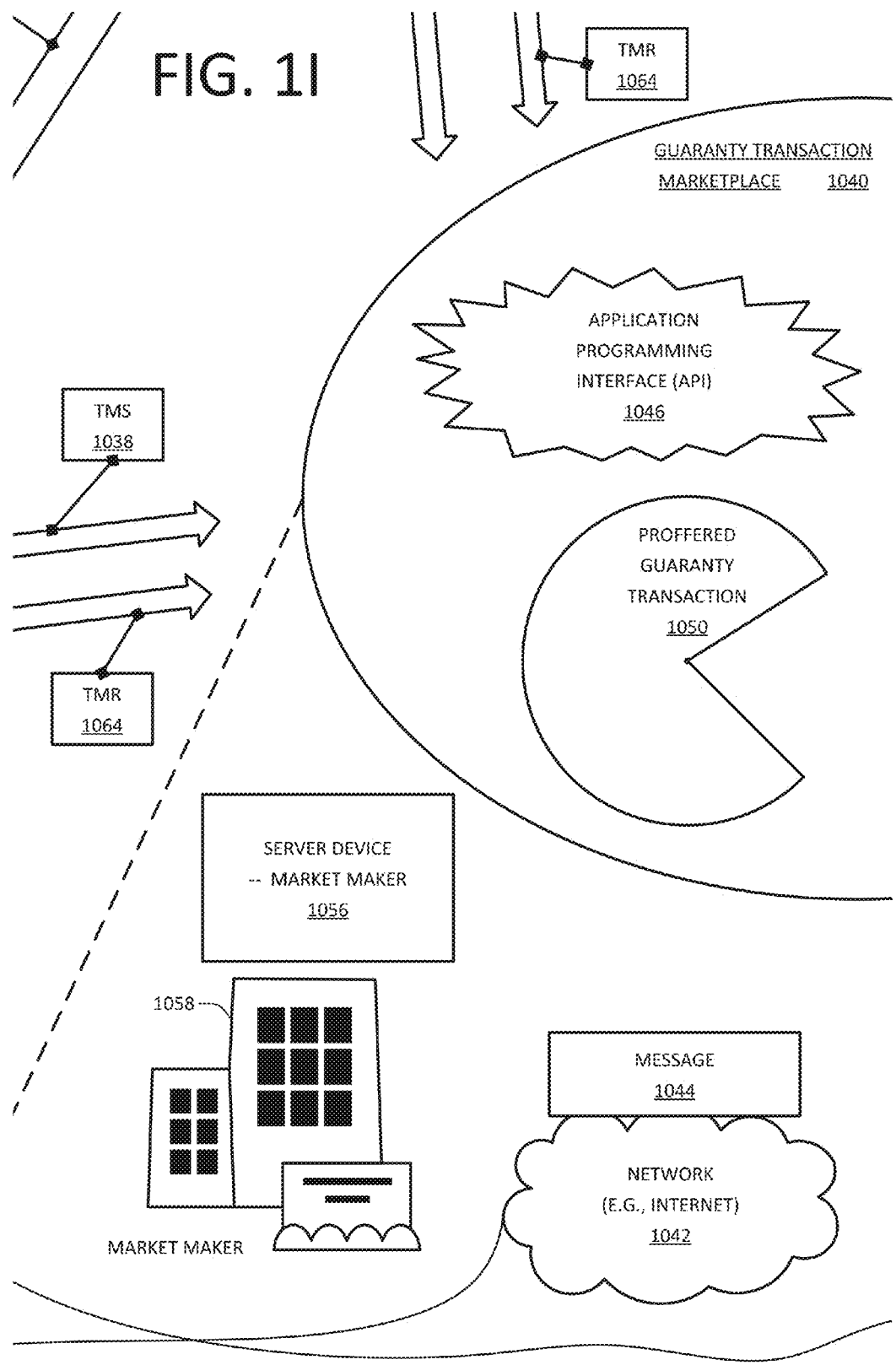

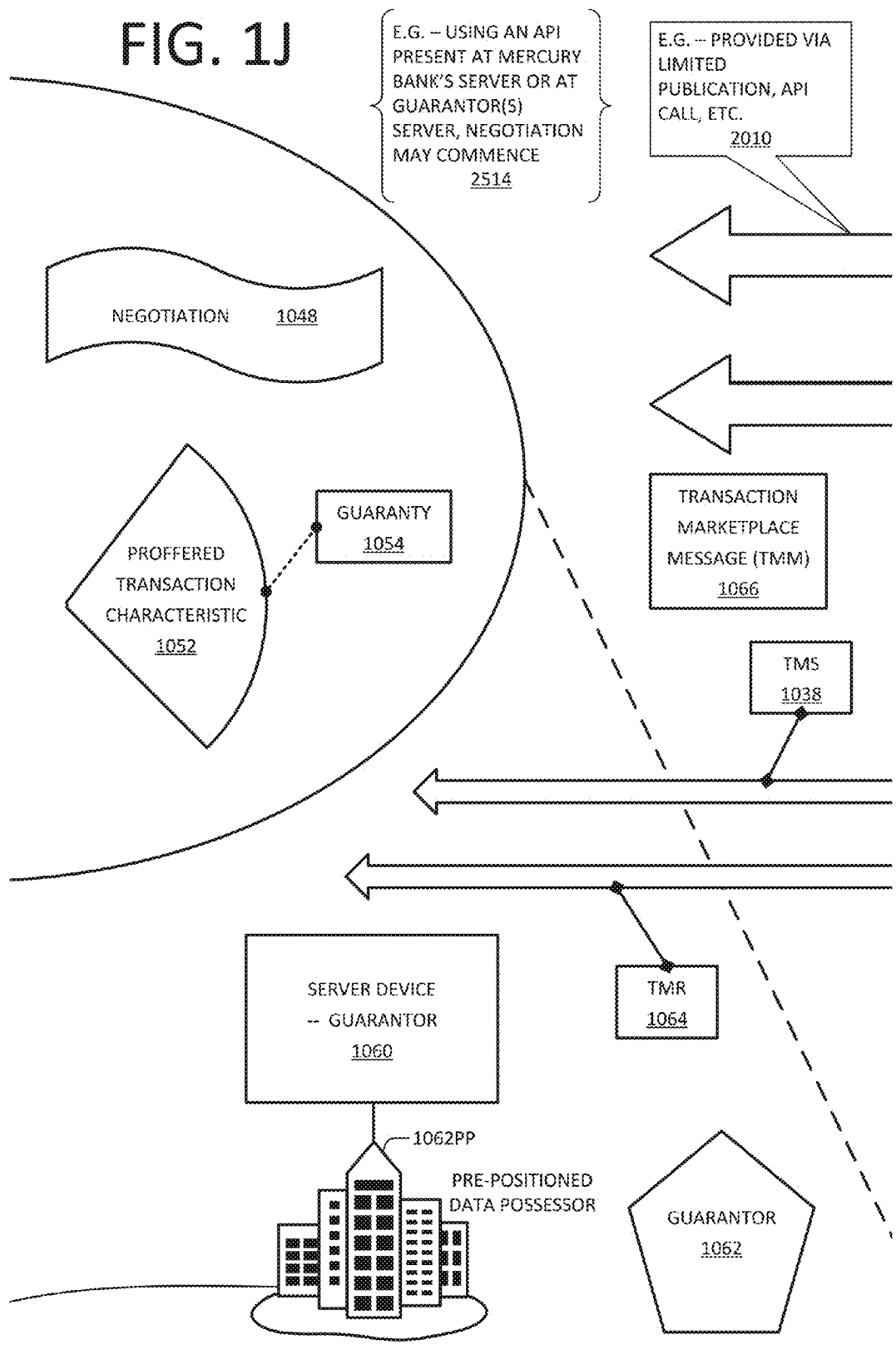

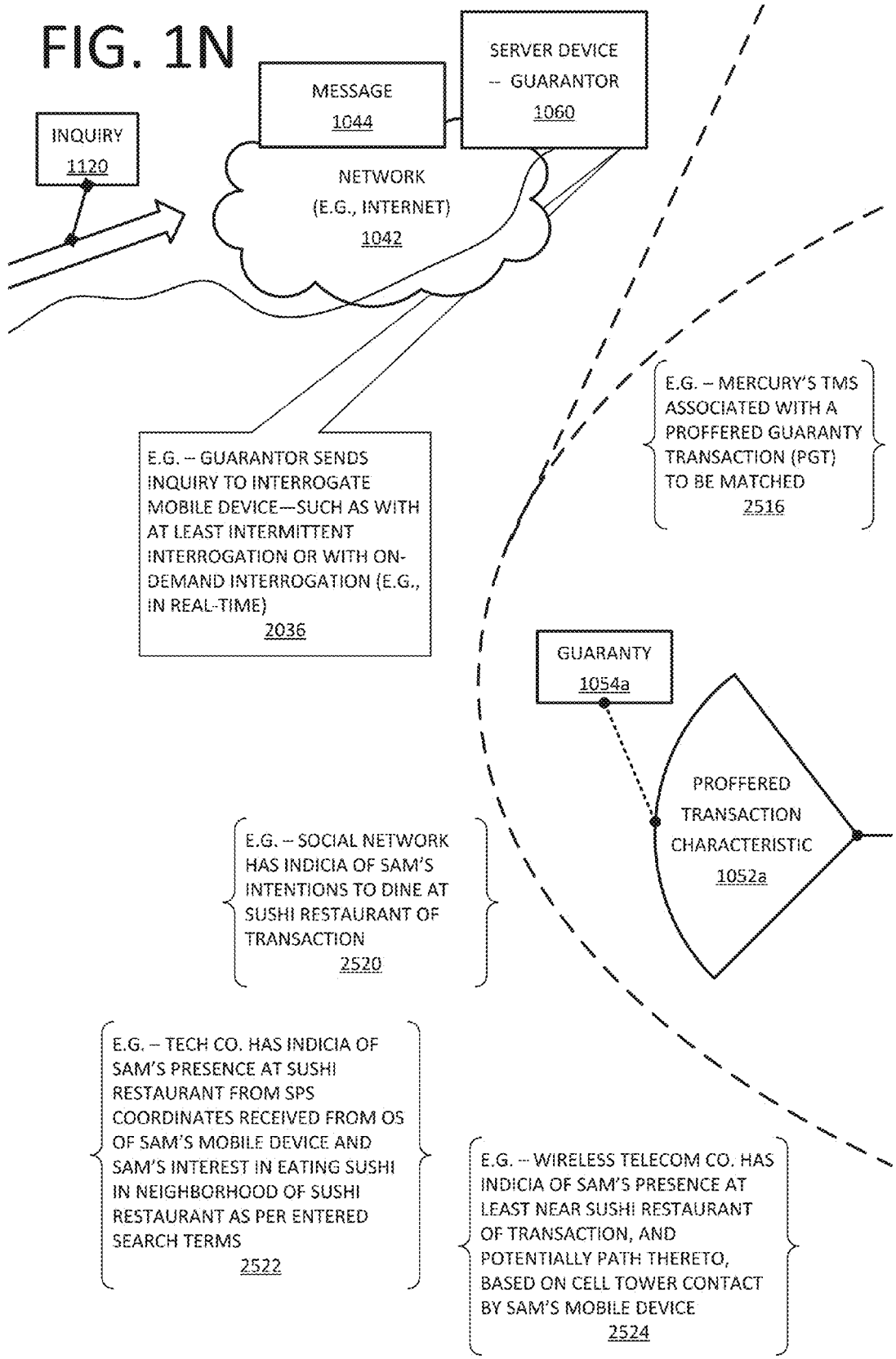

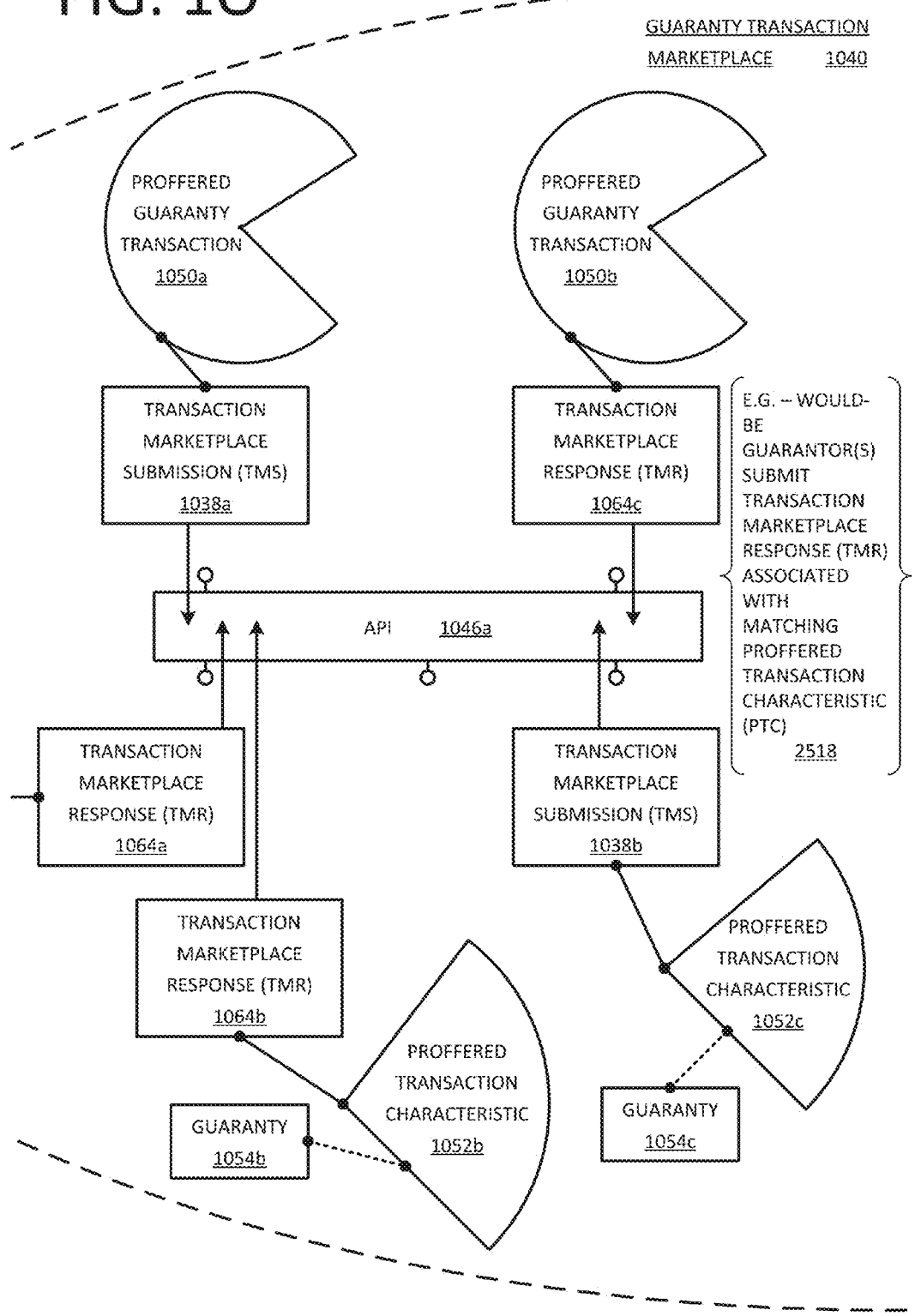

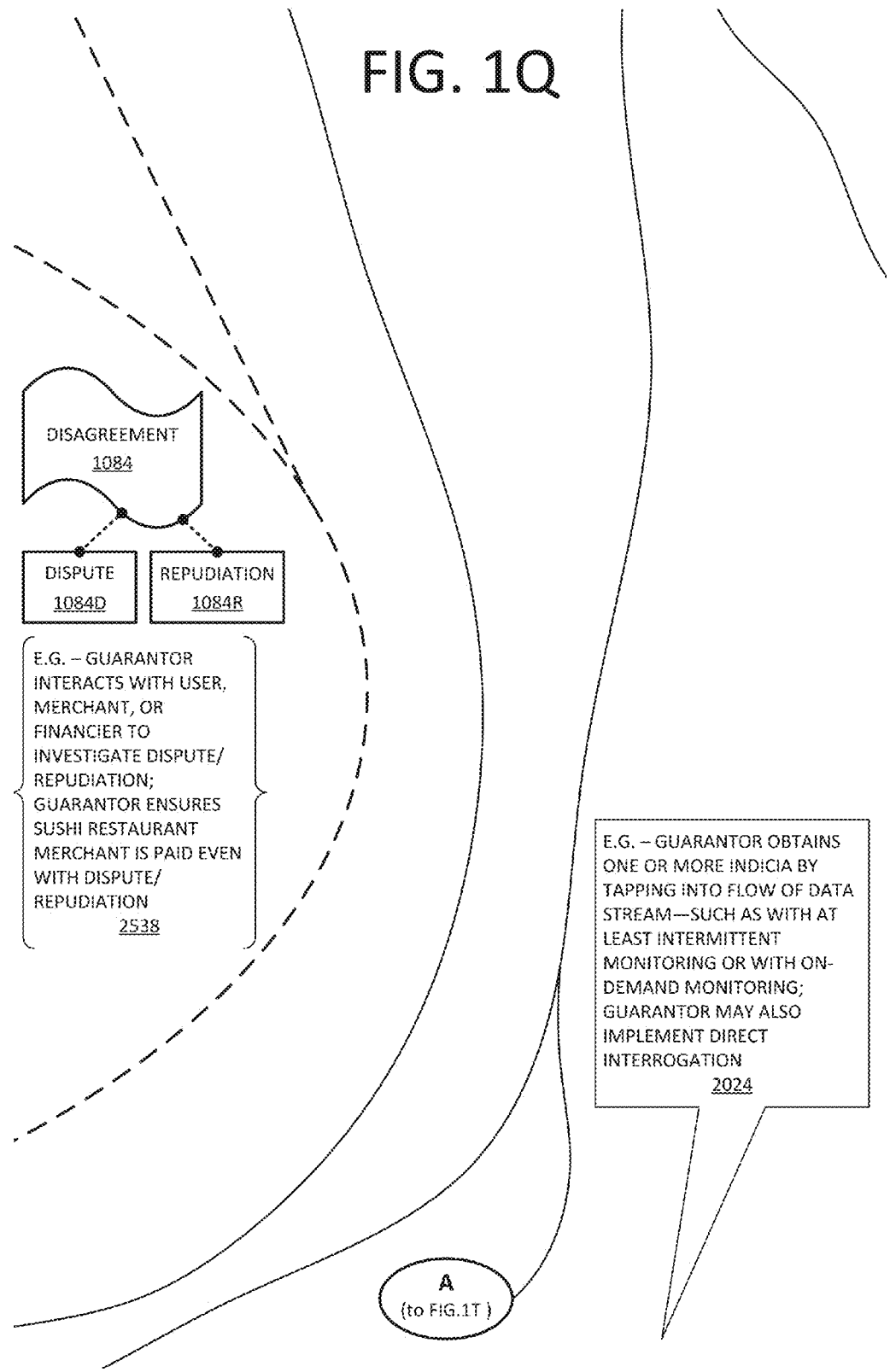

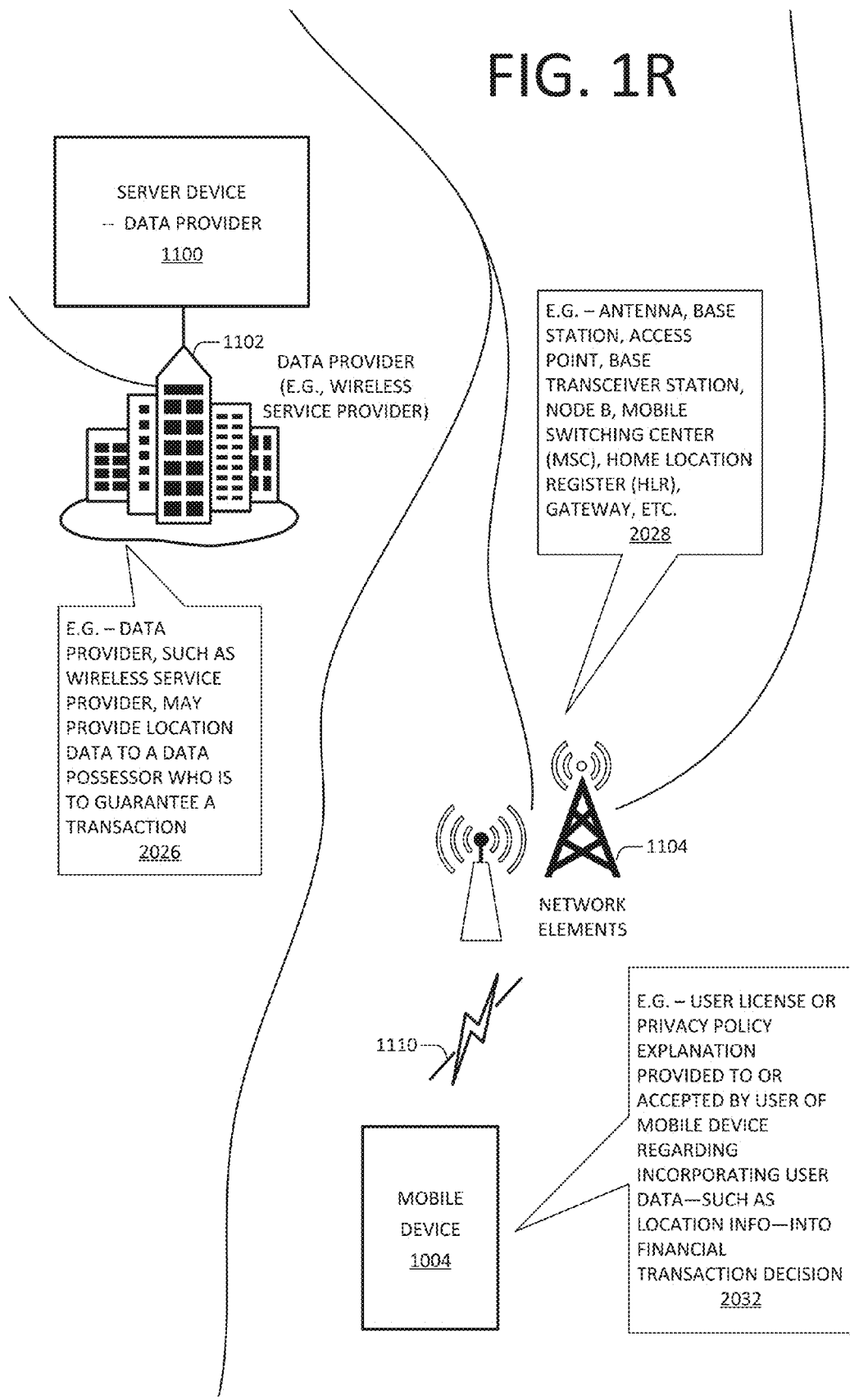

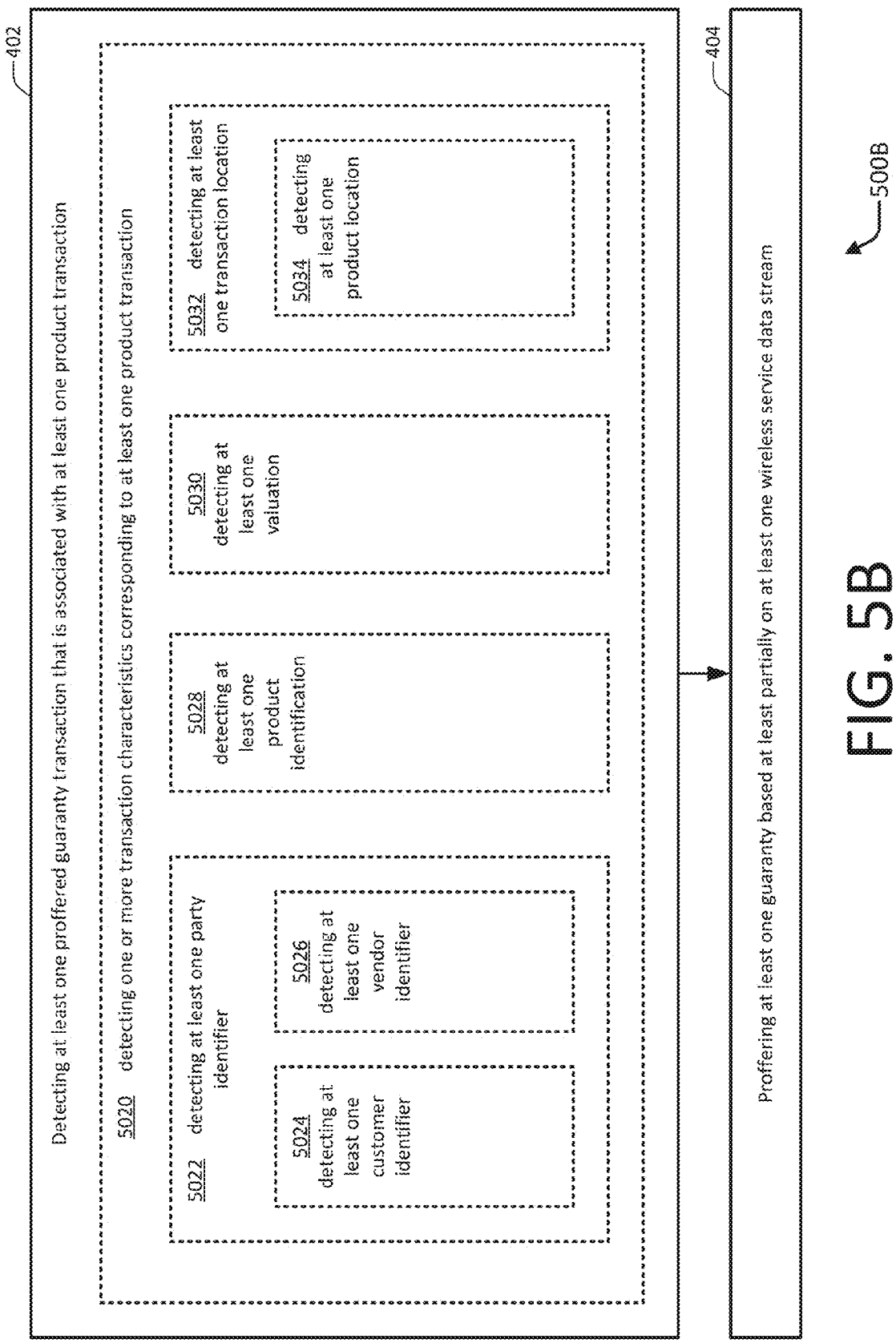

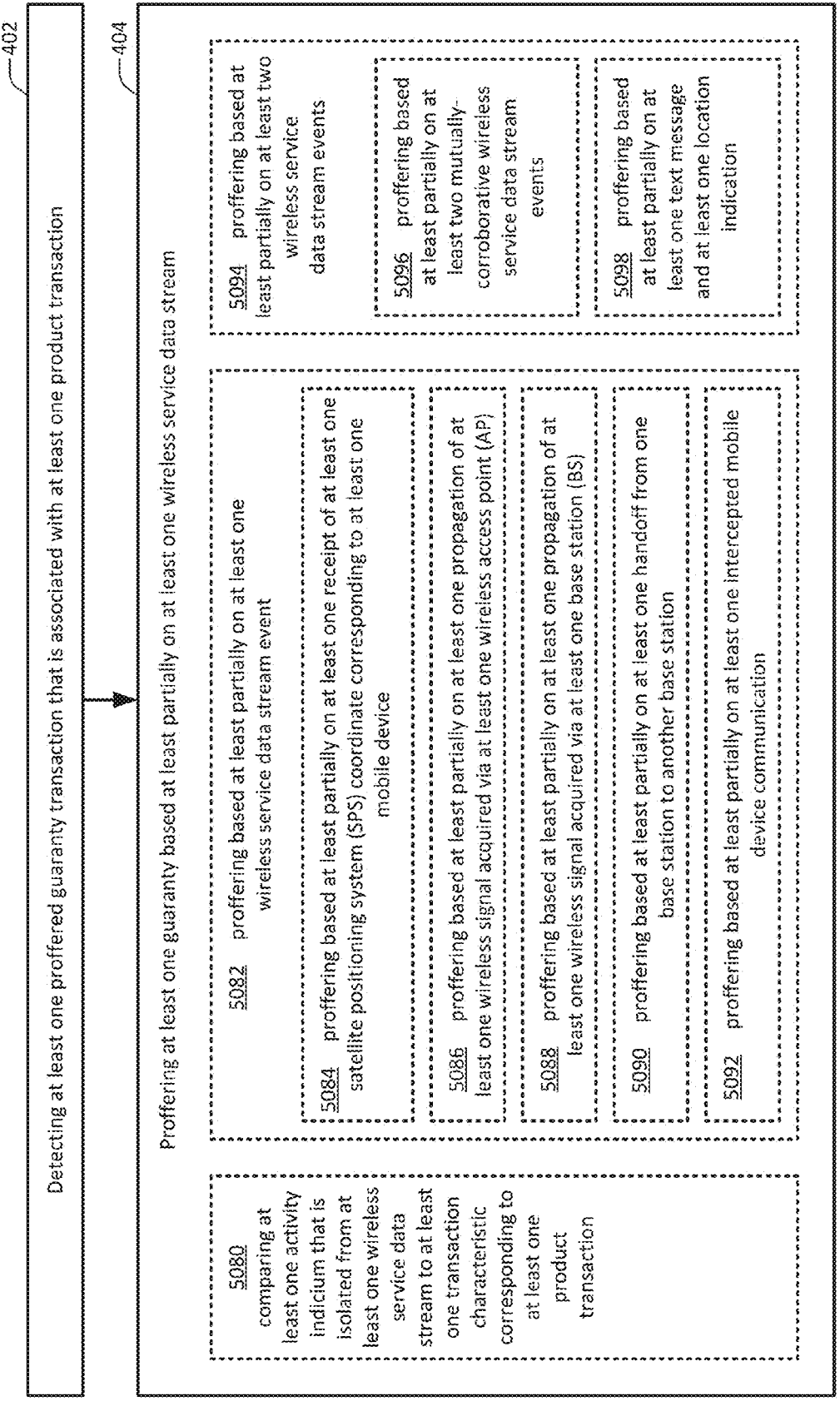

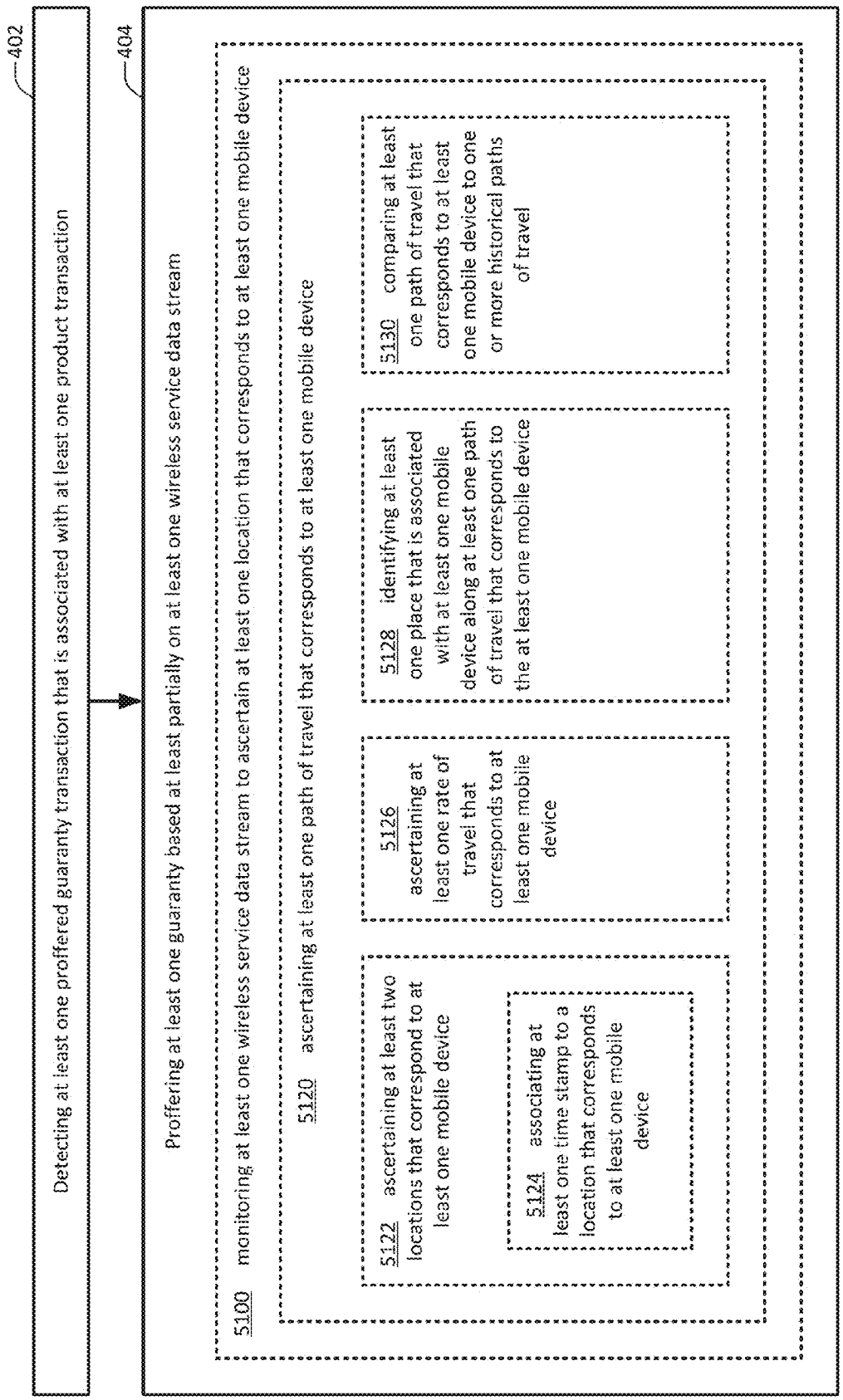

GUARANTY PROVISIONING VIA WIRELESS SERVICE PURVEYANCE

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 14/066,580, entitled "Facilitating Guaranty Provisioning for an Exchange", naming Edward K. Y. Jung, Richard T. Lord, and Robert W. Lord as inventors, filed 29 Oct. 2013, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 14/074,490, entitled "Vendor-Facilitated Guaranty Provisioning", naming Edward K. Y. Jung, Richard T. Lord, and Robert W. Lord as inventors, filed 7 Nov. 2013, which is currently co-pending or is an application of which a currently co-pending application is entitled to the benefit of the filing date.

(3) For purposes of the USPTO extra-statutory requirements, the present application constitutes a continuation-in-part of U.S. patent application Ser. No. 14/095,489, entitled "Guaranty Provisioning via Social Networking", naming Edward K. Y. Jung, Richard T. Lord, and Robert W. Lord as inventors, filed 3 Dec. 2013, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 14/098,232, entitled "Guaranty Provisioning via Internetworking", naming Edward K. Y. Jung, Richard T. Lord, and Robert W. Lord as inventors, filed 5 Dec. 2013, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BRIEF DESCRIPTION OF THE FIGURES

In accordance with 37 C.F.R. 1.84(h)(2)

Figures 1, 1A:
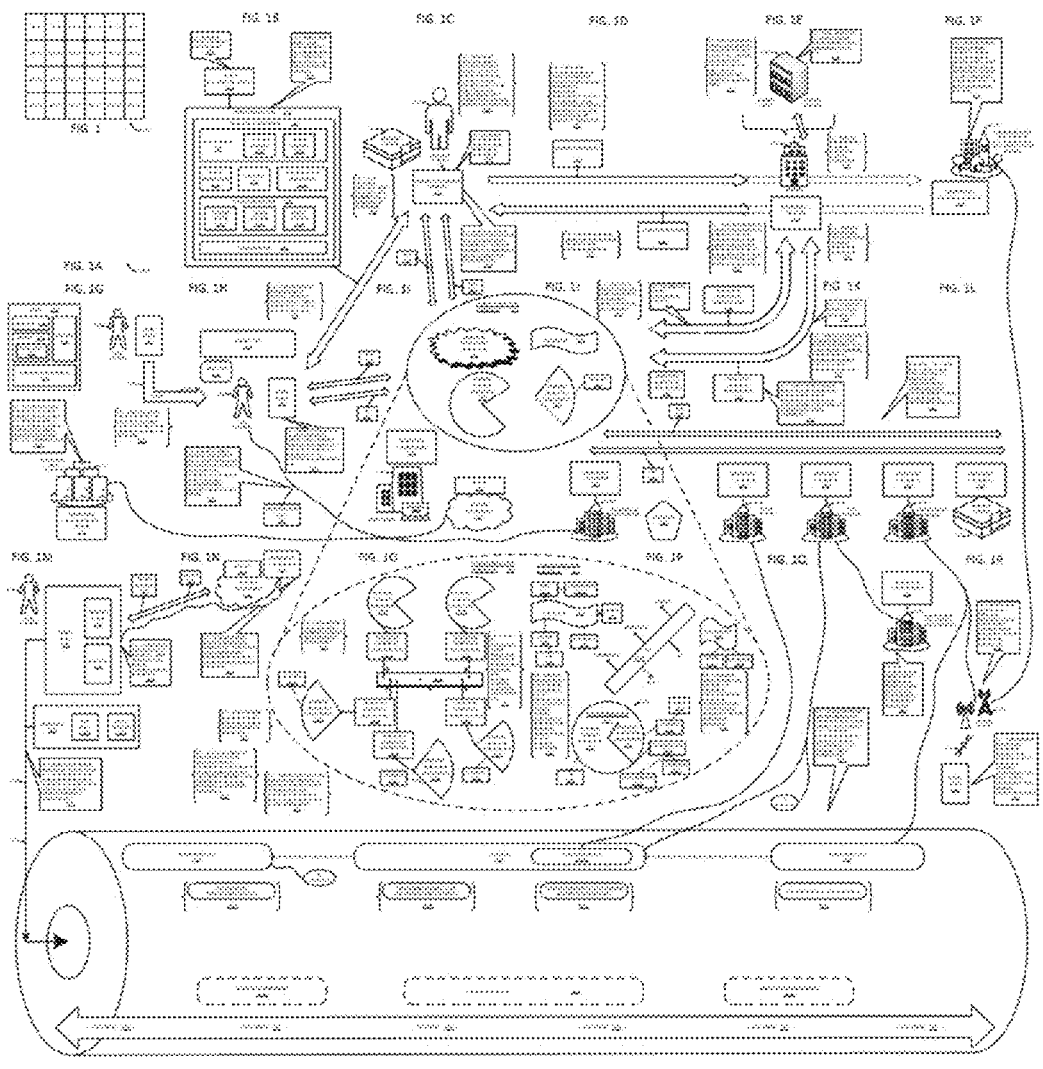
FIG. 1 shows "a view of a large machine or device in its entirety . . . broken into partial views . . . extended over several sheets" labeled FIG. 1A through FIG. 1X (Sheets 1-24). The "views on two or more sheets form, in effect, a single complete view, [and] the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 C.F.R. 1.84(h)(2), and (ii) the partial-view
FIGS. 1A to 1X are ordered alphabetically, by increasing column from left to right, as shown in the following table.
Figure 1B:
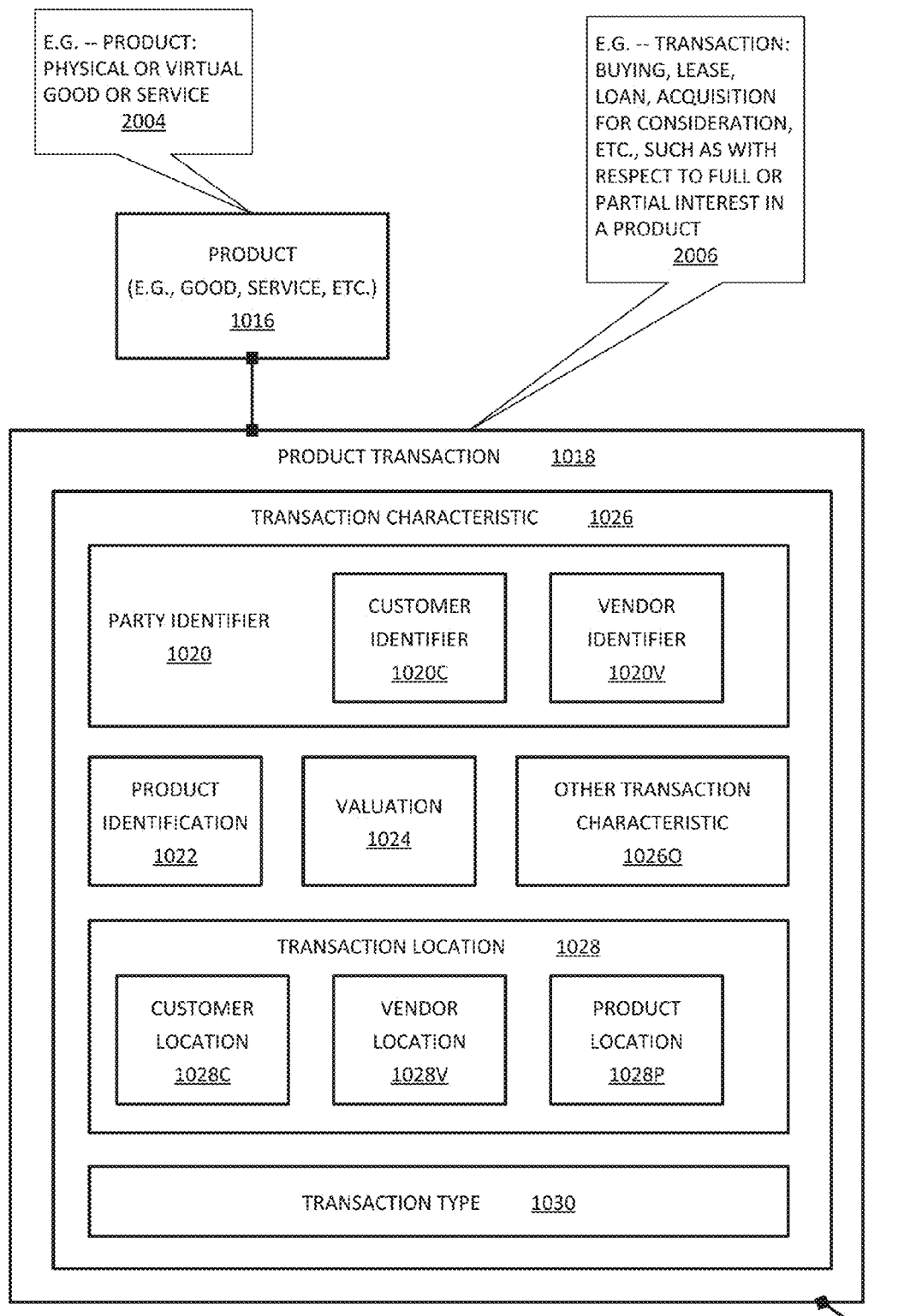
Figure 1C:
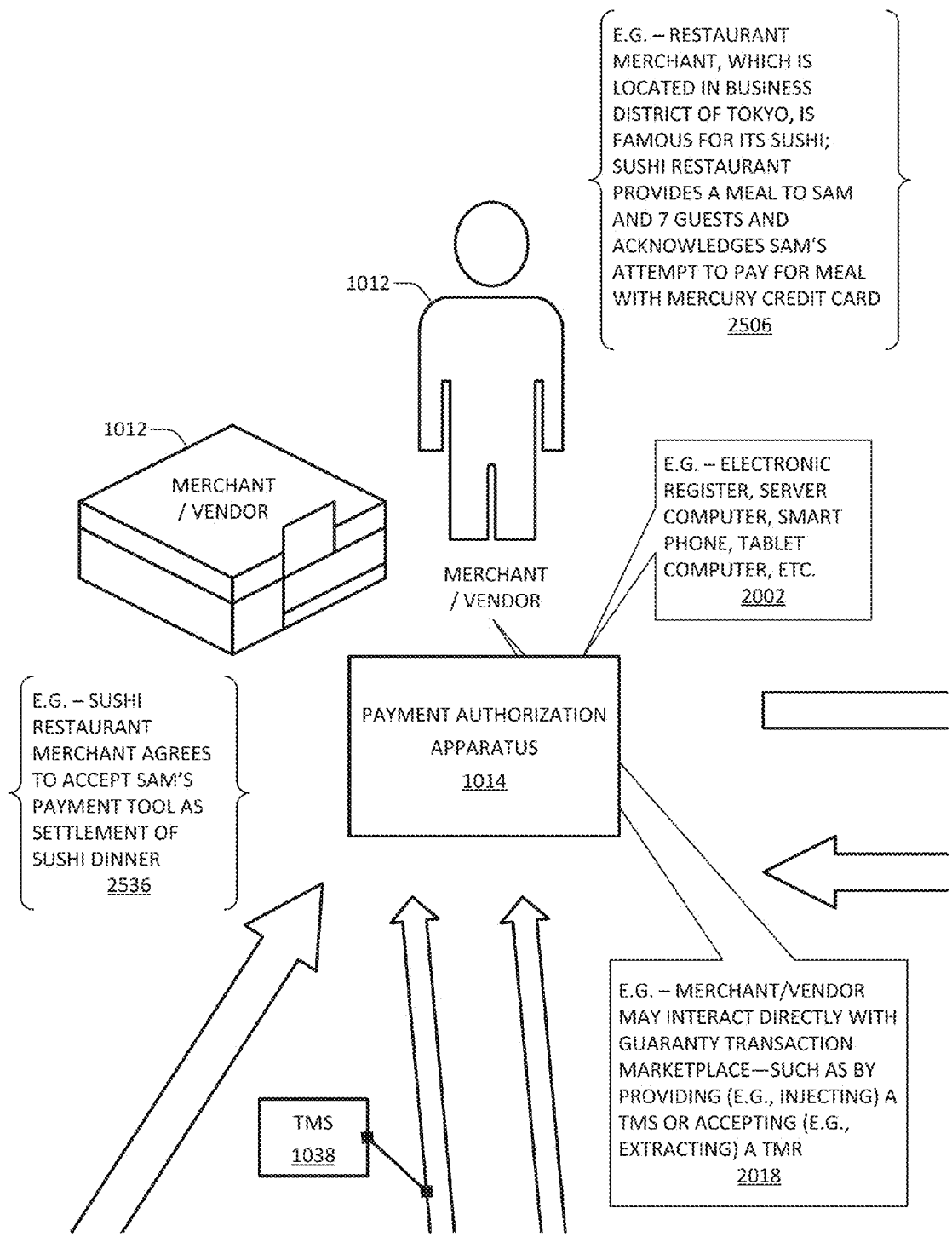
Figure 1D:
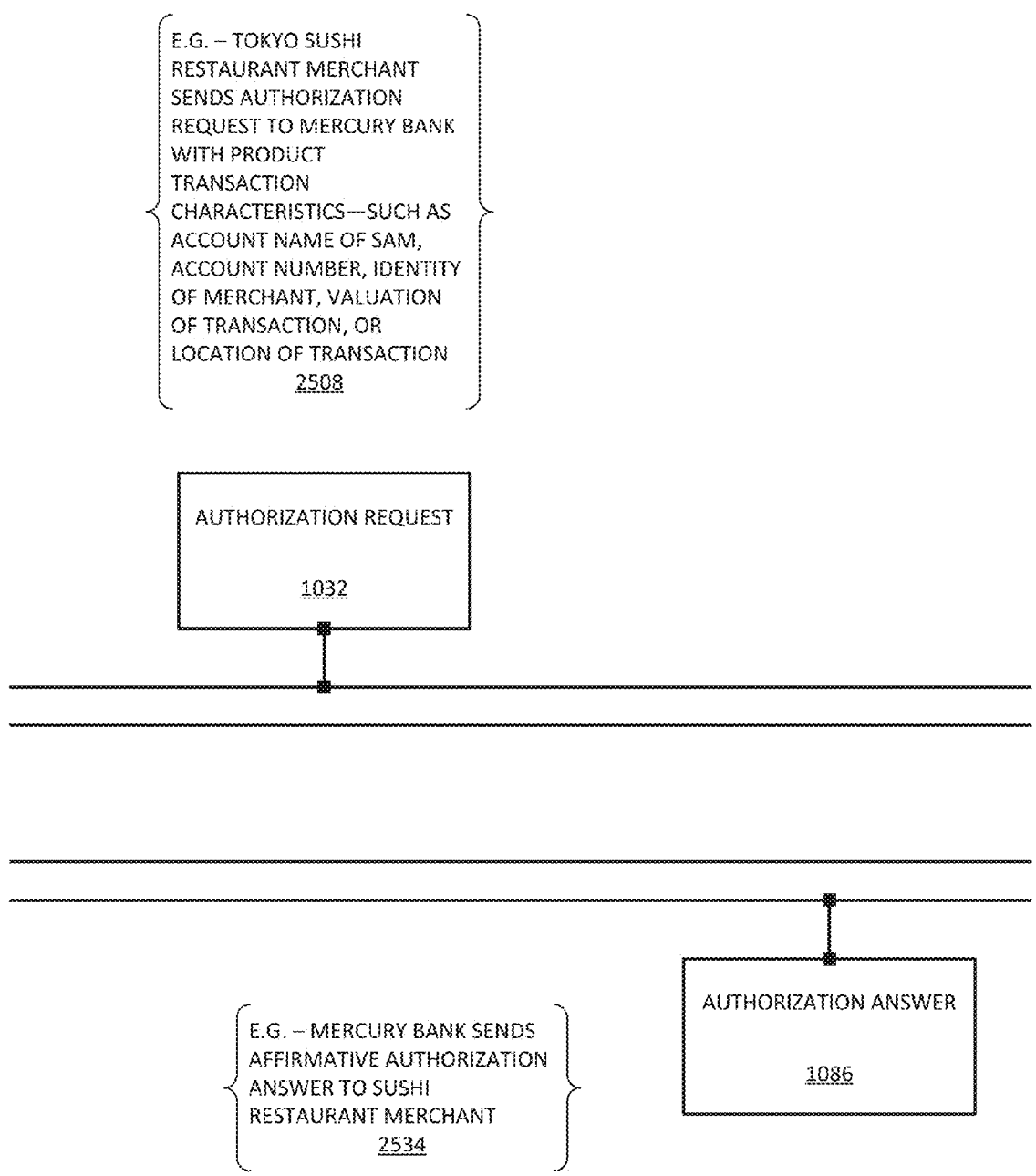
Figure 1F:
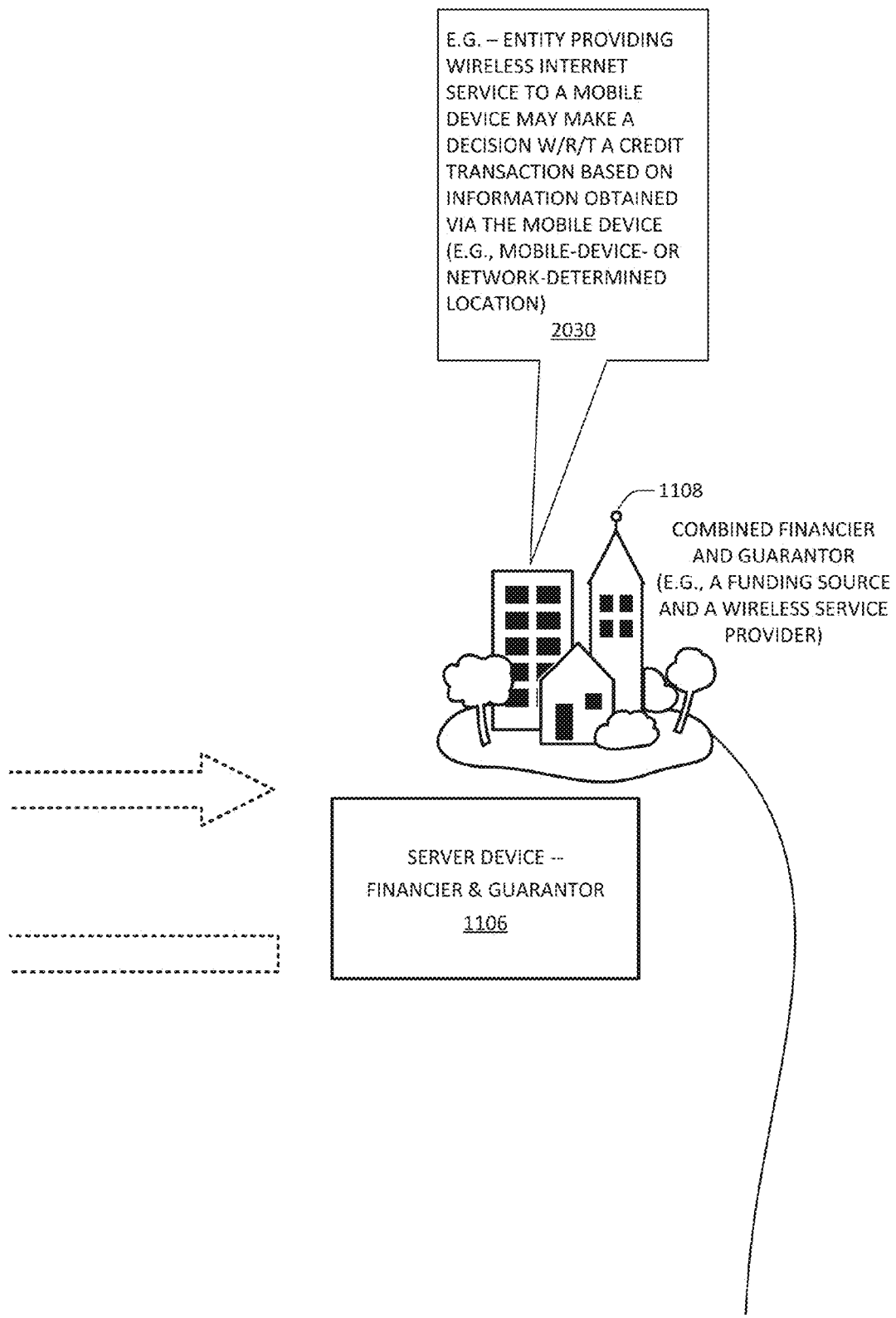
Figure 1G:
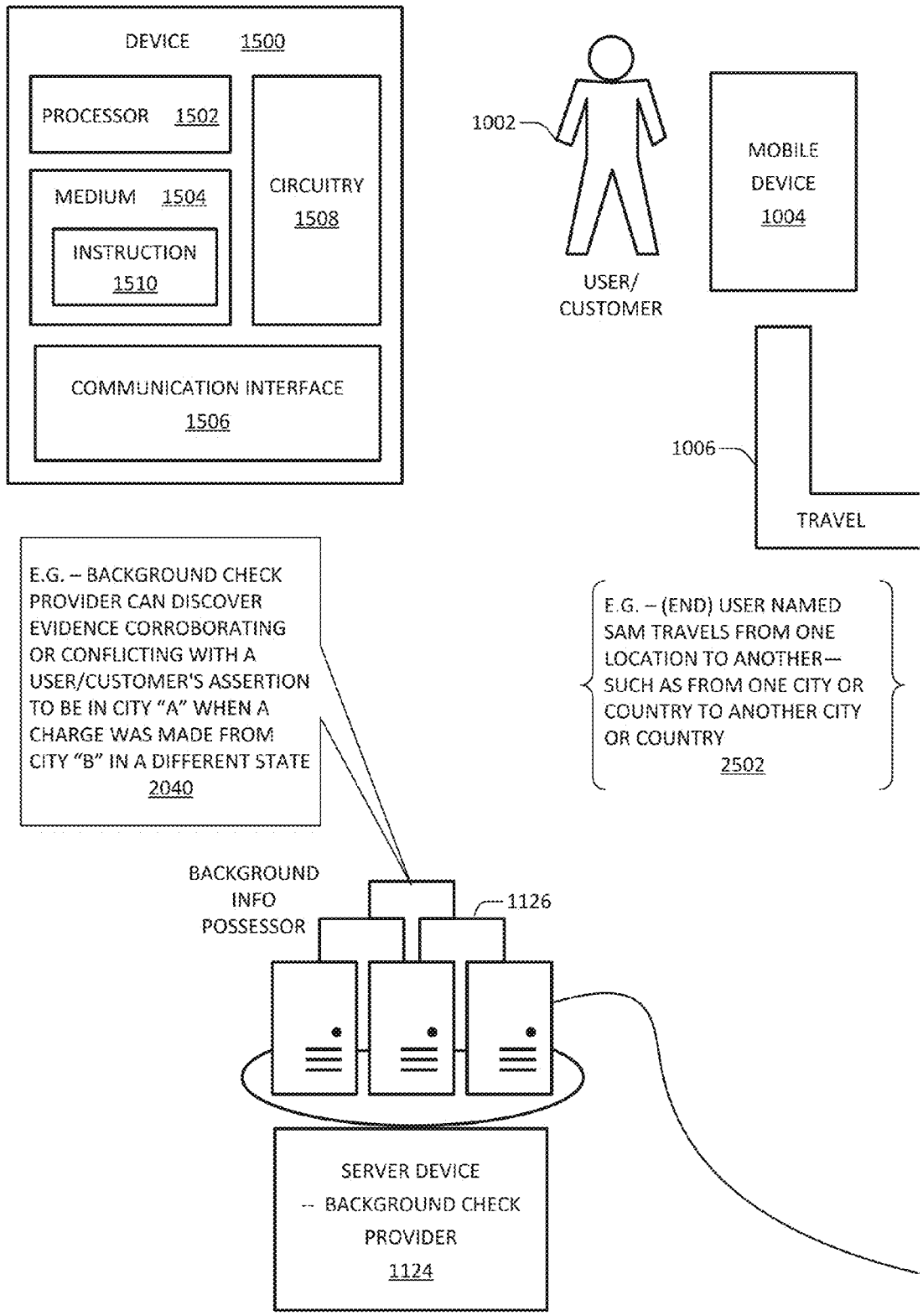
Figure 1K:
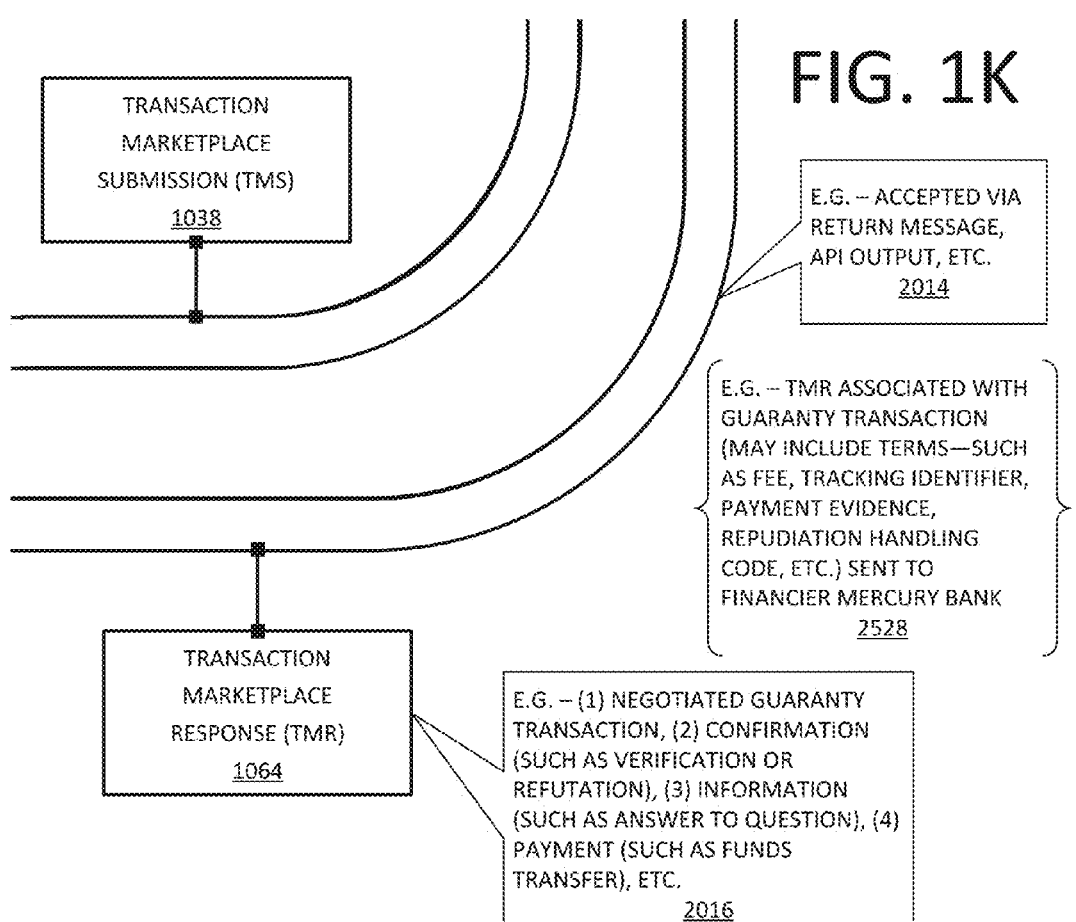
Figure 1K:
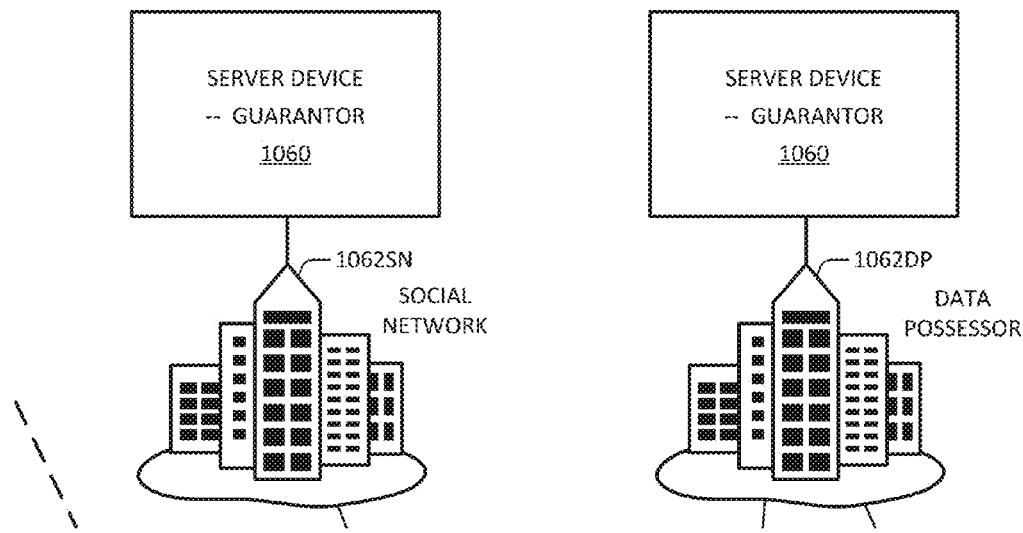
Figure 1L:
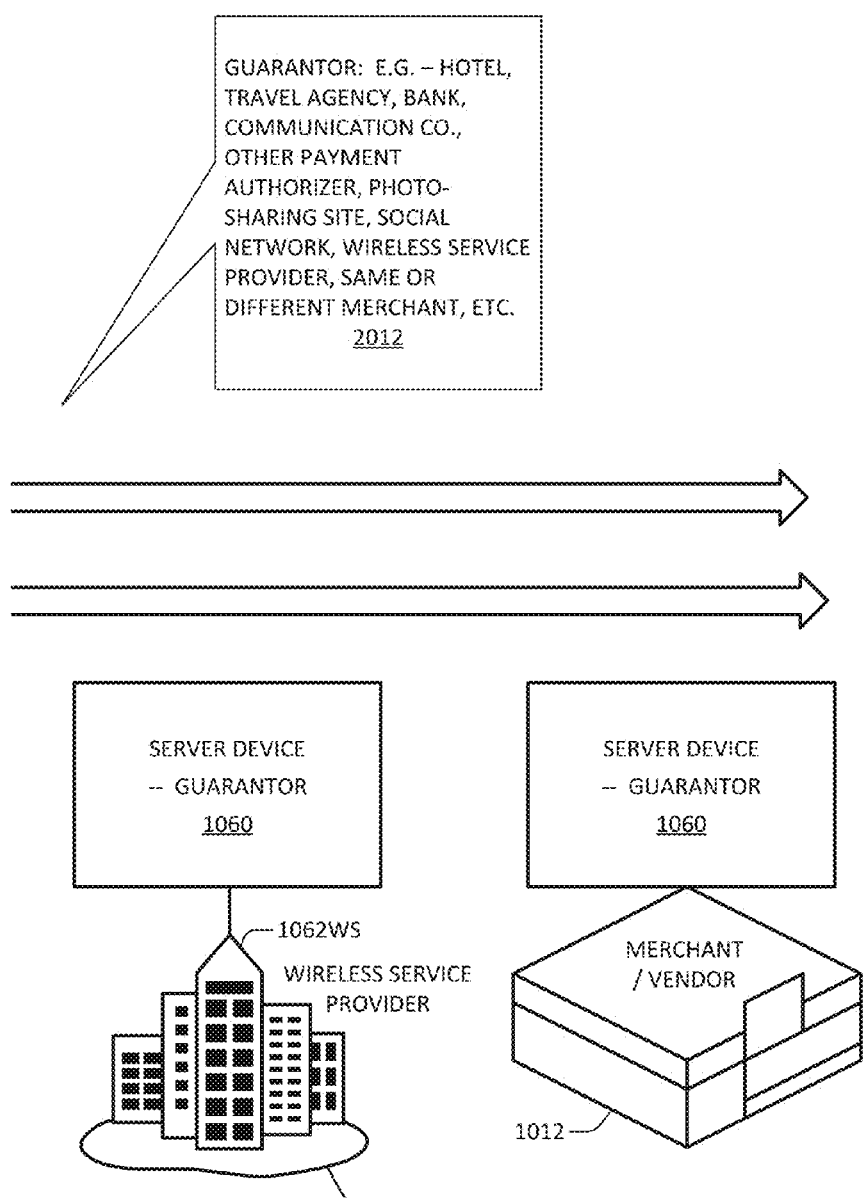
Figure 1M:
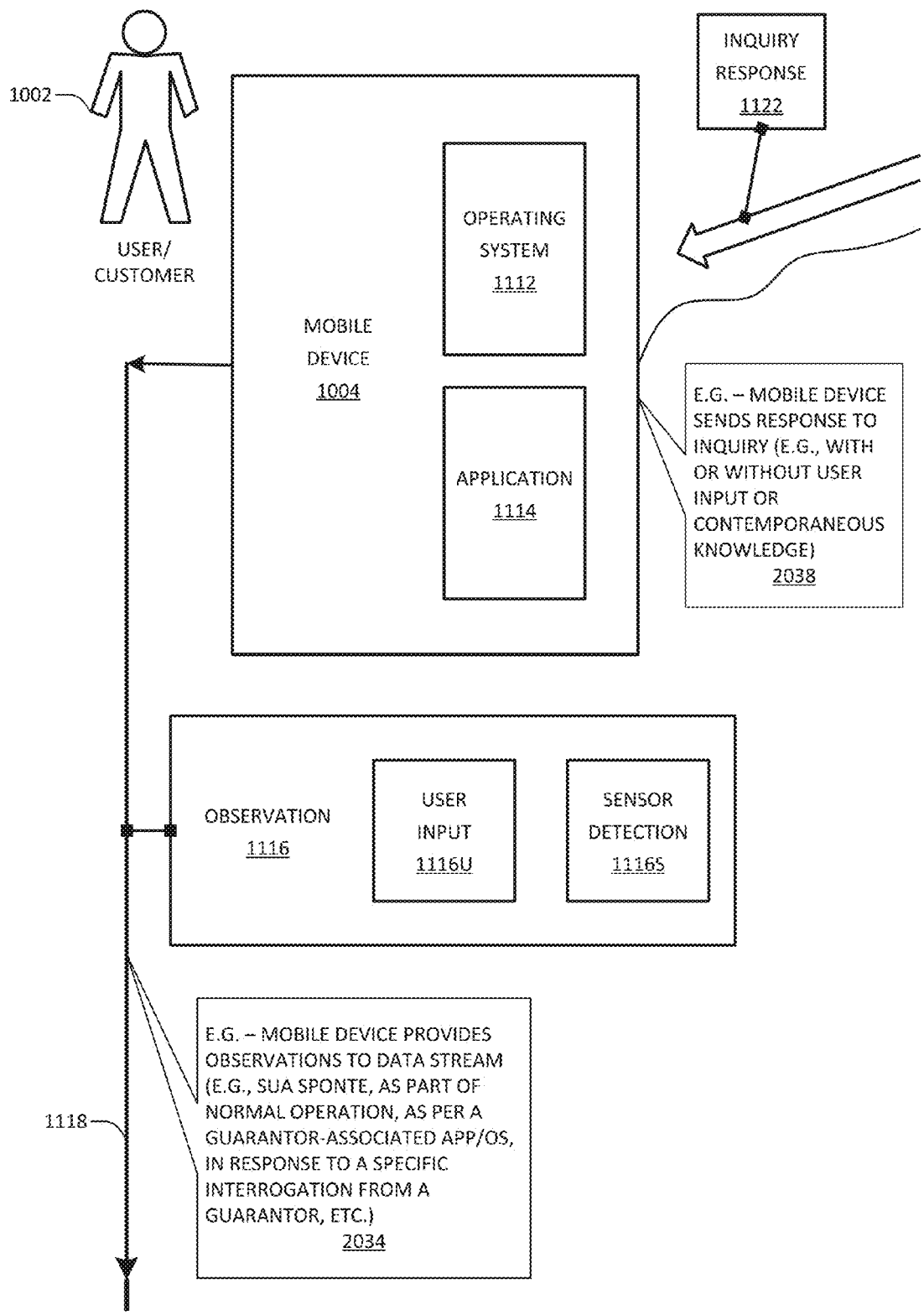
Figure 1P:
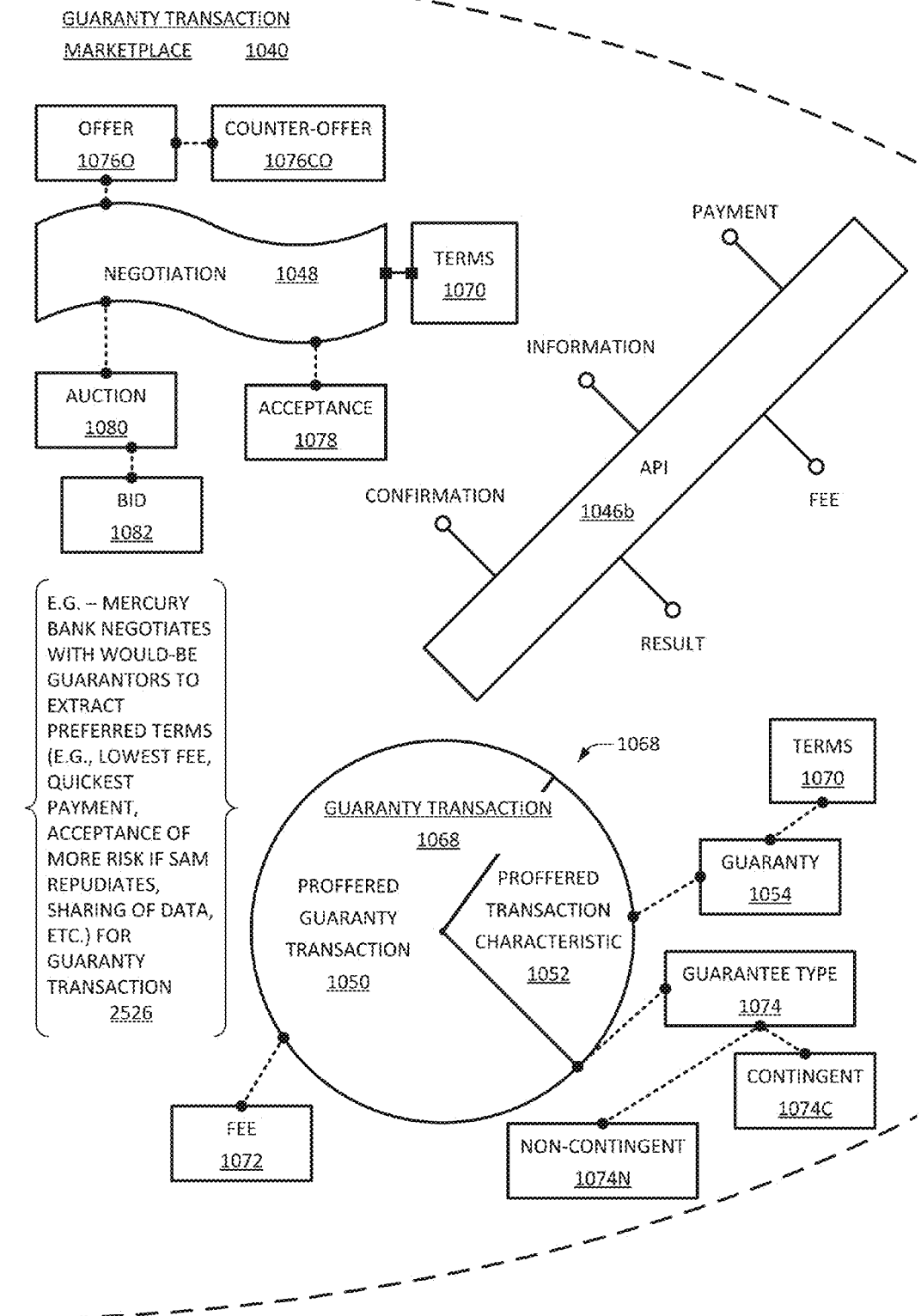
Figure 1S:
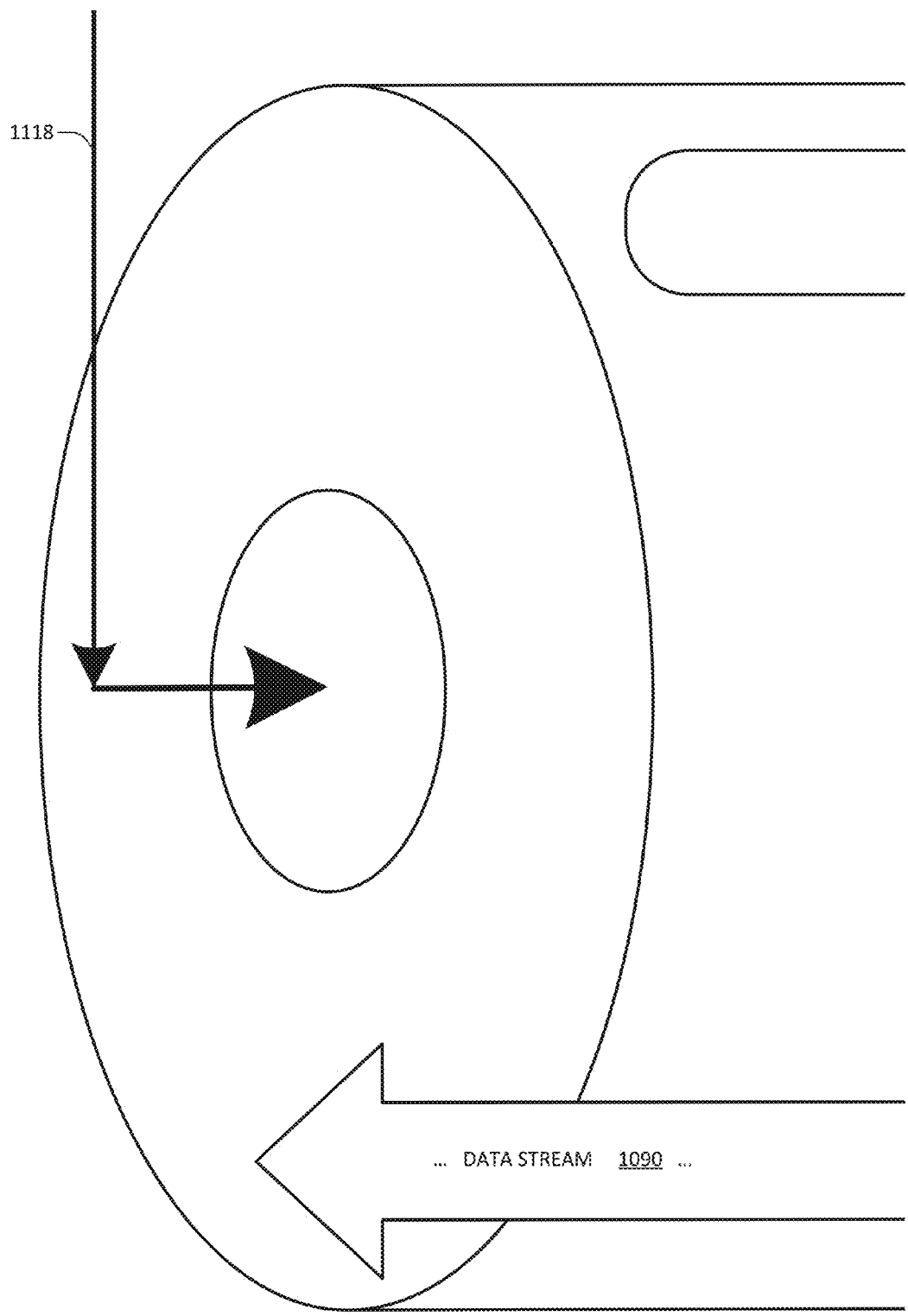
Figure 1T:
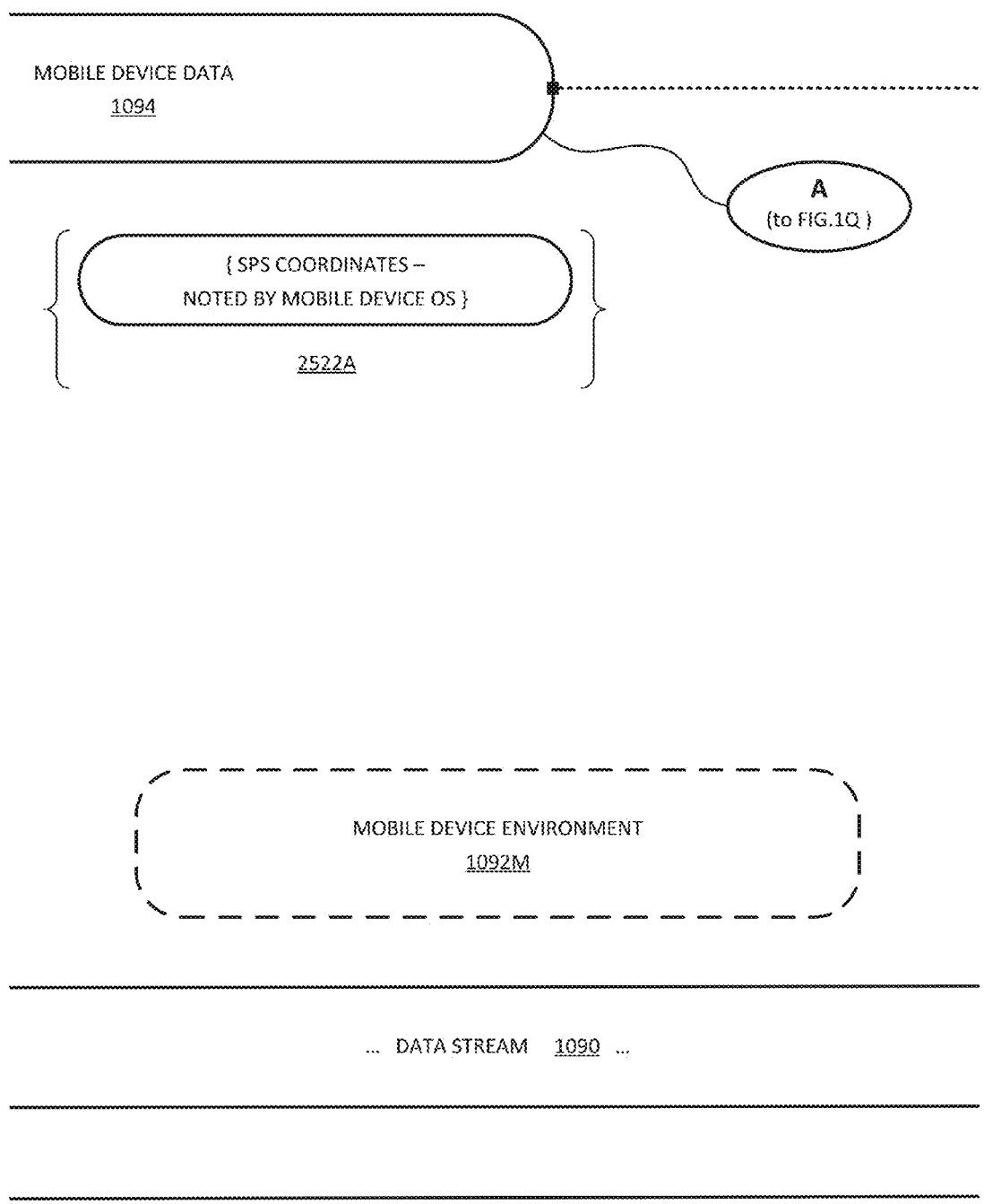
Figure 1U:
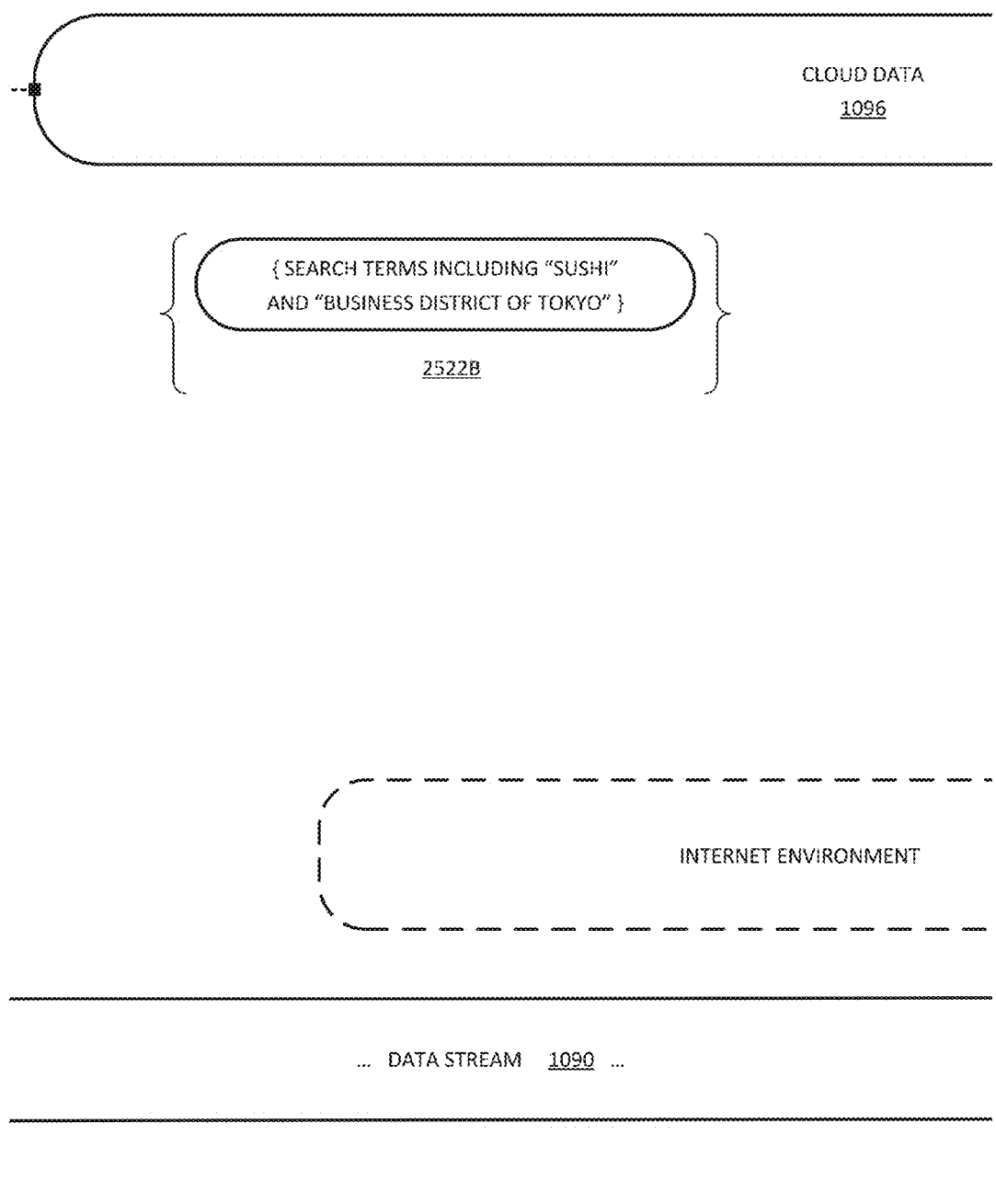
Figure 1V:
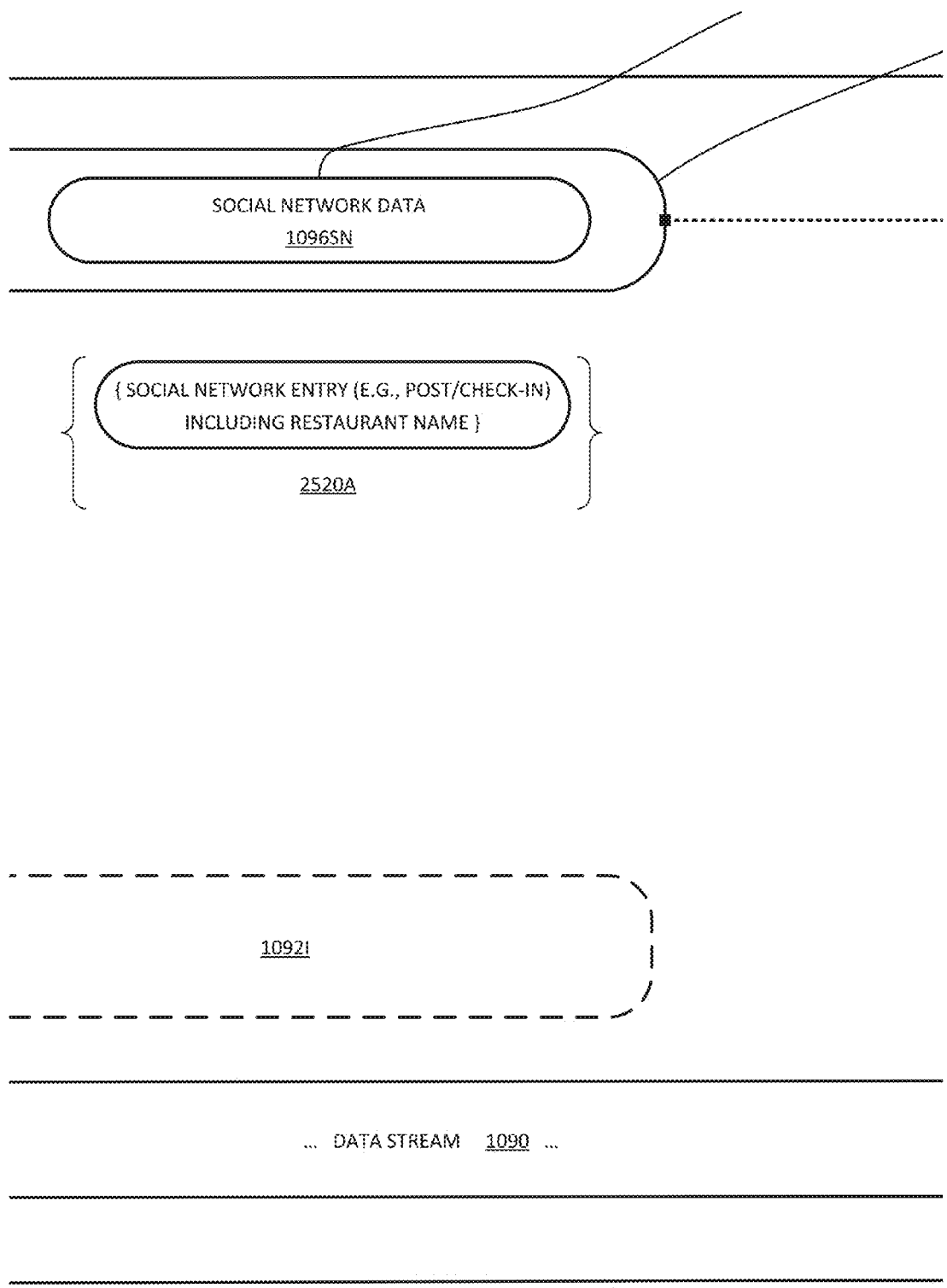
Figure 1W:
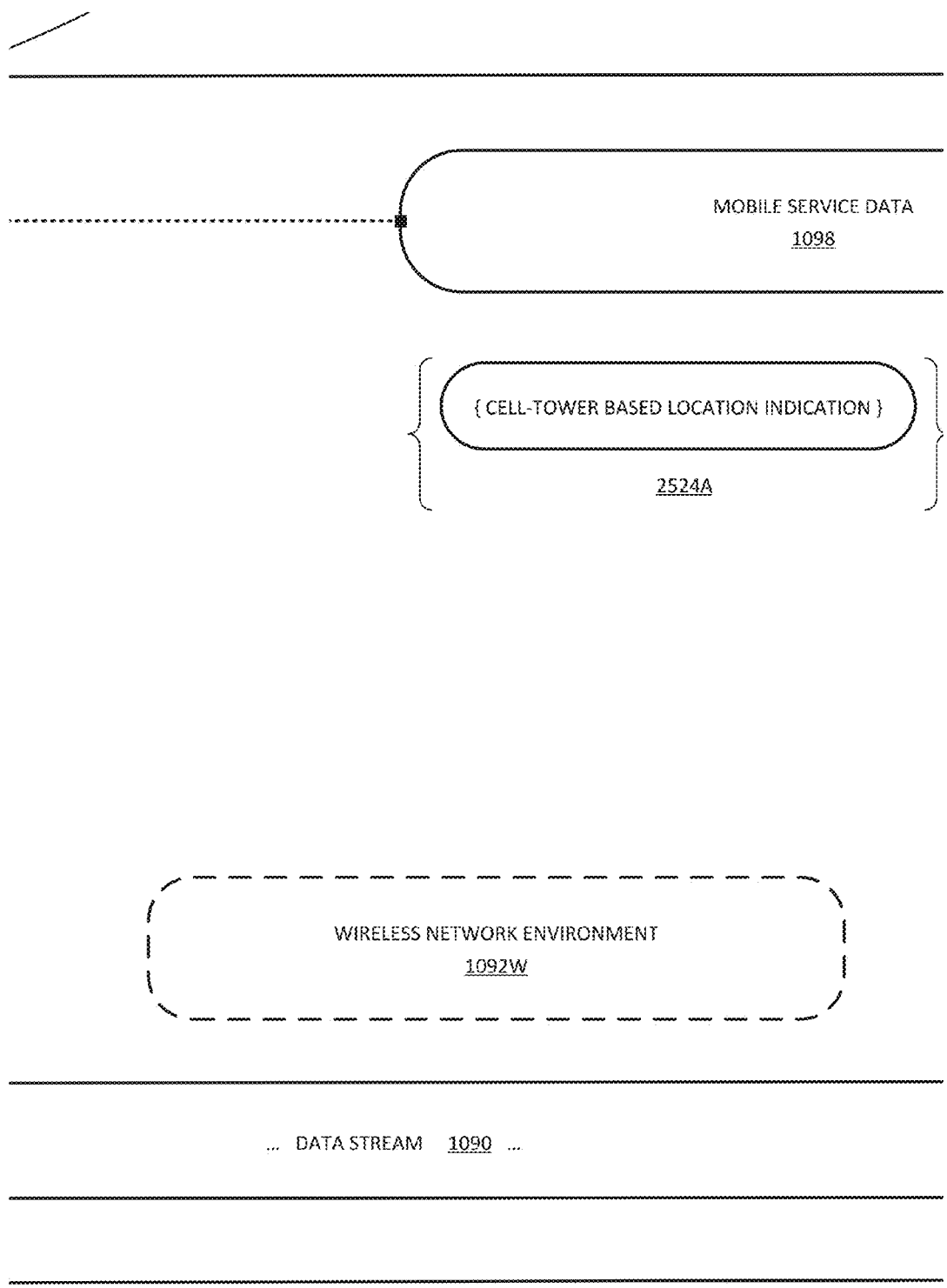
Figure 1X:
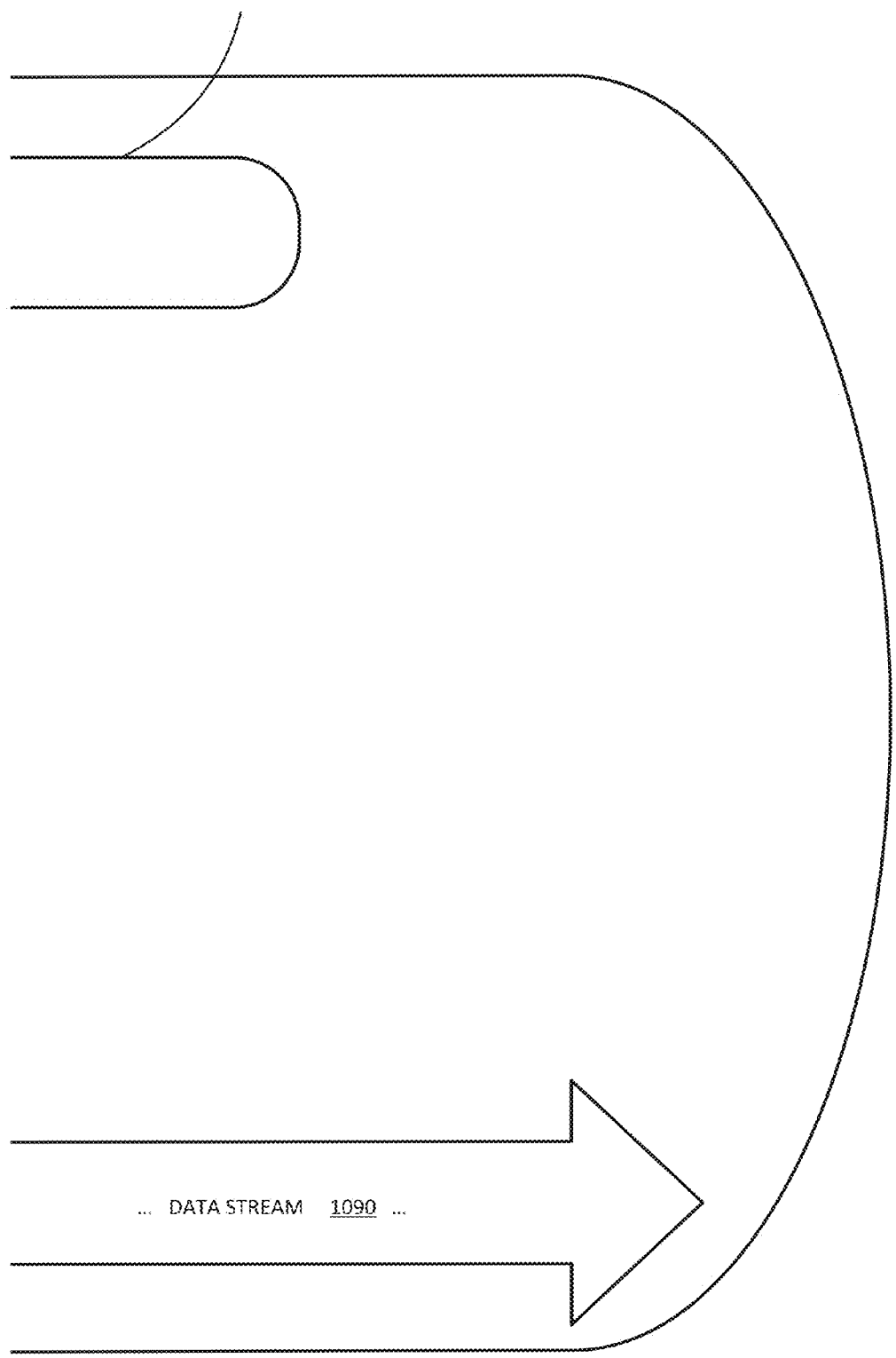

| FIG. 1A | FIG. 1B | FIG. 1C | FIG. 1D | FIG. 1E | FIG. 1F |
| FIG. 1G | FIG. 1H | FIG. 1I | FIG. 1J | FIG. 1K | FIG. 1L |
| FIG. 1M | FIG. 1N | FIG. 1O | FIG. 1P | FIG. 1Q | FIG. 1R |
| FIG. 1S | FIG. 1T | FIG. 1U | FIG. 1V | FIG. 1W | FIG. 1X |

FIG. 1 is a block diagram indicative of a spatial relationship or interconnectedness between or among drawing sheets that respectively correspond to FIGS. 1A-1X, which together depict at least an example enviro-system or affiliated processes related to certain example embodiments.

FIG. 1A is a schematic diagram of a miniaturized image or "smaller scale view" of FIGS. 1B-1X.

FIGS. 1B-1X are individual schematic diagrams of "partial views drawn on separate sheets" that may be combined to form a joint schematic diagram or "large machine or device" illustrating example implementations for facilitating guaranty provisioning for an exchange or guaranty provisioning via wireless service purveyance in accordance with certain example embodiments.

Figure 2:
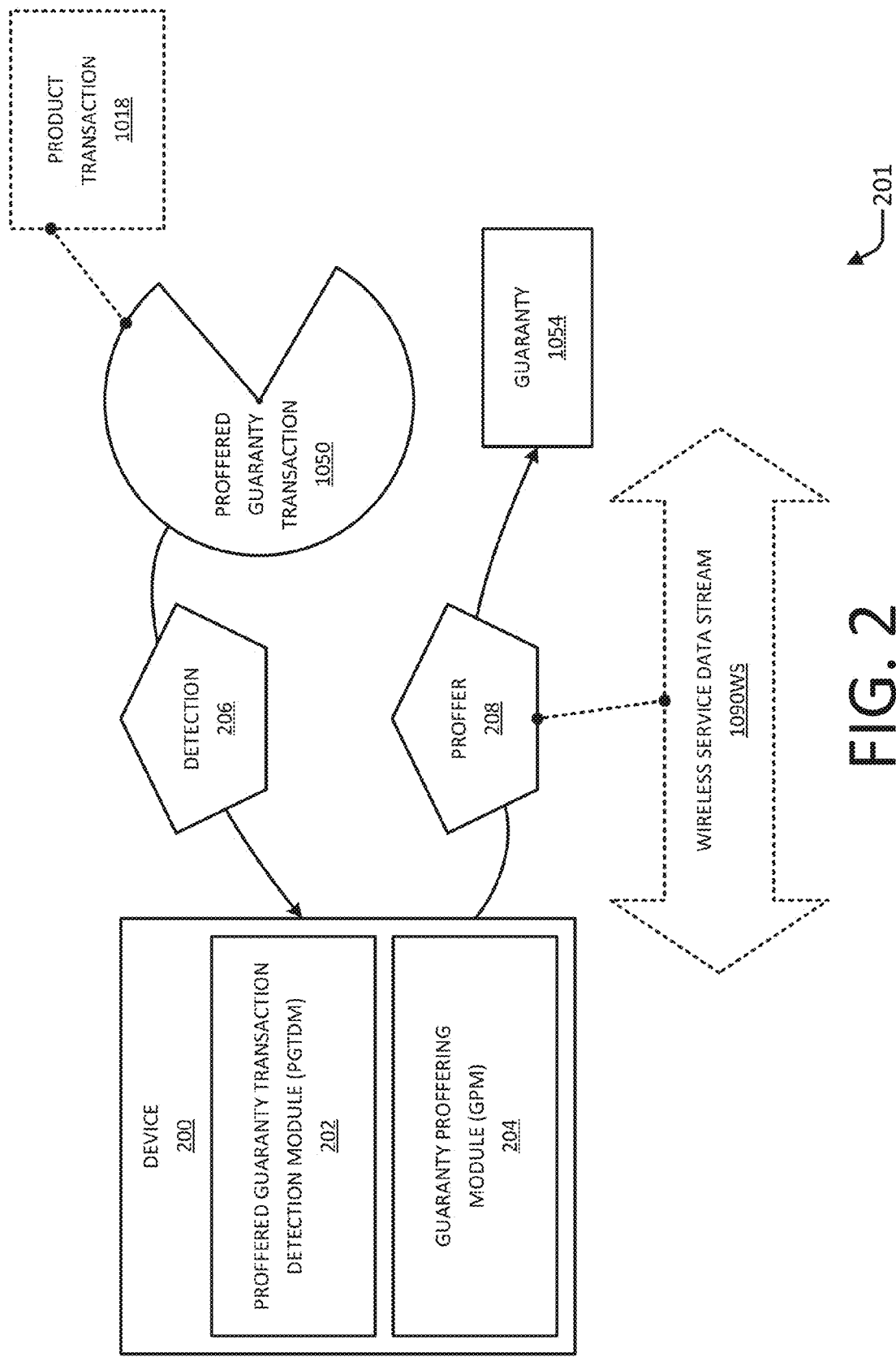

FIG. 2 is a schematic diagram that includes at least one example device, such as a server device, that is capable of handling scenarios for guaranty provisioning via wireless service purveyance in accordance with certain example embodiments.

FIGS. 3A-3D are schematic diagrams 300A-300D that include at least one example device and that depict example scenarios for guaranty provisioning via wireless service purveyance in accordance with certain example embodiments.

Figure 4:
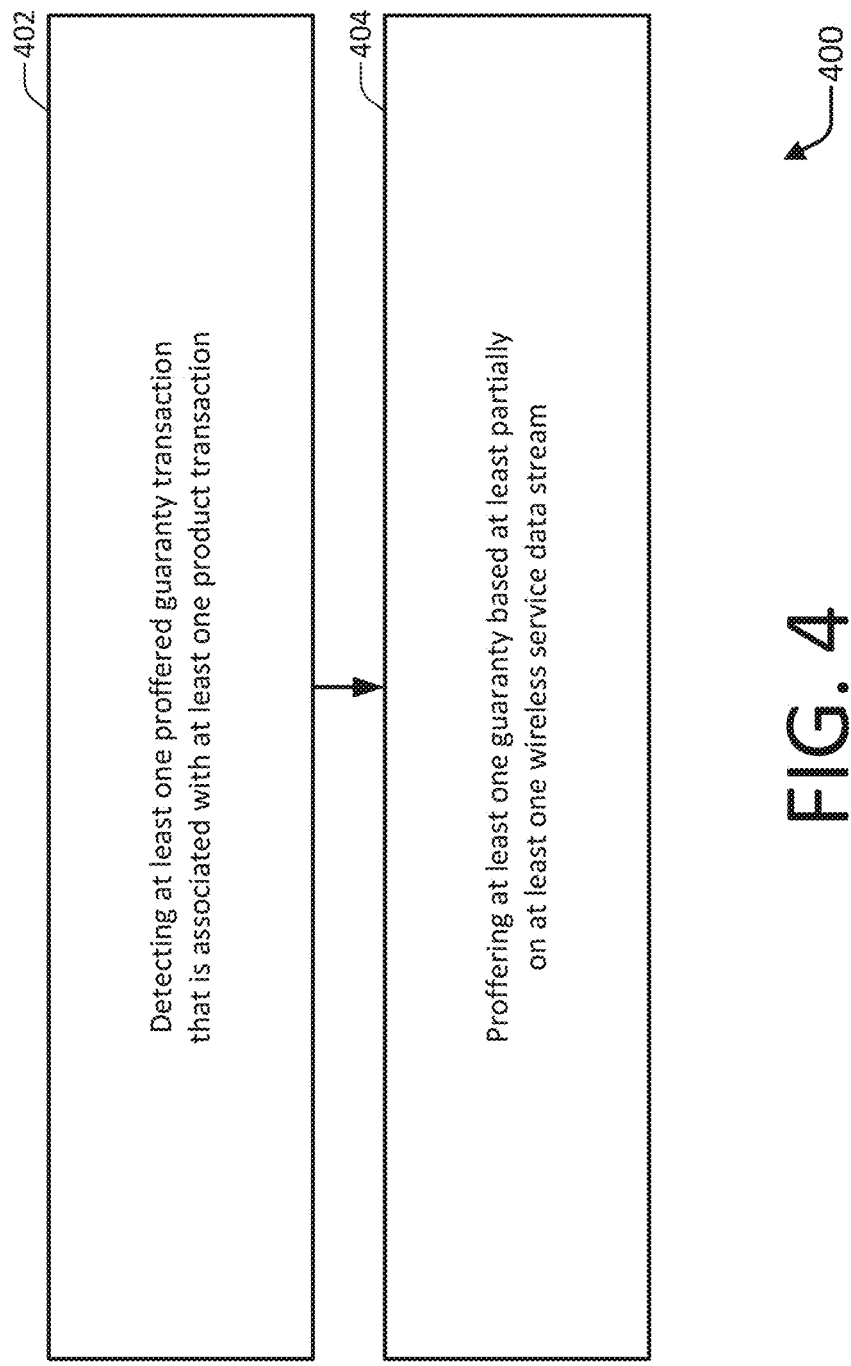

FIG. 4 is a flow diagram illustrating an example method for at least one device with regard to guaranty provisioning via wireless service purveyance in accordance with certain example embodiments.

FIGS. 5A-5G depict example additions or alternatives for a flow diagram of FIG. 4 in accordance with certain example embodiments.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In a commercial realm, two or more parties may engage in a transaction in which goods or services are exchanged for consideration, such as other goods or services, an accepted monetary unit (e.g., dollars, BitCoins, yuan/renminbi, or a combination thereof, etc.), a credit obligation (e.g., a promise to pay in the future a good, a service, a monetary unit, or a combination thereof, etc.), some combination thereof, or so forth. For example, a person may exchange $5.45 for a caffeinated beverage. In a financial arena, a first party's credit obligation to a second party may be guaranteed by a third party. For example, a parent may agree to make payments on a car loan if a child fails to do so. A guarantee for a credit obligation at least apparently attributable to a first party may be offered to reassure a second party that it is sufficiently likely to be paid so that a credit-extending transaction between the first party and the second party may be consummated. In an event that a first party fails to meet a credit obligation to a second party (e.g., due to fraud by a fourth party, due to insolvency or recalcitrance of the first party, due to a misunderstanding by any party, or a combination thereof, etc.), the second party may be able to rely on the guaranteeing third party to meet the credit obligation established by the first party.

For certain example embodiments, a guarantor may provide a guaranty on behalf of a first entity, such as a purchaser, to a second entity, such as a store owner. For certain example implementations, provision of a guaranty may be at least partially dependent on data obtained by a guarantor independent of the second entity. For example, one or more characteristics of a proposed transaction between a first entity and a second entity may be sent to a potential guarantor. A potential guarantor may already possess or may obtain one or more indicia associated with a first entity that corroborate, support, lend credence to, abide by a behavioral fingerprint that comports with, or a combination thereof, etc. a likelihood that the first entity is or would be desirous of engaging in a proposed transaction including the first entity and a second entity or of procuring a product appurtenant to a proposed transaction. For certain example implementations, a potential guarantor may obtain one or more indicia from a data stream associated with a first entity, such as a data stream produced by or accessible via a mobile device of the first entity. For example, a potential guarantor may have access to a search history, a current location, a social network posting, or a combination thereof, etc. corresponding to a first entity. If a likelihood that a first entity is or would be desirous of engaging in an identified proposed transaction is determined to be sufficiently high (e.g., meets a determined threshold, matches a certain number of characteristics, comports with a behavioral fingerprint, or a combination thereof, etc.), then a potential guarantor may signal to a second entity a willingness to provide a guaranty for the proposed transaction on behalf of the first entity with the second entity as a beneficiary. However, claimed subject matter is not limited to any particular described embodiments, implementations, examples, or so forth.

For certain example embodiments, a guarantor may provide a guaranty on behalf of a first entity, such as a dining guest, to benefit a second entity, such as a restaurant or credit card company. For certain example implementations, a server device of a potential guarantor may receive a message from a server device of a credit card company. A message from a server device of a credit card company may identify at least one characteristic of a proposed credit transaction between a first entity and a second entity. For example, a credit card company may identify an identity of a first entity and a location of a second entity. In response to a message from a server device of a credit card company, a potential guarantor, which is able to secure at least one indication that a mobile device of an identified first entity is present at a location of a second entity, may proffer a guaranty to the credit card company. For certain example implementations, a proffered guaranty may be contingent at least partially on at least one identified transaction characteristic being falsified. For example, a guarantor may become responsible for paying at least a portion of a valuation of a transaction after data has been presented evidencing a falsity of a contingent transaction characteristic. For instance, a guarantor may be responsible for paying a total cost for a meal at a restaurant if an identified first entity or a credit card company presents evidence that the identified first entity was in a different city than a city of the restaurant at the time a meal of a guaranteed transaction was served. For such a contingent example, a guarantor may not be responsible to a second entity or to a credit card company if an identified first entity was present at a restaurant of the second entity at a time of a guaranteed transaction but subsequently declines to pay for a meal. However, claimed subject matter is not limited to any particular described embodiments, implementations, examples, or so forth.

FIG. 1 is a block diagram 1000 indicative of a spatial relationship or interconnectedness between or among drawing sheets that respectively correspond to FIGS. 1A-1X, which together depict at least an example enviro-system or affiliated processes related to certain example embodiments. As shown, FIG. 1 illustrates a grid of rectangles representing drawing sheets. The grid includes four rows (e.g., starting with FIG. 1A, FIG. 1G, FIG. 1M, and FIG. 1S from top to bottom) having six columns each (e.g., row one having FIGS. 1A-1F, row two having FIGS. 1G-1L, row three having FIGS. 1M-1R, and row four having FIGS. 1S-1X).

FIG. 1A is a miniaturized image 1000A of a schematic diagram of FIGS. 1B-1X. Generally, a comparison of miniaturized image 1000A FIG. 1A to FIGS. 1B-1X, in view of FIG. 1, reveals a number of illustrated aspects. First, a top row (starting at FIG. 1B) illustrates, inter alia and moving from left to right, a product transaction 1018, a merchant/vendor 1012 and a payment authorization apparatus 1014, a financier 1034, a combined financier and guarantor 1108, etc. Second, the next row (starting at FIG. 1G) illustrates, inter alia and moving from left to right, a device 1500 that is capable of being transformed into a special-purpose computing apparatus by implementation of one or more instructions, a user/customer 1002, a mobile device 1004, a guaranty transaction marketplace 1040 that may be associated with at least one application programming interface (API) 1046, a transaction marketplace submission (TMS) 1038, a transaction marketplace response (TMR) 1064, one or more guarantors 1062 (e.g., 1062PP, 1062SN, 1062DP, 1062WS, etc. Third, the next to bottom row (starting at FIG. 1M) illustrates, inter alia and moving from left to right, a mobile device 1004 interacting with at least a portion of a guaranty system (e.g., a guarantor 1062, a guaranty transaction marketplace 1040, or a combination thereof, etc.), an exploded view of a guaranty transaction marketplace 1040 that may be associated with one or more proffered guaranty transactions 1050 or one or more proffered transaction characteristics 1052 to establish at least one guaranty transaction 1068 corresponding to at least one guaranty 1054, a data provider 1102, one or more network elements 1104, etc. Fourth, the bottom row (starting at FIG. 1S) illustrates, inter alia and moving from left to right, a data stream 1090 that may be associated with mobile device data 1094, cloud data 1096, mobile service data 1098, a combination thereof, or so forth.

For certain example embodiments, a merchant 1012 (e.g., of FIG. 1C) or a financier 1034 or 1108 (e.g., of FIG. 1E or 1F) may attempt to secure a guaranty 1054 (e.g., of FIG. 1J or 1P) from at least one potential guarantor 1062 or 1108 (e.g., of FIG. 1F, 1J, 1K, or 1L) for a proposed product transaction 1018 (e.g., of FIG. 1B) involving at least merchant 1012 or a customer 1002 (e.g., an attempted purchaser that may succeed or may fail with regard to a desired or contemplated purchase) (e.g., of FIG. 1G, 1H, or 1M). A potential guarantor 1062 or 1108 may be empowered to tap into a data stream 1090 (e.g., of FIG. 1S, 1T, 1U, 1V, 1W, or 1X) associated with at least one mobile device 1004 (e.g., of FIG. 1G, 1H, 1M, or 1R) of a customer 1002 to obtain one or more indicia that may corroborate at least one transaction characteristic 1026 (e.g., of FIG. 1B) of a proposed product transaction 1018. For certain example implementations, a merchant 1012 or a financier 1034 or 1108 may interact or communicate with a potential guarantor 1062 or 1108 in accordance with a guaranty transaction marketplace 1040 (e.g., of FIG. 1I, 1J, 1N, 1O, 1P, or 1Q) via at least one application programming interface (API) 1046/1046a/1046b (e.g., of FIG. 1I, 1O, or 1P) by at least one of providing or accepting at least one of a transaction marketplace submission (TMS) 1038/1038a/1038b or a transaction marketplace response (TMR) 1064/1064a/1064b/1064c (e.g., of FIG. 1C, 1I, 1J, 1K, or 1O). Accordingly, a proffered guaranty transaction 1050/1050a/1050b (e.g., of FIG. 1I, 1O, or 1P) from a merchant 1012 or a financier 1034 or 1108 may be matched with a proffered transaction characteristic 1052/1052a/1052b/1052c (e.g., of FIG. 1J, 1N, 1O, or 1P) from a would-be guarantor 1062 or 1108 to establish a guaranty transaction 1068 (e.g., of FIG. 1P), which guaranty transaction 1068 may be at least partially contingent on a veracity of at least one particular transaction characteristic 1026. However, claimed subject matter is not limited to any particular described embodiments, implementations, examples, or so forth.

Multiple and various independent or interrelated example embodiments are described herein below with reference to one or more of any of FIGS. 1B-1X. However, claimed subject matter is not limited to any particular described embodiments, implementations, examples, or so forth. With reference to FIG. 1G, a user/customer 1002 is shown proximate to or may be associated with at least one mobile device 1004. As used herein, unless context or an express notation indicates otherwise, a customer may be interchangeably substituted for a user of a personal device, such as an end-user of a mobile device 1004 or an end-user of a non-mobile device (e.g., a desktop computer, a home entertainment appliance, a home server, or a combination thereof, etc.) (a non-mobile device is not explicitly illustrated in FIG. 1G). For certain example implementations, a user/customer 1002 may comprise or include at least one person, at least one human, at least one legal entity, at least one robotic entity or agent, a group of people, some combination thereof, or so forth. For certain example implementations, a mobile device 1004 may comprise or include a mobile phone, a tablet, a slate computer, a phablet, a portable gaming device, a smartphone, a notebook computer, a user equipment (UE), a mobile station (MS), a laptop computer, an ultra-book, a portable navigation device, a tablet-notebook convertible, a wearable computing device such as a so-called smart watch or intelligent glasses, an electronic device having wireless communication capabilities that is typically carried by or with a person on a regular basis such as daily, a vehicle having navigation or communication capabilities, some combination thereof, or so forth. As indicated by travel arrow 1006, a user 1002 may transport, move, carry, relocate, or a combination thereof, etc. a mobile device 1004 from one location to another location. As shown, travel arrow 1006 extends from FIG. 1G to FIG. 1H.

With reference to FIG. 1H, a user 1002 may change location from time-to-time as indicated by travel arrow 1006. For certain example embodiments, a user 1002 may possess, be associated with, have access to, or a combination thereof, etc. at least one payment tool 1008. For certain example implementations, a payment tool 1008 may comprise or include a credit card 1010 (of any size or shape, of general usage or on a vendor-specific basis, or a combination thereof, etc.), a mobile device 1002, a smart card, a debit card, a pre-paid card (general usage or vendor-specific), a keychain dongle, a smart wallet, or a combination thereof, etc. By way of example only, a payment tool 1008 or a user 1002 that is associated therewith may present an indication (e.g., a code, a signal, a positive bit in a field of a message, a press of a button, a verbal expression, or a combination thereof, etc.) that a product transaction may be consummated in relation to at least one guaranty, such as an indication that pursuing a guaranty is acceptable or is requested, an indication of a preferred or likely guarantor, an indication of an appropriate guaranty transaction marketplace, some combination thereof, or so forth. As a result of movement by a user 1002 (or movement by a merchant/vendor 1012), user 1002 may eventually reach a location that is part of or is at least proximate to a site (e.g., a business premises) of a merchant/vendor 1012, which is shown in FIG. 1C.

With reference to FIG. 1C, a merchant/vendor 1012 is depicted as a building or a person. As used herein, unless context or an express notation indicates otherwise, a vendor may be interchangeably substituted for a merchant having goods or services to sell to customers. For certain example implementations, a merchant/vendor 1012 may comprise or include an individual human, a group of people, a legal entity, a partnership, a corporation, a cart, a kiosk, a building, a suite or stall, a physical store, a virtual store, some combination thereof, or so forth. In FIG. 1C, a merchant/vendor 1012 is shown proximate to or may be associated with at least one payment authorization apparatus 1014 (e.g., at a point of sale (POS), remote from a purchase location, as part of a server farm, or a combination thereof, etc.). For certain example implementations, as indicated at a blurb 2002, a payment authorization apparatus 1014 may comprise or include at least one electronic register, at least one credit card acceptance or credit authorization machine (e.g., that has independent communication capability or that is physical or wirelessly coupled to another device having a communication capability), at least one server computer, a server farm, a server blade, server functionality that is leased or purchased from a cloud computing system, a tablet computer, a smartphone, an electronic device adapted to accept or process purchases, some combination thereof, or so forth. A payment authorization apparatus 1014 may facilitate a purchase of at least one product 1016 in conjunction with a product transaction 1018 (e.g., both of FIG. 1B).

With reference to FIG. 1B, at least one product 1016 is illustrated in association with at least one product transaction 1018. For certain example implementations, as indicated at a blurb 2004, a product 1016 may comprise or include a virtual good, a physical good, a virtual service, a physical service, some combination thereof, or so forth. For certain example embodiments, as indicated at a blurb 2006, a product transaction 1018, such as for a purchase of at least one product 1016, may comprise or include an acquisition for or using consideration (e.g., an exchange of value), buying, bartering for, a lease of, a loan of, access to, or a combination thereof, etc. with respect to a full or a partial interest in at least one product 1016. For certain example implementations, a product transaction 1018 may include or be associated with at least one transaction characteristic 1026. By way of example but not limitation, a transaction characteristic 1026 may describe, identify, specify, explain, indicate a correspondence of, or a combination thereof, etc. at least one aspect of a product transaction 1018.

For certain example implementations, a transaction characteristic 1026 may comprise or include or be associated with at least one party identifier 1020 (e.g., a name, a code, a number, a picture, a username, an email address, a credit card number, a store number, a company title, an account identifier, or a combination thereof, etc.), at least one product identification 1022 (e.g., a name, a code, a number, an image, a stock keeping unit (SKU), a description, a catalog number, a make or model, or a combination thereof, etc.), at least one valuation 1024 (e.g., a monetary value, a trade value, a number of units, a bartering equivalence, or a combination thereof, etc.), at least one other transaction characteristic 1026O (e.g., a product category, a number of people served, special requests, delivery terms, contingencies, a guaranty indication (e.g., a code, a signal, a positive bit in a field of a message, or a combination thereof, etc. to indicate that a product transaction may be consummated in relation to at least one guaranty, such as an indication that pursing a guaranty is acceptable or is requested, an indication of a preferred or likely guarantor, an indication of an appropriate guaranty transaction marketplace, one or more requested terms for a guaranty, or a combination thereof, etc.), a transaction identification, a characteristic not shown, or a combination thereof, etc.), at least one transaction location 1028 (e.g., a physical location, a virtual location, an address, a city, a store name, a URL, at least one satellite positioning system (SPS) coordinate, a neighborhood, a website name, or a combination thereof, etc.), at least one transaction type 1030 (e.g., buying, leasing, borrowing, acquiring a partial interest in, bartering, acquiring access to at least a share of, in-person, identification presented, via the internet, or a combination thereof, etc.), some combination thereof, or so forth. By way of example but not limitation, a party identifier 1020 may comprise or include at least one customer identifier 1020C, at least one vendor identifier 1020V, some combination thereof or so forth. By way of example but not limitation, a transaction location 1028 may comprise or include at least one customer location 1028C, at least one vendor location 1028V, at least one product location 1028P, some combination thereof, or so forth.

With reference to FIGS. 1C, 1D, and 1E, a merchant 1012 may communicate at least one authorization request 1032 (e.g., of FIG. 1D) to a financier 1034 (e.g., of FIG. 1E). For certain example embodiments, if a customer 1002 is attempting to use a payment tool 1008 (e.g., of FIG. 1H) that relies at least partially on authorization derived from (e.g., confirmation from, approval by, imprimatur of, or a combination thereof, etc.) another party, a payment authorization apparatus 1014 of a merchant 1012 may send an authorization request 1032 to a server device 1036 of a financier 1034. For certain example implementations, an authorization request 1032 may comprise or include one or more transaction characteristics 1026 for a product transaction 1018 (e.g., of FIG. 1B). For certain example implementations, a server device, including but not limited to a server device 1036 of a financier 1034, may comprise or include a server computer, a server blade, a virtualized server, a rack of servers, a container of servers, at least a portion of a web server farm, a computer functioning as a server, at least a portion of purchased or leased computing resources (e.g., an implementation of cloud computing), some combination thereof, or so forth. For certain example implementations, as indicated by a blurb 2008, a financier 1036 may comprise or include an initial, intermediate, final, or a combination thereof, etc. entity that is capable of providing at least partial payment authorization for a product transaction 1018 on behalf of a customer 1002, such as a payment approver, a funding source, an indemnifier, or a combination thereof, etc. By way of example but not limitation, a financier 1034 may comprise or include a bank, a credit card company, a credit/financing division of a corporation, a money transfer service, an internet-based payment service (e.g., PayPal, Google Wallet, Amazon Payments, or a combination thereof, etc.), an entity making decisions for an electronic wallet, an escrow company, an insurance company contracting with a bank or credit card company, a company that performs services or acts in a role at least similar or analogous to the above-identified entities, some combination thereof, or so forth.

With reference to FIGS. 1E, 1K, 1J, and 1I, a financier 1034 may communicate at least one transaction marketplace submission (TMS) 1038 (e.g., of FIG. 1K) via at least one network 1042 using at least one message 1044 (e.g., both of FIG. 1I). For certain example implementations, a network 1042 may comprise or include at least one wireless network, at least one wired network, at least one public network, at least one private network, at least one internet, at least one intranet, at least one infrastructure network, at least one ad hoc network, at least one cellular network, at least one packet-switched network, at least one circuit switched network, at least one virtual network, some combination thereof, or so forth. For certain example implementations, a message 1044 may comprise or include at least one packet, at least one signal, some communicated electric or magnetic data, encapsulated information, at least one encrypted message, at least one unencrypted message, at least one Boolean value, one or more alphanumeric characters, at least one code, an email, a file, a TMS 1038, a transaction marketplace response (TMR) 1064, a transaction marketplace message (TMM) 1066, an inquiry 1120 (e.g., of FIG. 1N), an inquiry response 1122 (e.g., of FIG. 1M), an observation 1116 (e.g., of FIG. 1M), mobile device data 1094 or cloud data 1096 or mobile service data 1098 (e.g., of FIGS. 1S-1X), some combination thereof, or so forth.

With continuing reference to FIGS. 1E, 1K, 1J, and 1I, a financier 1034 may provide at least one TMS 1038 (e.g., of FIG. 1K) to at least one guaranty transaction marketplace 1040 (e.g., of FIGS. 1J and 1I). For certain example embodiments, as indicated by a blurb 2010 (e.g., of FIG. 1J), a TMS 1038 may be provided to guaranty transaction marketplace 1040 via a limited form of publication (e.g., send to multiple parties, post to a site or area with limited or pre-qualified access, or a combination thereof, etc.), an application programming interface (API) call, some combination thereof, or so forth. As illustrated by an elliptical shape formed from a solid line across FIGS. 1I and 1J, an example guaranty transaction marketplace 1040 may include, involve, be related to, entail, utilize, correspond to, or a combination thereof, etc. one or more aspects, characteristics, facets, or a combination thereof, etc. Examples may include, but are not limited to, at least one application programming interface (API) 1046, at least one negotiation 1048, at least one proffered guaranty transaction 1050, at least one proffered transaction characteristic 1052, at least one guaranty 1054, some combination thereof, or so forth. For certain example implementations, a proffered guaranty transaction 1050 may comprise or include or correspond to at least a portion of a product transaction 1018 (e.g., of FIG. 1B); one or more identified transaction characteristics 1026 (e.g., of FIG. 1B) that are known, unknown, requested, to be guaranteed, to be supplied, or a combination thereof, etc.; an indication that at least one guaranty is desired or being pursued or would be welcome; some combination thereof; or so forth. For certain example implementations, a proffered transaction characteristic 1052 may comprise or include or correspond to an indication of at least one transaction characteristic 1026 that is available, determinable, known, capable of being supplied; a value of at least one transaction characteristic 1026 that is available, determinable, known, capable of being supplied, or a combination thereof, etc.; a guaranty 1054 that may be offered or made available for a fee; a guaranty 1054 that may be offered without a contingency; a guaranty 1054 that may be offered contingent on a veracity of at least one transaction characteristic 1026; some combination thereof; or so forth. A guaranty 1054 may comprise or include or correspond to a guarantee, an assurance, a promise, an agreement, one or more terms therefor, or a combination thereof, etc. to provide some level of reimbursement, compensation, payment on behalf of another's obligation, monetary value, or a combination thereof, etc. if a product transaction is disputed or repudiated (or otherwise subject to a disagreement) in whole or in part on a non-contingent basis, on a contingent basis (e.g., if a particular asserted or guaranteed transaction characteristic is falsified), some combination thereof, or so forth. Proffered guaranty transaction 1050, proffered transaction characteristic 1052, and guaranty 1054 are addressed further herein, particularly with reference to at least FIGS. 1N, 1O, 1P, and 1Q that depict an exploded view of a guaranty transaction marketplace 1040 with an elliptical shape formed from dashed lines.

For certain example embodiments, a guaranty transaction marketplace 1040 may enable at least one negotiation 1048 (e.g., presentation of an offer, presentation of a counter-offer, discussion of one or more terms, an acceptance, a refusal, suggested term alterations, bidding, an auction, a reverse auction, or a combination thereof, etc.) to be conducted, accomplished, effectuated, or a combination thereof, etc. via at least one API 1046. At least a portion of an API 1046 may be realized, constituted, implemented, or a combination thereof, etc. at least partially at, by, or using a server device 1036 of a financier 1034, a server device 1056 of a market maker 1058, a server device 1060 of a guarantor 1062, a server device 1106 of a combination financier and guarantor (e.g., of FIG. 1F), another server device that interacts with a guaranty system, a mobile device that interacts with a guaranty system, some combination thereof, or so forth. A market maker 1058, if present or utilized, may function to create a guaranty transaction marketplace 1040 for use by a customer 1002, a vendor 1012, a financier 1034 or 1108, a guarantor 1062 or 1108, some combination thereof, or so forth. A market maker 1058 may comprise or include, by way of example but not limitation, a vendor 1012, a financier 1034, a guarantor 1062, a neutral third (or fourth) party, or a combination thereof, etc. that establishes, operates, implements, or a combination thereof, etc. an exchange, a mechanism to facilitate matches to form guaranty transactions 1068 (e.g., of FIG. 1P), a secure bazaar, some combination thereof, or so forth.

With reference to FIGS. 1J, 1K, and 1L, at least one server device 1060 for a guarantor 1062 is illustrated as having access to at least one guaranty transaction marketplace 1040 (e.g., as indicated by at least one of two double-ended arrows extending from FIG. 1J across FIG. 1K and to FIG. 1L). For certain example embodiments, a guarantor 1062 may comprise or include at least one pre-positioned data possessor 1062PP, at least one social network 1062SN, at least one data possessor 1062DP, at least one wireless service provider 1062WS, at least one combined funding source and wireless service provider as an example of a combined financier and guarantor 1108 (e.g., of FIG. 1F), some combination thereof, or so forth. Additionally or alternatively, a guarantor 1062 may comprise or include at least one merchant/vendor 1012. For certain example implementations, as indicated at a blurb 2012, a guarantor 1062 may comprise or include at least one hotel, at least one travel agency, at least one bank, at least one communication company, at least one other payment authorizer, at least one photo-sharing site, at least one social network, at least one wireless service provider, a same merchant as is involved in a product transaction, at least one merchant that differs from one involved in a product transaction, some combination thereof, or so forth. For certain example embodiments, a guarantor 1062 may communicate at least one transaction marketplace response (TMR) 1064 (e.g., of FIG. 1J) via at least one network 1042 using at least one message 1044 (e.g., both of FIG. 1I). A guarantor 1062 may provide at least one TMR 1064 (e.g., of FIG. 1J) to at least one guaranty transaction marketplace 1040 (e.g., of FIGS. 1J and 1I). For certain example embodiments, a TMR 1064 may be provided in response to (e.g., based on an analysis of, in order to answer, after, to match a noted transaction characteristic of, or a combination thereof, etc.) a TMS 1038. By way of example only, a transaction marketplace message (TMM) 1066 may comprise or include a TMS 1038, a TMR 1064, some combination thereof, or so forth.

With reference to FIGS. 1N, 1O, 1P, and 1Q, an exploded view of an example guaranty transaction marketplace 1040 is illustrated by an elliptical shape formed from a dashed line. An API 1046a is shown at FIG. 1O. Although API 1046a is depicted apart or separate from hardware elements in FIG. 1O, an API 1046—such as an API 1046a—may be realized, constituted, implemented, or a combination thereof, etc. at least partially at, by, or using a server device 1036 of a financier 1034, a server device 1056 of a market maker 1058, a server device 1060 of a guarantor 1062, another server device or a mobile device that interacts with a guaranty system, some combination thereof, or so forth. As illustrated, API 1046a may receive or issue one or more inputs or outputs, which may include but are not limited to: a TMS 1038a, a TMS 1038b, a TMR 1064a, a TMR 1064b, or a TMR 1064c. For certain example implementations, a TMS 1038 may at least reference (e.g., include, be associated with, provide a link to, identify, or a combination thereof, etc.) at least one proffered guaranty transaction 1050 or at least one proffered transaction characteristic 1052. For certain example implementations, a TMR 1064 may at least reference (e.g., include, be associated with, provide a link to, identify, or a combination thereof, etc.) at least one proffered guaranty transaction 1050 or at least one proffered transaction characteristic 1052. As illustrated, a TMS 1038a may reference at least a proffered guaranty transaction 1050a, a TMS 1038b may reference at least a proffered transaction characteristic 1052c, a TMR 1064a may reference at least a proffered transaction characteristic 1052a, a TMR 1064b may reference at least a proffered transaction characteristic 1052b, or a TMR 1064c may reference at least a proffered guaranty transaction 1050b. For certain example implementations, a proffered transaction characteristic 1052 may at least reference (e.g., include, be associated with, provide a link to, identify, or a combination thereof, etc.) at least one guaranty 1054. As illustrated, a proffered transaction characteristic 1052a may reference at least a guaranty 1054a, a proffered transaction characteristic 1052b may reference at least a guaranty 1054b, or a proffered transaction characteristic 1052c may reference at least a guaranty 1054c. Although illustrated with a proffered transaction characteristic 1052 at least referencing a guaranty 1054, a guaranty 1054 may alternatively or additionally be at least referenced by a proffered guaranty transaction 1050, by both a proffered transaction characteristic 1052 and a proffered guaranty transaction 1050, by neither a proffered transaction characteristic 1052 nor a proffered guaranty transaction 1050, or so forth.

With reference to FIGS. 1N and 1O, multiple TMS 1038 and TMR 1064 are shown. For certain example embodiments, at least one of a TMS 1038 or a TMR 1064 may be injected into a guaranty transaction marketplace 1040 by at least one of a financier 1034 or a guarantor 1062. In one illustrated example, a financier 1034 (e.g., of FIG. 1E) may provide a TMS 1038a that at least references a proffered guaranty transaction 1050a to a guaranty transaction marketplace 1040 via an API 1046a. A first guarantor 1062 (e.g., of FIG. 1J, 1K, or 1L) may responsively provide a TMR 1064a that at least references a proffered transaction characteristic 1052a, which may match a transaction characteristic that is indicated by proffered guaranty transaction 1050a, to guaranty transaction marketplace 1040 via API 1046a. A second guarantor 1062 (e.g., of FIG. 1J, 1K, or 1L) may responsively provide a TMR 1064b that at least references a proffered transaction characteristic 1052b, which may also match a same or a different transaction characteristic that is indicated by proffered guaranty transaction 1050a, to guaranty transaction marketplace 1040 via API 1046a. By way of example only, proffered guaranty transaction 1050a may indicate that a product transaction 1018 involves Kevin Jorgensen, Ralph's Sporting Goods, and a pogo stick; proposed transaction characteristic 1052a may indicate that Kevin Jorgensen has a smartphone that is located no more than 50 meters from a Ralph's Sporting Goods store; and proposed transaction characteristic 1052b may indicate that Kevin Jorgensen has five social network members to which he is linked (e.g., that are friends) that have been posting about using pogo sticks during the last 14 days.

In another illustrated example, a guarantor 1062 (e.g., of FIG. 1J, 1K, or 1L) may provide a TMS 1038b that at least references a proffered transaction characteristic 1052c, which may pertain to a particular user 1002, a particular merchant 1012, a particular location, a type of payment tool, a kind of good, a category of service, or a combination thereof, etc., to a guaranty transaction marketplace 1040 via an API 1046a. A financier 1034 (e.g., of FIG. 1E) may responsively provide a TMR 1064c that at least references a proffered guaranty transaction 1050b, which may match a transaction characteristic—such as user, merchant, location, type of payment tool, kind of good, category of service, or a combination thereof, etc.—that is indicated by proffered transaction characteristic 1052c, to guaranty transaction marketplace 1040 via API 1046a. By way of example only, proffered transaction characteristic 1052c may indicate that a would-be guarantor knows or is able to determine a location of a particular individual, say Sally Wilde, with sufficient certainty that the would-be guarantor may be willing to provide a guaranty 1054c for a product transaction involving Sally Wilde; proffered guaranty transaction 1050b may indicate that a financier is seeking a guaranty (e.g., guaranty 1054c) for a product transaction involving Sally Wilde.

With reference to FIG. 1P, a guaranty transaction 1068 is illustrated, by way of example, as a circular shape formed from at least one proffered guaranty transaction 1050 or at least one proffered transaction characteristic 1052. For certain example implementations, a guaranty transaction 1068 may be established, agreed to, formed, or a combination thereof, etc. if at least one proffered guaranty transaction 1050 is matched to a proffered transaction characteristic 1052, or vice versa. For certain example implementations, a guaranty transaction 1068 may be established, agreed to, formed, or a combination thereof, etc. if at least one negotiation 1048 results in or reaches a point that one or more terms 1070 corresponding to at least one financier 1034 or 1108 match one or more terms 1070 corresponding to at least one guarantor 1062 or 1108. As shown, a guaranty transaction 1068 may at least reference at least one fee 1072, at least one guaranty 1054, at least one guarantee type 1074, some combination thereof, or so forth. For certain example implementations, a fee 1072 may comprise or include a value being actually or effectively transferred from a financier 1034 to a guarantor 1062 in exchange for a guaranty 1054. Example forms of a fee 1072 may comprise or include, but are not limited to, at least one monetary payment, at least one credit or debit allocation, one or more program points, some data disclosure or sharing, advertising allowance or obligation, priority processing, prominent placement, a discount (e.g., on a valuation of a product transaction), some combination thereof, or so forth. Although illustrated with a proffered guaranty transaction 1050 at least referencing a fee 1072, a fee 1072 may alternatively or additionally be at least referenced by a proffered transaction characteristic 1052, by both a proffered transaction characteristic 1052 and a proffered guaranty transaction 1050, by neither a proffered transaction characteristic 1052 nor a proffered guaranty transaction 1050, or so forth. Additionally or alternatively, a fee 1072 may develop for a guaranty transaction 1068 overall as a result of a negotiation 1048 over one or more terms 1070, as a consequence of one or more rules or guidelines of a guaranty transaction marketplace 1040, some combination thereof, or so forth.

For certain example embodiments, a guaranty transaction 1068, a proffered transaction characteristic 1052, a proffered guaranty transaction 1050, or a combination thereof, etc. may correspond to or at least reference at least one guarantee type 1074, which may define, categorize, describe, indicate, or a combination thereof, etc. a type of guaranty 1054 ascribed to at least guaranty transaction 1068. Examples of a guarantee type 1074 may comprise or include, but are not limited to, a non-contingent guarantee type 1074N, a contingent guarantee type 1074C, some combination thereof, or so forth. For certain example implementations, a non-contingent guarantee 1074N may obligate a guarantor 1062 to ensure that a merchant 1012 or a financier 1034 is paid or made whole regardless of a reason for non-payment by a customer 1002 (e.g., of FIG. 1G, 1H, or 1M). For certain example implementations, a contingent guarantee 1074C may obligate a guarantor to be responsible for payment if at least one condition, reason, justification, event, or a combination thereof, etc. occurs, is demonstrated, is evidenced, is proven to a given level of certainty, some combination thereof, or so forth. Examples of a contingency may comprise or include, but are not limited to, a customer 1002 disputes 1084D a product transaction 1018 (e.g., of FIG. 1B) with a vendor 1012 (e.g., of FIG. 1C) due to an alleged breach by vendor 1012 or an alleged failure of an associated product 1016, a user 1002 repudiates 1084R a product transaction 1018 due to allegedly having not participated in or authorized at least a portion of the transaction, a user 1002 or a financier 1034 demonstrates that user 1002 did not request or authorize a product transaction 1018, a user 1002 or a financier 1034 provides evidence that a transaction characteristic 1026 that a guarantor 1062 corroborated is (or was at a time of a product transaction) false, some combination thereof, or so forth.

For certain example embodiments, one or more terms 1070, such as a contingent 1074C or a non-contingent 1074N guarantee type 1074, may be negotiated as part of at least one negotiation 1048 between or among at least one financier 1034 and one or more potential guarantors 1062. One or more additional or alternative terms 1070 may be subject to negotiation 1048. Examples for at least one term 1070 may comprise or include, but are not limited to, a fee 1072 (e.g., size, delivery mode, delivery timing, type, or a combination thereof, etc.), amount of reimbursement or payment (e.g., percentage of valuation 1024 (e.g., of FIG. 1B)), timing of fee or reimbursement payment (e.g., immediately, within 30 days, upon customer repudiation, after investigation of a disagreement, or a combination thereof, etc.), what or how much data may be exchanged (e.g., transaction characteristic missing, confirmation by guarantor of transaction characteristic asserted by financier—which may involve less disclosure by a guarantor, missing transaction characteristic supplied by guarantor—which may involve a greater disclosure by a guarantor, or a combination thereof, etc.), how a disagreement—such as a dispute or a repudiation—is handled (e.g., automated, manually, order of events, who handles, mediator or arbitrator as decider, or a combination thereof, etc.), who handles a disagreement (e.g., financier, merchant, guarantor, background check provider, or a combination thereof, etc.), whether it is a separate guaranty or part of a bundle of guaranties, granularity or specificity (e.g., SPS coordinates versus zip code with respect to location, Italian food versus two-frequently-patronized Italian restaurants with respect to dining preference, or a combination thereof, etc.), some combination thereof, or so forth.

For certain example implementations, a negotiation 1048 may include, entail, facilitate, or a combination thereof, etc. the communicating, making, providing, accepting, establishing, presenting, or a combination thereof, etc. of at least one offer 1076O, at least one counter-offer 1076CO, at least one offer 1076 (not explicitly shown, but which may include at least one offer 1076O or at least one counter-offer 1076CO), at least one acceptance 1078, some combination thereof, or so forth. By way of example only, an acceptance 1078 of an offer 1076O or a counter-offer 1076CO may result in or establish a guaranty transaction 1068. For certain example implementations, a negotiation 1048 may include or utilize at least one auction 1080 (e.g., including a traditional auction or a reverse auction) if multiple financiers 1034 or multiple potential guarantors 1062 are attempting to establish a guaranty transaction 1068. An auction 1080 may include one or more bids 1082 (e.g., from one or more potential guarantors 1062, from one or more financiers 1034 intending to attain some level of assurance with respect to at least one product transaction, or a combination thereof, etc.) with differing terms 1070, such as a reduced fee 1072 or a guaranty 1054 having one or more terms that are more favorable to a financier 1034 (e.g., more data disclosure by a guarantor or a lower probative bar to paying on a contingent guaranty).

For certain example implementations, an API 1046*b* may expose any one or more of a number of facets or inputs or outputs or calls for a guaranty transaction marketplace 1040. Examples of exposed interfaces may comprise or include, but are not limited to, confirmation, information, payment, result, fee, some combination thereof, or so forth. By way of example only, a confirmation call may relate to or pertain to a situation in which a financier 1034 (e.g., of FIG. 1E) offers to pay a fee if a guarantor 1062 (e.g., of FIG. 1J, 1K, or 1L) or a data provider 1102 (e.g., of FIG. 1R) is willing to confirm at least one transaction characteristic 1026 (e.g., of FIG. 1B) specified by financier 1034, possibly in conjunction with or in exchange for at least one guaranty 1054. By way of example only, an information call may relate to or pertain to a situation in which a financier 1034 offers to pay a fee if a guarantor 1062 or a data provider 1102 is willing to supply at least one transaction characteristic 1026 or at least one customer characteristic (e.g., current location, identified social network links, interest(s) as per at least one search history, interest(s) as per one or more social network postings, travel history, or a combination thereof, etc. for a customer that is attempting to engage in at least one product transaction 1018 (e.g., of FIG. 1B)) that may corroborate at least one transaction characteristic 1026, possibly in conjunction with or in exchange for at least one guaranty 1054. By way of example only, a result interface of an API 1046*b* may relate to or pertain to an output from an attempt to form or attain a guaranty transaction 1068. Results may comprise or include, but are not limited to, a guaranty transaction 1068, an indication of failure, an indication of incomplete status, one or more terms 1070, at least one counter-offer 1076CO, at least one acceptance 1078, at least one guarantee type 1074, one or more transaction marketplace responses 1064, some combination thereof, or so forth. By way of example only, a payment interface of an API 1046b may relate to or pertain to an amount of a fee, how a fee is to be paid or received, an actual transfer (e.g., an electronic funds transfer (EFT)) of a fee, one or more options for payment of a fee, some combination thereof, or so forth.

With reference to FIG. 1Q, at least one disagreement 1084 is illustrated as part of a guaranty transaction marketplace 1040. Examples of a disagreement 1084 may comprise or include, by way of example but not limitation, at least one dispute 1084D, at least one repudiation 1084R, some combination thereof, or so forth. However, a disagreement (e.g., dispute or repudiation) handling mechanism may additionally or alternatively be realized, established, implemented, or a combination thereof, etc. at least partially separately from a guaranty transaction marketplace 1040. For certain example implementations, a disagreement 1084 may arise between or among a user 1002 (e.g., of FIGS. 1G and 1H), a merchant 1012 (e.g., of FIG. 1C), a financier 1034 or 1108 (e.g., of FIG. 1E or 1F), or a combination thereof, etc. with respect to an aspect of a product transaction 1018 (e.g., of FIG. 1B), including but not limited to an agreed-upon valuation, a quality of product in absolute terms, a quality of product relative to merchant representations, a quantity of product, whether or how payment was made or was to be made, delivery timing or location or mechanism, actual involvement of a user in a transaction, a user request for or approval of a transaction, some combination thereof, or so forth. For certain example implementations, a dispute 1084D may relate to a disagreement between at least a customer 1002 or a vendor 1012 as to cost, quality, quantity, delivery, or a combination thereof, etc. of a product 1016 (e.g., of FIG. 1B) if a customer 1002 agrees that a product transaction is or was intended. For certain example implementations, a repudiation 1084R may relate to a disagreement between or among at least a user 1002, a vendor 1012, or a financier 1034 with respect to an alleged product transaction 1018 if a user 1002 disagrees that he or she ever entered into or approved the alleged product transaction.

For certain example embodiments, a guarantor 1062 may be, as part of an obligation arising from at least one guaranty 1054 (e.g., of FIG. 1P), at least partially responsible for handling at least one disagreement 1084, including but not limited to at least one dispute 1084D or at least one repudiation 1084R. A server device 1060 of a guarantor 1062 (e.g., of FIG. 1J, 1K, or 1L) may interact with, for example, a server device 1036 of a financier 1034 (e.g., of FIG. 1E), a payment authorization apparatus 1014 of a merchant 1012 (e.g. of FIG. 1C), a mobile device 1004 of a user 1002 (e.g., of FIG. 1G, 1H, or 1M), a server device 1124 of a background information possessor 1126 (e.g., of FIG. 1G), some combination thereof, or so forth. One or more manual or automated processes may be utilized to investigate (e.g., in an attempt to corroborate, verify, refute, disprove, or a combination thereof, etc.) at least one assertion by a user 1002, a merchant 1012, a financier 1034, some combination thereof, or so forth.

With reference to FIG. 1K, a transaction marketplace response (TMR) 1064 is shown in relation to a bi-directional arrow between a guaranty transaction marketplace 1040 (e.g., of FIG. 1I or 1J) and a server device 1036 of a financier 1034 (e.g., of FIG. 1E). For certain example embodiments, a TMR 1064 may be returned by, from, via, using, or a combination thereof, etc. a guaranty transaction marketplace 1040 to a financier 1034, such as in response to a transaction marketplace submission (TMS) 1038. For certain example implementations, as indicated at a blurb 2014, a TMR 1064 may be accepted by a server device 1036 of a financier 1034 via a return message, an API output, some combination thereof, or so forth. For a described example, a TMR 1064 may include an affirmative indication that a guaranty transaction 1068 is established that at least references a guaranty 1054. For certain example implementations, as indicated at a blurb 2016, a TMR 1064 may comprise or include: (1) at least one negotiated guaranty transaction 1068 (e.g., of FIG. 1P), (2) at least one confirmation (e.g., a verification or a refutation of data submitted by a financier), (3) at least some information (e.g., an answer to a submitted inquiry), (4) at least one payment (e.g., a funds transfer or evidence thereof), some combination thereof, or so forth.

With reference to FIGS. 1E, 1D, and 1C, a financier 1034 (e.g., of FIG. 1E) may communicate at least one authorization answer 1086 (e.g., of FIG. 1D) to a merchant 1012 (e.g., FIG. 1C). For example, a server device 1036 of a financier 1034 may send an authorization answer 1086 to a payment authorization apparatus 1014 of a merchant 1012. For certain example implementations, an authorization answer 1086 may comprise or include one or more transaction characteristics 1026 for a product transaction 1018, such as at least a product transaction identification; an affirmative or negative indication with respect to approval; an instruction to secure at least one additional form of identification from a customer 1002; a description of one or more terms 1070 of a guaranty transaction 1068 (e.g., of FIG. 1P); some combination thereof; or so forth. At least if an affirmative indication is sent via an authorization answer 1086, a product transaction 1018 (e.g., of FIG. 1B) may be consummated, or a merchant 1012 may consider a bill of a customer 1002 to be paid or otherwise covered.

With reference to FIGS. 1C and 1I, for certain example implementations, as indicated by a blurb 2018, a merchant/vendor 1012 may "bypass" a financier, such as a credit card company, or interact "directly" with at least one guaranty transaction marketplace 1040. For example, a merchant/vendor 1012 may provide (e.g., inject) at least one TMS 1038 or accept (e.g., extract) at least one TMR 1064 to or from at least one guaranty transaction marketplace 1040 to thereby attempt to secure at least one guaranty 1054 (e.g., of FIG. 1J) from a guarantor 1062 (e.g., of FIG. 1J, 1K, or 1L) without relying on a financier 1034 (e.g., of FIG. 1E) as an intermediary or to thereby attempt to provide at least one guaranty 1054 as a guarantor (e.g., as also depicted in FIG. 1L).

With reference to FIGS. 1H and 1I, for certain example implementations, as indicated by a blurb 2020, a user/customer 1002 may "bypass" a financier, such as a credit card company, or interact "directly" with at least one guaranty transaction marketplace 1040. For example, at least one operating system (OS) or at least one application of a mobile device 1004 may provide (e.g., inject) at least one TMS 1038 or accept (e.g., extract) at least one TMR 1064 to or from at least one guaranty transaction marketplace 1040 to thereby attempt to secure a guaranty 1054 (e.g., of FIG. 1J) from a guarantor 1062 (e.g., of FIG. 1J, 1K, or 1L) without relying on a financier 1034 (e.g., of FIG. 1E) as an intermediary. A guaranty 1054 may be presented (e.g., displayed, sent wirelessly, transferred, or a combination thereof, etc.) to a merchant/vendor 1012 to facilitate consummation of a product transaction 1018 via a mobile device 1004 or separately therefrom.

With reference to FIGS. 1H, 1I, and 1J, for certain example implementations, as indicated by a blurb 2022, a user/customer 1002 may "directly" interact with at least one guarantor 1062, such as a pre-positioned data possessor 1062PP (e.g., of FIG. 1J), without using a guaranty transaction marketplace 1040 as an intermediary. For example, a user 1002 may pre-notify a would-be guarantor 1062, such as a pre-positioned data possessor 1062PP, of a likely activity or purchase by sending pre-notification data 1088 (e.g., which may include a category, an item identifier, a location, a store, a maximum monetary value, a timing, or a combination thereof, etc.) from a mobile device 1004 (or another device) to a server device 1060 of a pre-positioned data possessor 1062PP as at least one message 1044 via at least one network 1042. In exchange for an opportunity to provide a guaranty 1054 or to collect a fee 1072 (e.g., of FIG. 1P) with likely lowered risk, a pre-positioned data possessor 1062PP may agree to provide a guaranty 1054 if or when a financier 1034 submits a corresponding proffered guaranty transaction 1050 to a guaranty transaction marketplace 1040. At times, a user 1002 may be unable to pre-notify a guarantor 1062 due to planning or scheduling constraints or may be unable to ascertain a guarantor willing to take on the risk or hassle of a pre-notification agreement. For such times, by way of example only, a data stream associated with a user 1002 may be tapped by one or more potential guarantors 1062 (e.g., of FIG. 1J, 1K, or 1L) in order to obtain corroborating evidence for at least one transaction characteristic 1026.

With reference to FIG. 1S, 1T, 1U, 1V, 1W, or 1X, an example data stream 1090 is depicted by a pipe shape or a bi-directional arrow that each extend from FIG. 1S across FIGS. 1T-1W to FIG. 1X. As illustrated, a data stream 1090 may include, provide access to, organize, funnel, or a combination thereof, etc. data across different spatial regions (e.g., as a mobile device travels), across different temporal periods (e.g., as time elapses), across different network or cloud zones (e.g., search, mapping or navigation, social networks, picture sharing, data storage, or a combination thereof, etc.), across different categories (e.g., family, work interests, hobbies, entertainment, or a combination thereof, etc.), some combination thereof, or so forth. For certain example embodiments, one or more potential guarantors 1062 (e.g., of FIG. 1J, 1K, or 1L) may access a data stream 1090 continuously, intermittently, at regular intervals, irregularly, randomly, in response to a stimulus, as new data is added, on-demand (e.g., to attempt to secure corroborating evidence to match a proffered guaranty transaction), in a push manner, in a pull manner, some combination thereof, or so forth.

For certain example implementations, at least one data stream 1090 may include data from multiple different data stream environments 1092 (not explicitly shown separately). Example data stream environments 1092 may comprise or include, but are not limited to, at least one mobile device environment 1092M, at least one internet environment 1092I, at least one wireless network environment 1092W, some combination thereof, or so forth. For certain example implementations, at least one data stream 1090 may include mobile device data 1094, cloud data 1096, mobile service data 1098, some combination thereof, or so forth. By way of example but not limitation, cloud data 1096 may include social network data 1096SN. For certain example implementations, mobile device data 1094 may be obtained via at least one mobile device environment 1092M; cloud data 1096 may be obtained via at least one internet environment 1092I; and mobile service data 1098 may be obtained via at least one wireless network environment 1092W. By way of example but not limitation, mobile device data 1094 may comprise or include data that is detected at a mobile device from a sensor (e.g., an inertial measurement unit (IMU), a satellite positioning system (SPS) unit, a radio, a camera, a magnetometer, or a combination thereof, etc.) or a user input feature (e.g., a touchscreen, a keyboard, a microphone, a camera, or a combination thereof, etc.), such as SPS coordinates, radio signals, keyboard input, user motions, some combination thereof, or so forth. By way of example but not limitation, cloud data 1096 may comprise or include data that is sent over or stored at a cloud-based server or service, such as social network data, search data, remotely-accessed media, app data, some combination thereof, or so forth. By way of example but not limitation, social network data 1096SN may comprise or include data sent to or received from at least one social network (e.g., Facebook, Google+, LinkedIn, MySpace, Pinterest, Classmates[dot]com, Foursquare, Orkut, Twitter, Flickr, Instagram, or a combination thereof, etc.), such as a public or private message, a posting, text, a link, an image, a tweet, some combination thereof, or so forth. By way of example but not limitation, mobile service data 1098 may comprise or include data that may be obtained by a wireless service provider from network infrastructure information or by providing a conduit to the internet, such as a location from trilateration using multiple cell towers, dialed or texted numbers, plain text wireless communications, detected internet communications, some combination thereof, or so forth.

With reference to FIG. 1K or 1Q, a guarantor server device 1060 for a social network 1062SN or a guarantor server device 1060 for a data possessor 1062DP may be capable of interacting with a guaranty transaction marketplace 1040 (e.g., of FIG. 1I or 1J) by providing or accepting a TMS 1038 or a TMR 1064 (e.g., of FIG. 1J). For certain example embodiments, a guarantor server device 1060 for a social network 1062SN or a guarantor server device 1060 for a data possessor 1062DP may be capable of interacting with (e.g., tapping into) at least one data stream 1090 (e.g., of FIGS. 1S-1X). For certain example implementations, as indicated by a blurb 2024, a potential guarantor 1062 (e.g., a social network guarantor 1062SN, a data possessor guarantor 1062DP, or a combination thereof, etc.) may obtain one or more indicia to potentially corroborate at least one transaction characteristic by tapping into a flow of data stream 1090, such as with at least occasional monitoring, with at least intermittent monitoring, with at least regular or periodic monitoring, with monitoring responsive to triggering events, with on-demand monitoring (e.g., if a proffered guaranty transaction 1050 is injected into a guaranty transaction marketplace 1040), with direct interrogation of a mobile device associated with a data stream 1090, some combination thereof, or so forth. By way of example but not limitation, a social network guarantor 1062SN may be capable of accessing social network data 1096SN as indicated by a line depicted there between. By way of example but not limitation, a data possessor 1062DP may be capable of accessing cloud data 1096 or mobile service data 1094 as indicated by at least one line depicted there between (or including a transition oval labeled "A" between FIGS. 1Q and 1T).

With reference to FIG. 1R, a server device 1100 for a data provider 1102 is illustrated. For certain example embodiments, a data provider 1102—such as a wireless service provider, a data amalgamator like a research or marketing company, a retail company, an internet company, or a cloud services company—may furnish data to a potential guarantor 1062. Although a line is explicitly depicted between a data provider 1102 (e.g., of FIG. 1R) and a data possessor 1062DP (e.g., of FIG. 1K), other types of potential guarantors 1062 (e.g., a social network 1062SN (e.g., of FIG. 1K), a wireless service provider 1062WS (e.g. of FIG. 1L), a merchant/vendor 1012 (e.g., of FIG. 1L), or a combination thereof, etc.) may additionally or alternatively obtain one or more potentially corroborating indicia from a server device 1100 of a data provider 1102. For certain example implementations, as indicated at a blurb 2026, a data provider 1102 operating a server device 1100, such as wireless service provider having one or more estimated locations derived from trilateration, may provide location or other data to a data possessor 1062DP who is attempting or planning to provide a guaranty 1054 (e.g., of FIG. 1J) for a product transaction 1018 (e.g., of FIG. 1B).

With reference to FIG. 1L or 1R, a guarantor server device 1060 for a wireless service provider 1062WS may be capable of interacting with a guaranty transaction marketplace 1040 (e.g., of FIG. 1I or 1J) by providing or accepting a TMS 1038 or a TMR 1064 (e.g., of FIG. 1J). For certain example embodiments, a guarantor server device 1060 for a wireless service provider 1062WS may be capable of interacting with (e.g., tapping into) at least one data stream 1090 (e.g., of FIGS. 1S-1X). For certain example implementations, a guarantor server device 1060 of a wireless service provider 1062WS may obtain one or more indicia to potentially corroborate at least one transaction characteristic by tapping into a flow of data stream 1090, such as with at least occasional monitoring, with at least intermittent monitoring, with at least regular or periodic monitoring, with monitoring responsive to triggering events, with on-demand monitoring (e.g., if a proffered guaranty transaction 1050 is injected into a guaranty transaction marketplace 1040), with direct interrogation of a mobile device associated with a data stream 1090, via interrogation of or data collection from one or more network elements 1104 (e.g., of FIG. 1R), some combination thereof, or so forth. By way of example but not limitation, a wireless service provider 1062WS may be capable of accessing mobile service data 1098 (e.g., of FIG. 1W or 1X) as indicated by a line depicted there between, may be capable of communicating with one or more network elements 1104 as indicated by a line depicted there between, some combination thereof, or so forth. For certain example implementations, as indicated by a blurb 2028, a network element 1104 may comprise or include an antenna, a base station (BS), an access point (AP), a base transceiver station (BTS), a node B, a mobile switching center (MSC), a home location register (HLR), a gateway (Gw), a gateway switching center, a base station subsystem (BSS), a base station controller (BSC), a network management system node, a media gateway (MGw), a visitor location register (VLR), some combination thereof, or so forth.

For certain example embodiments, at least one network element 1104 may directly or indirectly communicate with at least one mobile device 1004 via at least one wireless link 1110, with or without one or more wireline or wired links (not explicitly shown) over at least one network, such as a wired portion or implementation of a network 1042 (e.g., of FIG. 1I or 1N). For certain example implementations, one or more network elements 1104 may forward or otherwise provide at least a portion of data that propagates to or from, that traverses, that is stored at or by, or a combination thereof, etc. at least one network element 1104 to a wireless service provider 1062WS, may forward or otherwise provide location data to a wireless service provider 1062WS, some combination thereof, or so forth. Location data may comprise or include, by way of example but not limitation, a current cell identification, a location estimated from one or more base stations (e.g., trilateration), at least one estimated range from a network element 1104 to a mobile device 1004, at least one signal strength or signal delay time with respect to a mobile device 1004, one or more satellite positioning system (SPS) coordinates, a block or neighborhood identification, a city identification, a region derived from communication with at least one fixed antenna, a history of any of the above, some combination thereof, or so forth.

With reference to FIG. 1L, a guarantor server device 1060 for a merchant/vendor 1012 may be capable of interacting with a guaranty transaction marketplace 1040 (e.g., of FIG. 1I or 1J) by providing or accepting a TMS 1038 or a TMR 1064 (e.g., of FIG. 1J). For certain example embodiments, although not explicitly shown (e.g., no line is depicted), a guarantor server device 1060 for a merchant/vendor 1012 may be capable of interacting with (e.g., tapping into) at least one data stream 1090 (e.g., of FIGS. 1S-1X). Additionally or alternatively, a merchant/vendor 1012 may obtain at least one corroborating indicium from another source, including but not limited to a detected presence of a user/customer 1002 on premises of a merchant/vendor 1012 (e.g., if a same merchant/vendor 1012) (e.g., via personal knowledge of a store associate, electronic facial recognition of a customer 1002, known recurring behavior of a customer, or a combination thereof, etc.), local interaction with a mobile device 1004 of a user/customer 1002, some combination thereof, or so forth. A guarantor server device 1060 for a merchant/vendor 1012 may comprise or include at least part of a payment authorization apparatus 1014 (e.g., of FIG. 1C), or vice versa.

With reference to FIG. 1F, a server device 1106 for a combined financier and guarantor 1108 may be operated to provide at least one payment or guaranty. For certain example embodiments, a combined financier and guarantor 1108 (e.g., a combined funding source and wireless service provider) may function as a financier 1034 (e.g., of FIG. 1E) that interacts with a transaction guaranty marketplace 1040 (e.g., of FIGS. 1I and 1J), may function as guarantor 1062 (e.g., of FIG. 1J) that interacts with a transaction guaranty marketplace 1040, may function as a financier and guarantor that at least selectively bypasses a transaction guaranty marketplace 1040, some combination thereof, or so forth. For certain example implementations, a server device 1106 of a combined financier and guarantor 1108 may receive an authorization request 1032 (e.g., of FIG. 1D), which at least references one or more transaction characteristics 1026, from a payment authorization apparatus 1014 (e.g., of FIG. 1C), which may be located at a point of sale (POS) of a merchant/vendor 1012 (e.g., of FIG. 1C). A combined financier and guarantor 1108 may obtain one or more indicia that corroborate at least one transaction characteristic 1026, such as from at least one data stream 1090 (e.g., of FIGS. 1S-1X) (not explicitly depicted), from at least one network element 1104 (e.g., of FIG. 1R) as indicated by a line depicted there between (e.g., a line also extending across FIG. 1L), some combination thereof, or so forth. If, for example, at least one corroborating indicium is obtained, a server device 1106 of a combined financier and guarantor 1108 may send an affirmative authorization answer 1086 (e.g., of FIG. 1D) to a payment authorization apparatus 1014 of a merchant/vendor 1012.

With reference to FIGS. 1F and 1R, for certain example implementations, as indicated by a blurb 2030, an entity providing calling capabilities or wireless internet service (e.g., cellular broadband) to a mobile device 1004 may make a decision with respect to at least one credit transaction or other product transaction 1018 (e.g., of FIG. 1B) based at least partially on information obtained via the mobile device (e.g., a mobile-device-determined location of the mobile device, a network-determined location of a mobile device, one or more websites visited using the mobile device, one or more people or stores contacted using the mobile device, or a combination thereof, etc.). By way of example only, a combined financier and guarantor 1108 (e.g., a combined funding source and wireless service provider) may make a payment to a merchant/vendor 1012 (e.g., of FIG. 1C) or authorize a product transaction 1018 on behalf of a user/customer 1002 (e.g., directly without involving a credit card company or bank of the user), may provide a guaranty to a merchant/vendor 1012 (e.g., without involving a credit card company or bank of the user or without utilizing a guaranty transaction marketplace), some combination thereof, or so forth. For certain example implementations, as indicated by a blurb 2032, an end-user license, a privacy policy explanation, a privacy policy delivery, or a combination thereof, etc. may be provided to a mobile device 1004 or accepted by a user via a mobile device 1004 (or via another device) with the license or policy pertaining to incorporating (e.g., utilizing, referring to, at least partially basing on, or a combination thereof, etc.) user data—including but not limited to location information or other information via at least one data stream—into at least one product transaction authorization decision, such as a credit or other financial decision. Upon acknowledgment or acceptance of a policy or a license or an agreement by an end-user, a combined financier and guarantor 1108 may approve or agree to finance product transactions based at least partially on one or more corroborating indicia obtained via at least one data stream 1090 (e.g., of FIGS. 1S-1X), including but not limited to privately-obtained information.

With reference to FIG. 1M, a user/customer 1002 and a mobile device 1004 are illustrated. For certain example embodiments, a mobile device 1004 may include at least one operating system 1112, at least one application 1114, some combination thereof, or so forth. By way of example but not limitation, an operating system 1112 (i) may exist between a BIOS and one or more applications 1114, (ii) may control access to or orchestrate use of one or more hardware features of a mobile device 1004, (iii) may manage or arbitrate access to system resources, (iv) some combination thereof, or so forth. An operating system 1112 may additionally or alternatively provide one or more features for a mobile device 1004. Examples of an operating system may include, but are not limited to, a Google or open-source Android operating system, a Microsoft Windows operating system (e.g., phone, tablet, notebook, desktop, or a combination thereof, etc.), a Google Chrome operating system, an Amazon Fire operating system, an Apple iOS operating system, an Apple MAC OS X operating system, a Ubuntu operating system, a Linux operating system, a UNIX operating system, a Samsung Bada or Tizen operating system, a derivative of any of the above, some combination thereof (including but not limited to a dual-boot environment), or so forth. By way of example but not limitation, an application 1114 may execute on top of an operating system or provide specialized capabilities to a user by programming a processor or further reconfiguring circuits of a mobile device. Examples of an application may include, but are not limited to, a program, executable code, a native application, a web application, a mobile cloud app, a hybrid application, a compiled application, a just-in-time (JIT) compiling set of instructions, an interpreted language application, a downloaded app, an installed app, one or more instructions, some combination thereof, or so forth.

For certain example embodiments, a mobile device 1004 may make one or more observations 1116 under control of at least one operating system 1112 or at least one application 1114. Observations 1116 may be made substantially continuously (e.g., at a rate that an input component is capable of operating), intermittently, at regular intervals, irregularly, randomly, in response to a stimulus, on-demand (e.g., in response to an inquiry received, such as from a potential guarantor 1062), when an app is accessed, in accordance with a geofence, in accordance with a schedule, some combination thereof, or so forth. For certain example implementations, an observation 1116 may comprise or include observations of user input 1116U, observations of sensor detection 1116S, some combination thereof, or so forth. By way of example but not limitation, a user input observation 1116U may comprise or include data acquired (e.g., detected) as a result of keyboard (e.g., physical or virtual) input, other touch input, microphone input, gesture or eye movement input, shaking or twisting input, some combination thereof, or so forth. Data of a user input observation 1116U may comprise or include, for example, spoken or typed words, websites visited, social network members interacted with, social network posts made or presented (e.g., viewed, played, read, or a combination thereof, etc.), people contacted, search terms, some combination thereof, or so forth. By way of example but not limitation, a sensor detection observation 1116S may comprise or include data acquired as a result of a satellite positioning system (SPS) unit, a radio or transceiver, a camera, a microphone, a touchscreen, an inertial measurement unit (IMU)—such as an accelerometer, a gyroscope, a compass, or a combination thereof, etc.—, a thermometer, some combination thereof, or so forth. Data of a sensor detection observation 1116S may comprise or include, for example, an SPS coordinate, a Wi-Fi service set identifier (SSID), a gravitational direction, an acceleration magnitude or direction, a velocity, a sound file, a photographic image, some combination thereof, or so forth.

For certain example implementations, one or more observations 1116 that are acquired by a mobile device 1004 may be provided (e.g., forwarded, propagated, or a combination thereof, etc.) to at least one data stream 1090 (e.g., of FIGS. 1S-1X) as indicated by arrow 1118. By way of example but not limitation, as indicated at a blurb 2034, a mobile device 1004 may provide one or more observations 1116 to a data stream 1090 (e.g., sua sponte, as part of a standard operation for implementing a communication or other function, as per a guarantor-associated application or operating system, as part of an unassociated application or operating system, in response to a specific interrogation from a guarantor, etc.). For example, a mobile device may provide GPS coordinates in a context of executing a navigational application or implementing an operating system feature. As another example, a mobile device may provide (i) search terms or (ii) social network exchanges in a context of executing (i) a browser capability or a search application or (ii) a browser capability or a social network application, respectively. Although a potential guarantor 1062 may obtain corroborating indicia from a data stream 1090, it may additionally or alternatively obtain at least one corroborating indicium via at least one interrogation of a mobile device.

With reference to FIG. 1M or 1N, an example interrogation scenario is illustrated. For certain example embodiments, at least one guarantor server device 1060 may communicate with at least one mobile device 1004 using one or more messages 1044 via at least one network 1042 as indicated by a line depicted there between (e.g., across FIGS. 1M and 1N). By way of example but not limitation, a guarantor service device 1060 may correspond to at least one pre-positioned data possessor 1062PP (e.g., of FIG. 1J), at least one social network 1062SN (e.g., of FIG. 1K), at least one data possessor 1062DP (e.g., of FIG. 1K), at least one wireless service provider 1062WS (e.g., of FIG. 1L), at least one merchant/vendor 1012 (e.g., of FIG. 1L), some combination thereof, or so forth (e.g., including a combined financier and guarantor 1108 (e.g., of FIG. 1F) or a data provider 1102 (e.g., of FIG. 1R)). For certain example implementations, a guarantor server device 1060 may send an inquiry 1120 to a mobile device 1004, including but not limited to if or as a result of receiving notification of an existence of a proffered guaranty transaction 1050 (e.g., of FIG. 1I). By way of example but not limitation, an inquiry 1120 may request at least one observation 1116, such as a (e.g., contemporaneous, past, historical trend, or a combination thereof, etc.) of a user input observation 1116U or a sensor detection observation 1116S. For example, one or more SPS coordinates, a current photo of a current user 1002, an answer to a question based on a recent social network posting, a password or code, an answer to a question based on a last five recent email interactions, an identification of a location of another mobile device associated with a user/customer 1002 that is associated with a mobile device 1004 receiving an inquiry 1120, a listing of currently-detectable SSIDs, or a combination thereof, etc. may be requested.

For certain example implementations, a mobile device 1004, such as an operating system 1112 or an application 1114 thereof, may obtain requested data in response to an inquiry 1120 using, for example, at least one user input observation 1116U, at least one sensor detection observation 1116S, some combination thereof, or so forth. By way of example but not limitation, an answer to an inquiry 1120 may be returned from a mobile device 1004 to a server device 1060 as at least one inquiry response 1122. For certain example implementations, an inquiry 1120 or an inquiry response 1122 may additionally or alternatively be accomplished using one or more protocols, mechanisms, communication avenues, or a combination thereof, etc. that are available as part of a data stream 1090 (e.g., of FIGS. 1S-1X).

For certain example implementations, as indicated at a blurb 2036, a guarantor 1062 (e.g., of FIG. 1J, 1K, or 1L) may send at least one inquiry 1120 to interrogate at least one mobile device 1004. An interrogation may be initiated, for example, intermittently, at regular intervals, in response to at least one stimulus, in response to at least one trigger—such as a discovery of a proffered guaranty transaction 1050 (e.g., of FIG. 1I) at a guaranty transaction marketplace 1040 (e.g., of FIG. 1I or 1J), on-demand (e.g., in real-time), randomly, some combination thereof, or so forth. By way of example but not limitation, as indicated at a blurb 2038, a mobile device 1004 may send an inquiry response 1122 to a server device 1060 as at least one message 1044 via at least one network 1042. An application 1114 or an operating system 1112 may send a response to an inquiry 1120—such as an inquiry response 1122—with or without a user's input or with or without a user's at least contemporaneous knowledge or permission.

With reference to FIG. 1G, a server device 1124 for a background check provider and a background information possessor 1126 are illustrated. For certain example embodiments, a background information possessor 1126 may be capable of providing, responsible for providing, or adapted to provide information that may be relevant to a guaranty transaction marketplace 1040 (e.g., of FIGS. 1I and 1J). For example, a background information possessor 1126 may provide information on a user/customer 1002 that is signing up to participate in a transaction guaranty marketplace 1040 (i) directly (e.g., with a market maker 1058 (e.g., of FIG. 1I)) or (ii) through a financier 1034 (e.g., a bank or credit card company) (e.g., of FIG. 1E) or a potential guarantor 1062 (e.g., a potential guarantor 1108, 1062PP, 1062SN, 1062DP, 1062WS, or 1012 of FIG. 1F, 1J, 1K, or 1L); may provide information on a user/customer 1002 that is having a disagreement 1084 (e.g., of FIG. 1Q)—such as a dispute 1084D or a repudiation 1084R; may provide information on a merchant/vendor 1012 that is to participate in a guaranty transaction marketplace 1040 or is involved in a disagreement 1084; some combination thereof; or so forth. For certain example implementations, a background information possessor 1126 may have access to information or may commission efforts to acquire information that evidences a veracity or a falsehood of an assertion by a user/customer 1002, of an assertion by a merchant/vendor 1012 (e.g., of FIG. 1C), of a transaction characteristic 1026 (of FIG. 1B), some combination thereof, or so forth. For example, a background information possessor 1126 may investigate an assertion that a mobile device was stolen by researching police reports or verifying that a replacement mobile device was purchased or activated with a mobile service provider. As another example, a background information possessor 1126 may communicate with alleged witnesses evidencing a location of a user 1002 at a time of a product transaction 1018.

For certain example implementations, at least one background check provider server device 1124 may communicate with one or more of a guarantor server device 1060 (e.g., of FIG. 1J, 1K, or 1L), a financier server device 1036 (e.g., of FIG. 1E), a financier and guarantor server device 1106 (e.g., of FIG. 1F), a payment authorization apparatus 1014 (e.g., of FIG. 1C), a data provider server device 1100 (e.g., of FIG. 1R), a data stream 1090 (e.g., of FIGS. 1S-1X), or a combination thereof, etc. using at least one message 1044 via at least one network 1042 (e.g., of FIG. 1I) as indicated by a line extending there between (e.g., from FIG. 1G, across FIG. 1H, and to FIG. 1I). By way of example but not limitation, as indicated at a blurb 2040, a background check provider may discover evidence supporting or conflicting with an assertion by an alleged user/customer 1002 to have been in city "A" when a charge using a payment tool 1008 (e.g., of FIG. 1H) was made from city "B", which is located in a different state from city "A". For certain example implementations, a background information possessor 1126 may have access to credit history, to governmental records, to travel records (e.g., airport flight or security information, airline data, hotel information, or a combination thereof, etc.), some combination thereof, or so forth.

With reference to FIG. 1G, a device 1500 is shown. As illustrated, a device 1500 may include at least one or more of any of the following: at least one processor 1502, at least one medium 1504, at least one communication interface 1506, at least some circuitry 1508, some combination of thereof, or so forth. As further illustrated, a medium 1504 may comprise or include at least some instructions 1510. By way of example but not limitation, a device 1500 may comprise or include at least one mobile device 1004 (e.g., of FIG. 1G, 1H, 1M, or 1R); at least one payment authorization apparatus 1014 (e.g., of FIG. 1C); at least one server device 1036 (e.g., of FIG. 1E), 1106 (e.g., of FIG. 1F), 1124 (e.g., of FIG. 1G), 1056 (e.g., of FIG. 1I), 1060 (e.g., of FIG. 1J, 1K, 1L, or 1N), 1100 (e.g., of FIG. 1R); or so forth. However, a device 1500 may alternatively include more, fewer, or different component(s) from those that are illustrated without departing from claimed subject matter.

For certain example embodiments, a device 1500 may include or comprise at least one electronic device. A device 1500 may include, for example, a computing platform or any electronic device having at least one processor or memory. A processor 1502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, one or more processing cores, discrete/fixed logic circuitry, controllers, micro-controllers, microprocessors, some combination thereof, or so forth. A medium 1504 may bear, store, contain, include, provide access to, or a combination thereof, etc. one or more instructions 1510, which may be executable by a processor 1502. Instructions 1510 may include or comprise or facilitate implementation of, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. A medium 1504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions or data.

For certain example embodiments, execution of instructions 1510 by one or more processors 1502 may transform at least a portion of at least one device 1500 into a special-purpose computing device, apparatus, platform, machine, some combination thereof, or so forth. Instructions 1510 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings.

For certain example embodiments, circuitry 1508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 1508 includes at least one physical or hardware component or aspect. By way of example only, circuitry 1508 may be formed if one or more instructions 1510 configure or reconfigure at least one processor 1502 to enable at least one processor 1502 to perform one or more operations during execution of one or more instructions 1510.

For certain example embodiments, one or more communication interfaces 1506 may provide one or more interfaces between device 1500 and another device or a person/operator/entity directly or indirectly. With respect to a person/operator, a communication interface 1506 may include, by way of example but not limitation, a screen, a speaker, a keyboard or keys, a microphone, a camera, or other person-device input/output apparatuses. A wireless communication interface or a wired communication interface may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, an infrared port, an Internet or telecommunications backbone connector, a fiber optic connector, a storage area network (SAN) connector, a local area network (LAN) connector, or a combination thereof, etc. to communicate wireless signals or wired signals via one or more wireless communication links or wired communication links, respectively, such as over at least one communication channel. Communications with at least one communication interface 1506 may enable transmitting, receiving, or initiating of transmissions, just to name a few examples.

For certain example embodiments, at least one power source (not explicitly shown) may provide power to one or more components of a device 1500. A power source may include, by way of example but not limitation, at least one battery, at least one power connector for a wall socket, at least one solar power source, at least one solar-powered charger, a mechanical power source or charger, a fuel source or cell, a power connector for accessing an electrical grid, some combination thereof, or so forth. For certain example embodiments, at least one sensor (not explicitly shown) may sense, produce, or otherwise provide at least one sensor value. A sensor may include, by way of example only, a camera, a microphone, an accelerometer, a thermometer, a satellite positioning system (SPS) sensor, a barometer, a humidity sensor, a compass, an altimeter, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor may include, by way of example but not limitation, an image/video, a sound recording, an acceleration value, a temperature, one or more SPS coordinates, a barometric pressure, a humidity level, a compass direction, an altitude, a gyroscopic value, a magnetic reading, a pressure value, an oscillation value, an ambient light reading, inertial readings, touch detections, finger placements, flex detections, some combination thereof, or so forth.

With respect to certain example embodiments, an example applicable scenario is described with reference to multiple example annotations 2502 to 2538, which annotations are depicted by curly brackets or braces (e.g., "{ }") in FIGS. 1B-1X. However, other scenarios may alternatively or additionally be applicable. For an example annotation 2502 (e.g., of FIG. 1G), an (e.g., end) user 1002 named Sam may travel from one location to another—such as from one city or country to another city or country—carrying at least one mobile device 1004. For an example annotation 2504 (e.g., of FIG. 1H), user Sam may engage with a merchant 1012 (e.g., of FIG. 1C)—such as one that is at least affiliated with a restaurant called Sushi Sensation—to purchase a product 1016 (e.g., of FIG. 1B)—such as a meal—using a payment tool 1008—such as a credit card 1010, like a Mercury Credit Card.

For an example annotation 2506 (e.g., of FIG. 1C), a merchant 1012, which may be or may have a restaurant called Sushi Sensation that is located in a business district of Tokyo, Japan, is famous for its sushi. Sushi Sensation may provide a meal to Sam and seven (7) guests and may acknowledge Sam's attempt to pay for the meal with the Mercury Credit Card. For an example annotation 2508 (e.g., of FIG. 1D), the Tokyo sushi restaurant merchant of Sushi Sensation may send at least one authorization request 1032 to a Mercury Bank with one or more transaction characteristics 1026 of a product transaction 1018 (e.g., both of FIG. 1B)—such as an account name for Sam, an account number, an identity of the Sushi Sensation merchant or company thereof, a valuation of the transaction 1024 (e.g., of FIG. 1B), a location of the transaction 1028 (e.g., of FIG. 1B), a transaction identification, some combination thereof, or so forth.

For an example annotation 2510 (e.g., of FIG. 1E), Mercury Bank, as an example of a financier 1034, may experience (e.g., create, have, generate, receive, or a combination thereof, etc.) a fraud alert because a transaction for Sam's account was approved only eight (8) hours previously but over 1000 miles away in a different city and county (e.g., Shanghai, China). For an example annotation 2512 (e.g., of FIG. 1E), Mercury Bank injects a transaction marketplace submission (TMS) 1038 (e.g., of FIG. 1K) into a guaranty transaction marketplace 1040 (e.g., of FIGS. 1I and 1J), with TMS 1038 at least referencing an identification of Sam, an identification of the Sushi Sensation restaurant, a Tokyo location of the restaurant, a transaction valuation 1024 (e.g., of FIG. 1B)—such as $874 USD, some combination thereof, or so forth.

For an example annotation 2514 (e.g., of FIG. 1J), a negotiation 1048 may commence using at least one application programming interface (API) 1046 (e.g., of FIG. 1I) that is present at a server of Mercury Bank's (e.g., a financier server device 1036 (e.g., of FIG. 1E)), that is present at a server (e.g., a guarantor server device 1060) of one or more guarantor's 1062, some combination thereof, or so forth. For an example annotation 2516 (e.g., of FIG. 1N), a TMS 1038a (e.g., of FIG. 1O) may be associated with at least one proffered guaranty transaction (PGT) 1050a that is to be matched to at least one proffered transaction characteristic 1052 (e.g., of FIG. 1J). For an example annotation 2518 (e.g., of FIG. 1O), one or more would-be guarantor(s) 1062 may submit one or more transaction marketplace responses (TMR) 1064 (e.g., of FIG. 1J) that may be associated with one or more potentially-matching proffered transaction characteristics (PTC) 1052 (e.g., of FIG. 1J).

For an example annotation 2520 (e.g., of FIG. 1N), a social network 1062SN (e.g., of FIG. 1K) has at least one indicium of Sam's intention to dine at Sushi Sensation specifically (or at least at a sushi restaurant generally) in accordance with at least one transaction characteristic of proffered guaranty transaction 1050a (e.g., of FIG. 1O), which at least one indicium may be obtained via at least one application 1114 (e.g., of FIG. 1M) of Sam's mobile device 1004, via searching/accessing/scraping a public or private portion of Sam's social network account or a social network contact (e.g., friend) thereof, some combination thereof, or so forth. By way of example only, an entry of a data stream 1090 (e.g., of FIGS. 1S-1X) is shown at an example annotation 2520A (e.g., of FIG. 1V) and is entitled "social network entry (e.g., a posting, a check-in, or a combination thereof, etc.) that includes a restaurant name" that is identified in at least one transaction characteristic.

For an example annotation 2522 (e.g., of FIG. 1N), an internet or other technology company has one or more indicia of Sam's presence at Sushi Sensation restaurant from one or more SPS coordinates received from an operating system 1112 (e.g., of FIG. 1M) (or a search-enabled application) of Sam's mobile device 1004 or one or more indicia of Sam's interest in eating sushi in a neighborhood of Sushi Sensation restaurant as per previously-entered search terms (e.g., using mobile device 1004 or a different device that is at typically or at least temporarily (e.g., via a login) associated with Sam). By way of example only, two entries of a data stream 1090 (e.g., of FIGS. 1S-1X) are shown at: (i) an example annotation 2522A (e.g., of FIG. 1T) and is entitled "SPS coordinates—as noted/reported by an operating system (OS) of a mobile device" or (ii) an example annotation 2522B (e.g., of FIG. 1U) and is entitled "search terms including 'sushi' and '<business district> of tokyo'".

For an example annotation 2524 (e.g., of FIG. 1N), a wireless telecommunication company has at least one indicium of Sam's presence at least near the Sushi Sensation restaurant in accordance with at least one transaction characteristic (e.g., vendor location 1028V (e.g., of FIG. 1B)), and potentially at least one indication of a path thereto, based at least partially on one or more cell towers contacted by Sam's mobile device 1004. By way of example only, an entry of a data stream 1090 (e.g., of FIGS. 1S-1X) is shown at an example annotation 2524A (e.g., of FIG. 1W) and is entitled "cell-tower based location indication".

For an example annotation 2526 (e.g., of FIG. 1P), Mercury Bank may negotiate 1048 with one or more would-be guarantors 1062 to extract one or more preferred terms 1070 (e.g., lower or lowest fee, quicker or quickest payment, acceptance of more risk or responsibility if Sam repudiates, willingness to share data with financier, or a combination thereof, etc.) for at least one guaranty transaction 1068. For an example annotation 2528 (e.g., of FIG. 1K), a transaction marketplace response (TMR) 1064 that is associated with a guaranty transaction 1068 (e.g., of FIG. 1P), which may include one or more terms 1070, such as a fee, a tracking identifier, payment evidence, a repudiation handling code, or a combination thereof, etc., may be output from a guaranty transaction marketplace 1040 (e.g., of FIGS. 1I and 1J), may be sent to financier Mercury Bank, some combination thereof, or so forth.

For an example annotation 2530 (e.g., of FIG. 1E), Mercury Bank may receive a TMR 1064 (e.g., of FIG. 1K) that is output from a guaranty transaction marketplace 1040 (e.g., of FIGS. 1I and 1J), that is produced from an API 1046, some combination thereof, or so forth. For an example annotation 2532 (e.g., of FIG. 1E), Mercury Bank may determine to approve a product transaction 1018 for a restaurant meal type of product 1016 based at least partially on at least one accepted TMR 1064, which may be associated with at least one guaranty 1054 (e.g., of FIG. 1J).

For an example annotation 2534 (e.g., of FIG. 1D), Mercury Bank may send an affirmative authorization answer 1086 to the Sushi Sensation restaurant merchant 1012 (e.g., of FIG. 1C). For an example annotation 2536 (e.g., of FIG. 1C), Sushi Sensation restaurant merchant 1012 may agree to accept Sam's payment tool 1008 (e.g., of FIG. 1H) as settlement of the sushi dinner for eight (8) diners responsive at least partly to receiving an affirmative authorization answer 1086 from Mercury Bank.

For an example annotation 2538 (e.g., of FIG. 1Q), a guarantor 1062 (e.g., a social network 1062SN, a data possessor 1062DP, a wireless service provider 1062WS, or a combination thereof, etc.) (e.g., of FIG. 1J, 1K, or 1L) may interact with a user 1002, a merchant 1012, a financier 1034, or a combination thereof, etc. to investigate at least one disagreement 1084 (e.g., at least one dispute 1084D, at least one repudiation 1084R, or a combination thereof, etc.). A guarantor 1062 may ensure that Sushi Sensation restaurant merchant 1012 is paid even given at least a repudiation 1084R by an alleged user/customer 1002 and possibly given a dispute 1084D between an admitted user/customer 1002 and a merchant/vendor 1012.

FIG. 2 is a schematic diagram 201 that includes at least one example device, such as a guarantor server device, that is capable of handling scenarios for guaranty provisioning via wireless service purveyance in accordance with certain example embodiments. As shown in FIG. 2, by way of example but not limitation, schematic diagram 201 depicts at least one device 200 that may include or comprise at least one guarantor server device 1060 (e.g., of FIG. 1L) of at least one wireless service provider 1062WS (e.g., of FIG. 1L). For certain example embodiments, schematic diagram 201 depicts at least one device 200 that may include at least one proffered guaranty transaction detection module (PGTDM) 202 or at least one guaranty proffering module (GPM) 204. Additionally or alternatively, schematic diagram 201 may include, by way of example but not limitation, at least one detection 206, at least one proffer 208, at least one proffered guaranty transaction 1050, at least one product transaction 1018, at least one guaranty 1054, or at least one wireless service data stream 1090WS. By way of example but not limitation, a proffered guaranty transaction detection module 202 or a guaranty proffering module 204 may include or comprise or be realized with at least one processor that executes instructions (e.g., sequentially, in parallel, at least partially overlapping in a time-multiplexed fashion on at least one core, at least partially distributed across multiple cores, or a combination thereof, etc.) as at least part of: at least one special-purpose computing component, at least one code-configured electronic system, at least one process-assembled machine, some combination thereof, or otherwise as described herein. However, claimed subject matter is not limited to any particular described embodiments, implementations, examples, or so forth.

For certain example embodiments, a proffered guaranty transaction detection module (PGTDM) 202 or a guaranty proffering module (GPM) 204 may be implemented separately or at least partially jointly or in combination with or by at least one device 200. For certain example implementations, a proffered guaranty transaction detection module 202 may be configured to detect (e.g., via at least one detection 206) at least one proffered guaranty transaction 1050 that is associated with at least one product transaction 1018. For certain example implementations, a guaranty proffering module 204 may be configured to proffer (e.g., via at least one proffer 208) at least one guaranty 1054 based at least partially on at least one wireless service data stream 1090WS. In addition to or in alternative to description herein with specific reference to FIG. 2, illustrated aspects of schematic diagram 201 may be relevant to example description herein below with particular reference to at least FIG. 4. However, claimed subject matter is not limited to any particular described embodiments, implementations, examples, or so forth.

FIGS. 3A-3D are schematic diagrams 300A-300D that include at least one example device and that depict example scenarios for guaranty provisioning via wireless service purveyance in accordance with certain example embodiments. As shown in FIGS. 3A-3D, by way of example but not limitation, one or more of schematic diagrams 300A-300D may include at least one device 200, at least one proffered guaranty transaction detection module (PGTDM) 202, at least one guaranty proffering module (GPM) 204, at least one proffered guaranty transaction 1050, at least one product transaction 1018, at least one guaranty 1054, or at least one wireless service data stream 1090WS. Each of schematic diagrams 300A-300D may include alternative or additional depictions, which may relate to guaranty provisioning via wireless service purveyance, as described herein. In addition to or in alternative to description herein below with specific reference to FIGS. 3A-3D, illustrated aspects of schematic diagrams 300A-300D may be relevant to example description with reference at least to any one or more of FIGS. 5A-5G. However, claimed subject matter is not limited to any particular described embodiments, implementations, examples, or so forth.

Figure 3A:
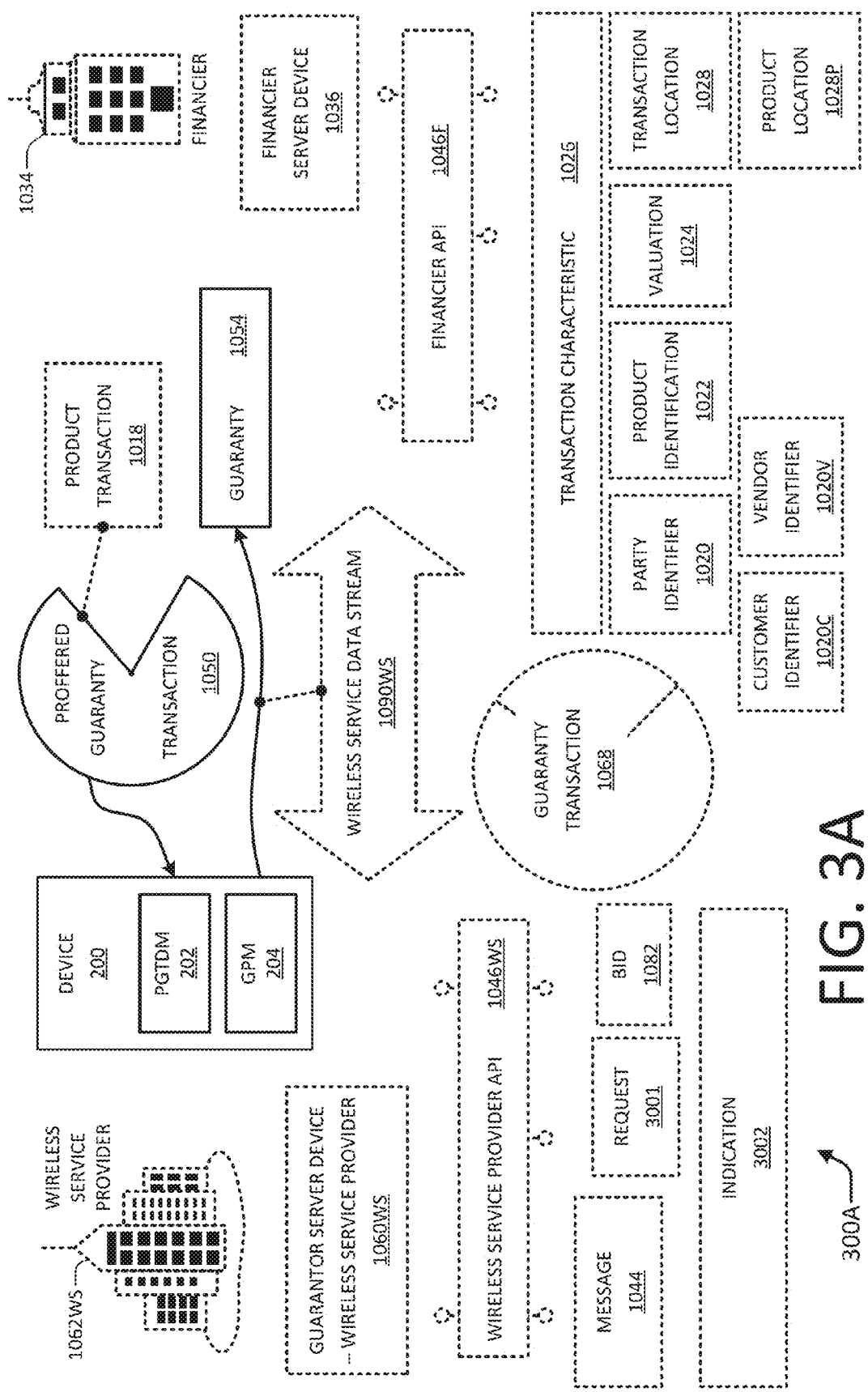

As shown in FIG. 3A, by way of example but not limitation, schematic diagram 300A may further include at least one wireless service provider application programming interface (API) 1046WS, at least one wireless service provider 1062WS, at least one wireless service provider guarantor server device 1060WS, at least one financier application programming interface (API) 1046F, at least one financier 1034, at least one financier server device 1036, at least one guaranty transaction 1068, at least one request 3001, at least one bid 1082, at least one message 1044, at least one indication 3002, at least one transaction characteristic 1026, at least one party identifier 1020, at least one customer identifier 1020C, at least one vendor identifier 1020V, at least one product identification 1022, at least one valuation 1024, at least one transaction location 1028, or at least one product location 1028P. Additional or alternative description that may be relevant to schematic diagram 300A is provided herein below with particular reference to at least one or more of any of FIGS. 5A-5G.

Figure 3B:
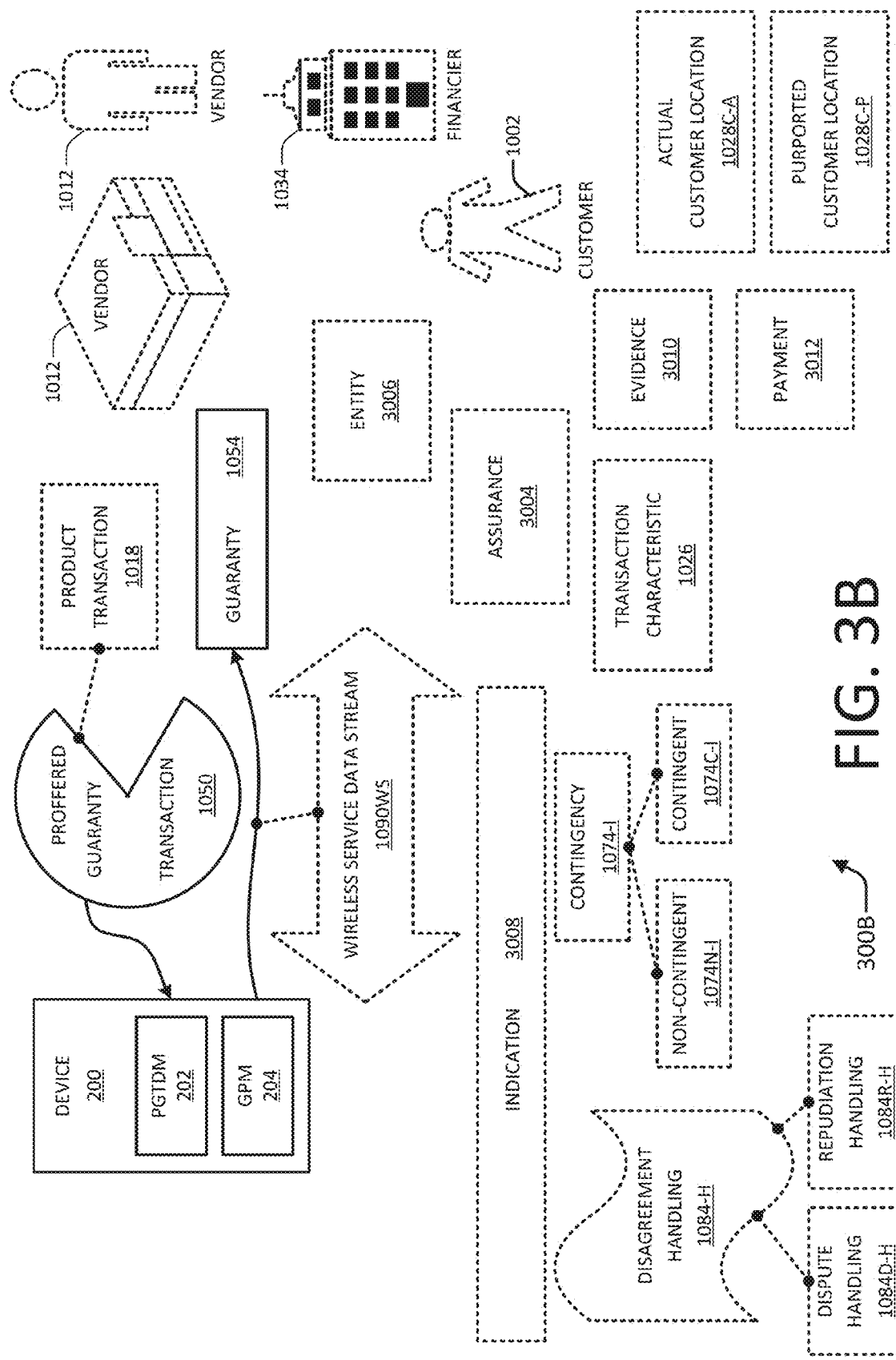

As shown in FIG. 3B, by way of example but not limitation, schematic diagram 300B may further include at least one assurance 3004, at least one entity 3006, at least one vendor 1012, at least one financier 1034, at least one indication 3008, at least one indication of disagreement handling 1084-H, at least one indication of dispute handling 1084D-H, at least one indication of repudiation handling 1084R-H, at least one indication of contingency 1074-I, at least one indication of being contingent 1074C-I, at least some evidence 3010, at least one transaction characteristic 1026, at least one payment 3012, at least one actual customer location 1028C-A, at least one customer 1002, at least one purported customer location 1028C-P, or at least one indication of being non-contingent 1074N-I. Additional or alternative description that may be relevant to schematic diagram 300B is provided herein below with particular reference to at least one or more of any of FIGS. 5A-5G.

Figure 3C:
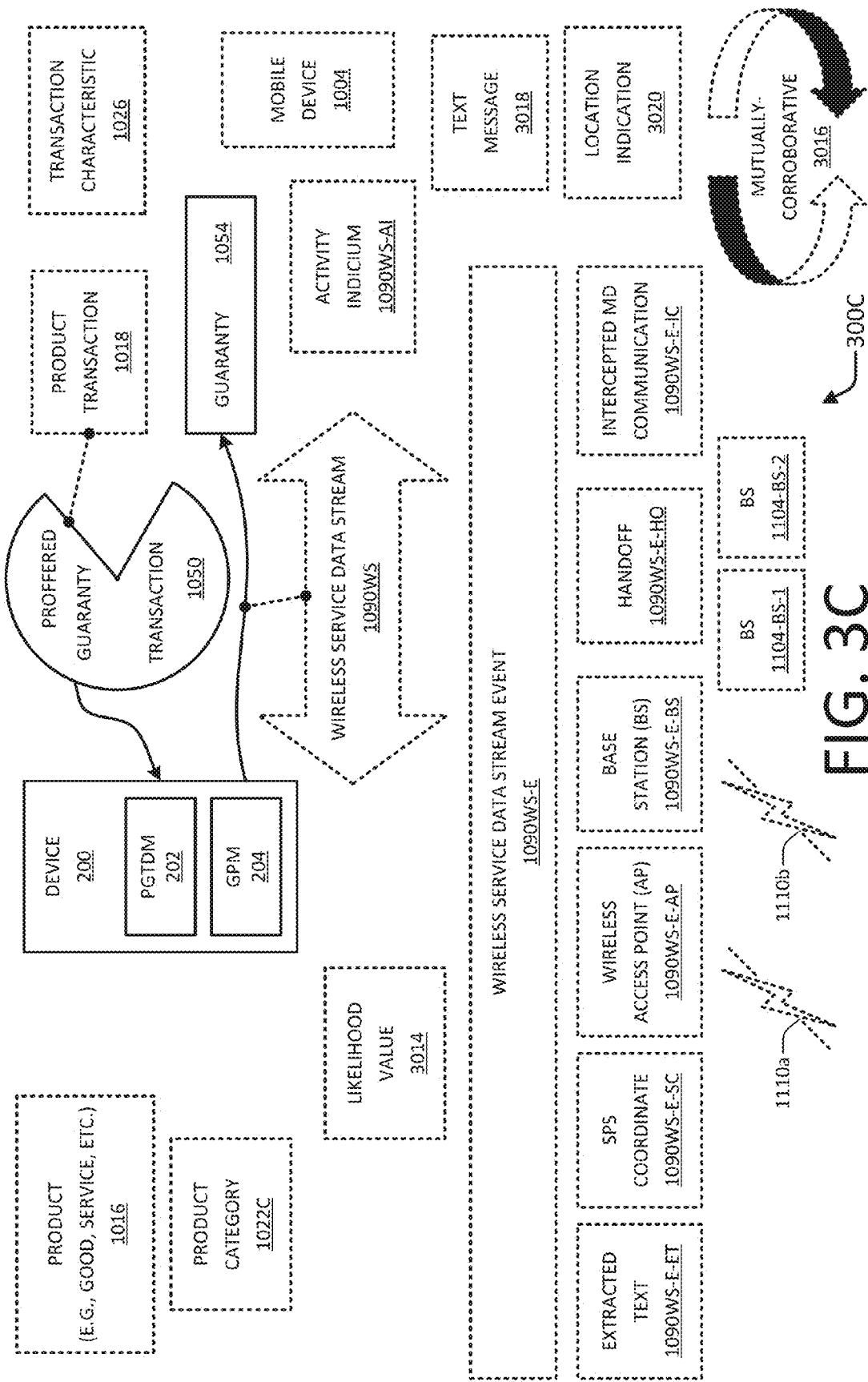

As shown in FIG. 3C, by way of example but not limitation, schematic diagram 300C may further include at least one transaction characteristic 1026, at least one wireless service data stream event 1090WS-E, at least some extracted text 1090WS-E-ET, at least one product category 1022C, at least one product 1016, at least one likelihood value 3014, at least one activity indicium 1090WS-AI, at least one satellite positioning system (SPS) coordinate 1090WS-E-SC, at least one mobile device 1004, at least one wireless signal 1110a, at least one wireless access point (AP) 1090WS-E-AP, at least one wireless signal 1110b, at least one base station (BS) 1090WS-E-BS, at least one handoff 1090WS-E-HO, at least one base station (BS) 1104-BS-1, at least one base station (BS) 1104-BS-2, at least one intercepted mobile device (MD) communication 1090WS-E-IC, at least one representation or actualization of a state or condition of being at least mutually-corroborative 3016, at least one text message 3018, or at least one location indication 3020. Additional or alternative description that may be relevant to schematic diagram 300C is provided herein below with particular reference to at least one or more of any of FIGS. 5A-5G.

Figure 3D:
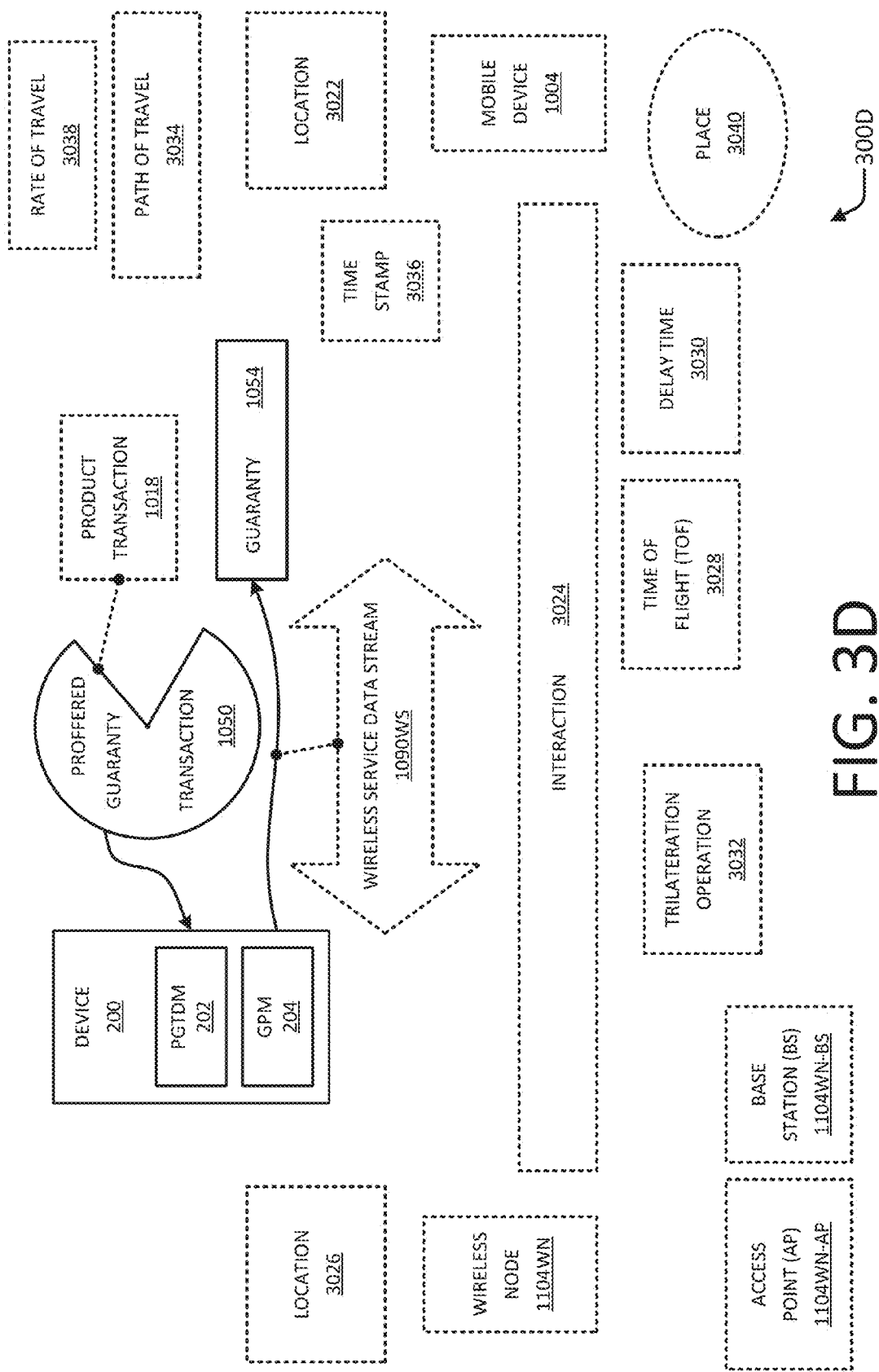

As shown in FIG. 3D, by way of example but not limitation, schematic diagram 300D may further include at least one location 3022, at least one mobile device 1004, at least one interaction 3024, at least one wireless node 1104WN, at least one location 3026, at least one time of flight (TOF) 3028, at least one delay time 3030, at least one access point (AP) 1104WN-AP, at least one base station (BS) 1104WN-BS, at least one trilateration operation 3032, at least one path of travel 3034, at least one time stamp 3036, at least one rate of travel 3038, or at least one place 3040. Additional or alternative description that may be relevant to schematic diagram 300D is provided herein below with particular reference to at least one or more of any of FIGS. 5A-5G.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 4 is a flow diagram 400 illustrating an example method for at least one device with regard to guaranty provisioning via wireless service purveyance in accordance with certain example embodiments. As illustrated, flow diagram 400 may include any of operations 402-404. Although operations 402-404 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 400 may be performed so as to be fully or partially overlapping with other operation(s). For certain example embodiments, one or more operations of flow diagram 400 may be performed by at least one device, such as a device 200 (e.g., of FIG. 2) or at least a portion thereof, such as one or more modules thereof. However, claimed subject matter is not limited to any particular described embodiments, implementations, examples, or so forth.

For certain example embodiments, a method (e.g., that may at least partially include, involve, address, react to, enable, pertain to, or a combination thereof, etc. or other otherwise relate to guaranty provisioning via wireless service purveyance, such as by supporting or at least partially relying on or interacting with a guaranty transaction marketplace or by making or accepting a call to a guaranty-related application programming interface (API)), which method may be at least partially implemented using hardware (e.g., circuitry, at least one processor, processor-accessible memory, at least one module, or a combination thereof, etc.) of a device such as a device 200 (e.g., of FIG. 2), may include an operation 402 or an operation 404. An operation 402 may be directed at least partially to detecting at least one proffered guaranty transaction that is associated with at least one product transaction. For certain example implementations, at least one device 200 (e.g., a guarantor server device 1060 (e.g., of FIG. 1), such as at least a portion of a server farm) may detect (e.g., discover, determine, ascertain, receive an incoming communication notifying of, inquire about, retrieve from memory, contact an electronic marketplace to learn of, or a combination thereof, etc., such as via at least one detection 206) at least one proffered guaranty transaction 1050 (e.g., an invitation to bid on a product transaction, an identification of at least one transaction characteristic of at least one product transaction, an opportunity to participate in a guaranty transaction marketplace, notice of a potential guaranty transaction, a request for a guaranty offer, an offer to consider a guaranty, or a combination thereof, etc.) that is associated with (e.g., that corresponds to, that is linked to, that relates to, that pertains to, that is matched with, that is derived from, or a combination thereof, etc.) at least one product transaction 1018 (e.g., a trade, an exchange of consideration for a product, an agreement to sell a product for money, a contract to buy a product on credit, a contract to secure one or more services, a transfer of a good or a delivery of a service, a lease of a good, or a combination thereof, etc.).

For certain example embodiments, an operation 404 may be directed at least partially to proffering at least one guaranty based at least partially on at least one wireless service data stream. For certain example implementations, at least one device 200 (e.g., a guarantor server device 1060 (e.g., of FIG. 1), such as at least one server blade) may proffer (e.g., reveal, offer, set forth, put before for potential acceptance, present to an entity in response to a proffered guaranty transaction from the entity, present to an entity without receiving or prior to receiving a proffered guaranty transaction from that entity, transmit to another's server, provide access at one's own server to, submit to a guaranty transaction marketplace, or a combination thereof, etc., such as via at least one proffer 208) at least one guaranty 1054 (e.g., a pledge to meet another's obligation, an assurance that another's debt will be satisfied, a promise to pay if another does not, an agreement to pay if a certain constraint is met or if a specified condition is falsified, a guarantee to pay if one or more contingencies are demonstrated to exist or to have transpired, an immediate or contemporaneous payment for a transaction that is discounted by a fee, a certification that a monetary backstop is established, or a combination thereof, etc.) based at least partially on (e.g., at least partly responsive to, motivated by, enabled by, using information derived from, powered by corroborating indicia obtained from, supported by, induced by events extracted from, or a combination thereof, etc.) at least one wireless service data stream 1090WS (e.g., one or more of bits, information, discrete or continuous or distributed events, packets, network telemetry, network operational data, or a combination thereof, etc. that is/are stored at a device or detected or obtained using at least a portion of at least one physical network that pertains to enabling wireless communication with cellular, satellite, Wi-Fi, WiMAX, microwave, short-range RF—such as Bluetooth or NFC or iBeacon, or some technology combination thereof, etc. via one or more of packet sniffing, network traffic analysis, a network-provider-specific application of a mobile device, a mobile device operating system communication, network-side monitoring of wireless signals, network data mining, a network element, an internet server, a gateway server, a base station, a Wi-Fi access point (AP), a telecommunications network server, a network switch, a network router, or a combination thereof, etc.).

FIGS. 5A-5G depict example additions or alternatives for a flow diagram of FIG. 4 in accordance with certain example embodiments. As illustrated, flow diagrams of FIGS. 5A-5G may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently or along with one or more other operations). Also, at least some operation(s) of flow diagrams of FIGS. 5A-5G may be performed so as to be fully or partially overlapping with other operation(s). Moreover, one or more of flow diagrams of FIGS. 5A-5G may illustrate implementation of one or more additional operations as represented by an operation 406 (e.g., if depicted). One or more additional operations corresponding to an operation 406 may alternatively be performed independently. For certain example embodiments, one or more operations of flow diagrams 500A-500G (of FIGS. 5A-5G) may be performed by at least one device such as a device 200 (e.g., of FIG. 2) or at least a portion thereof, such as one or more modules thereof. However, claimed subject matter is not limited to any particular described embodiments, implementations, examples, or so forth.

Figure 5A:
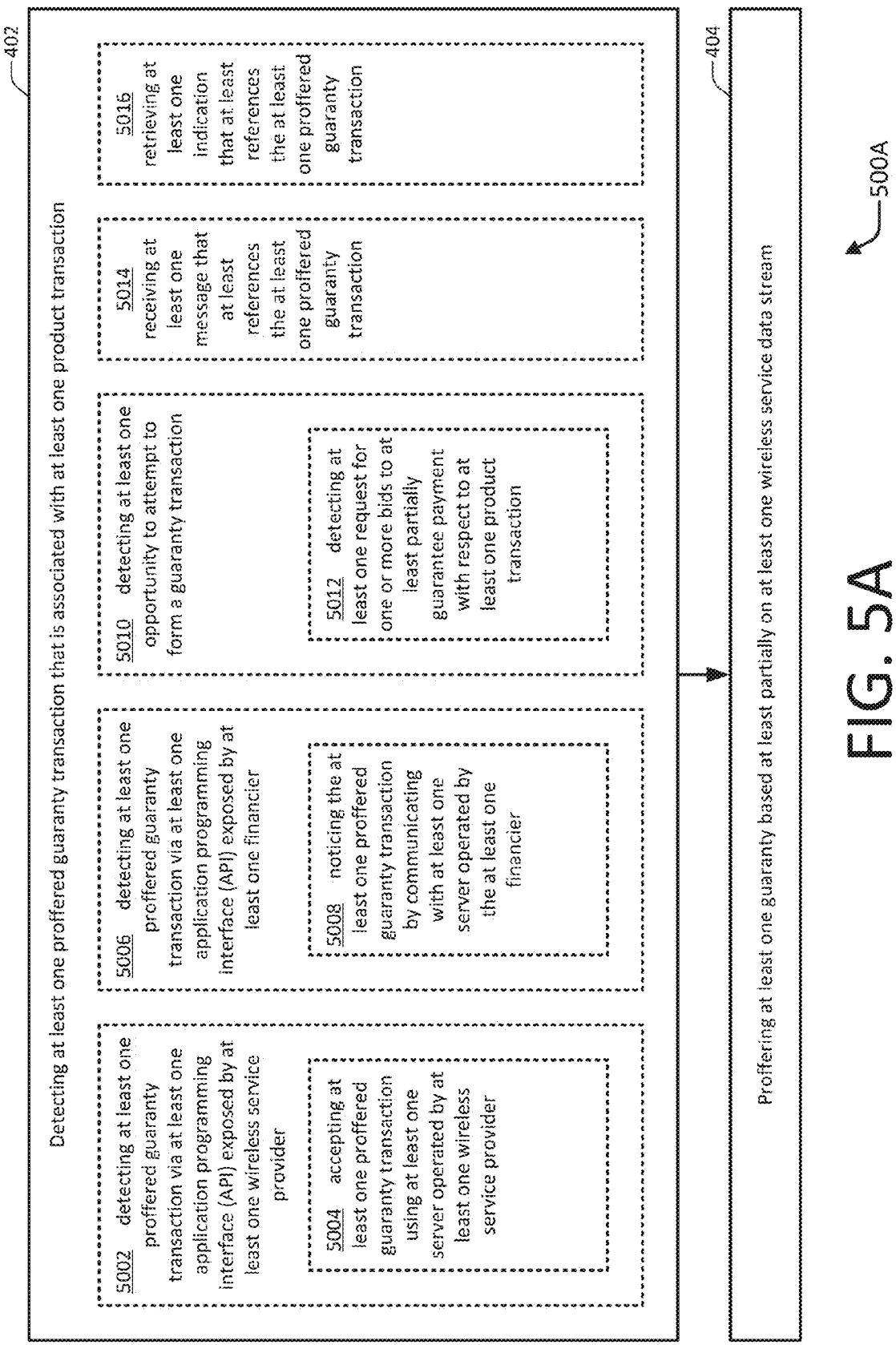

FIG. 5A illustrates a flow diagram 500A having any one or more of example operations 5002-5016. For example, an operation 402 may include an operation 5002 of detecting at least one proffered guaranty transaction via at least one application programming interface (API) exposed by at least one wireless service provider. For instance, at least one device 200 (e.g., a guarantor server device 1060, such as multiple computing racks functioning as at least one server) may detect (e.g., be notified of) at least one proffered guaranty transaction 1050 (e.g., a transaction characteristic such as an identity of a customer) via at least one application programming interface (API) 1046 (e.g., of FIG. 1), such as a wireless service provider API 1046WS (e.g., of FIG. 3A), (e.g., a set of programming instructions, a standard enabling access to software features, a call to obtain or provide information, a library instantiated by one or more hardware components, a framework or protocol implemented by communication circuitry to enable information exchange, or a combination thereof, etc.) exposed (e.g., presented, made available, implemented, incorporated into server functionality, or a combination thereof, etc.) by at least one wireless service provider 1062WS (e.g., a physical or virtual network, server, service, company, entity, or a combination thereof, etc. that pertains to enabling wireless communication with cellular, satellite, Wi-Fi, WiMAX, microwave, or some technology combination thereof, etc. that may be affiliated with at least one of Verizon, AT&T, Sprint, T-Mobile, Leap Wireless, Cricket, U.S. Cellular, Vodafone, Orange, Deutsche Telekom, NTT DoCoMo, SoftBank Mobile, China Telecom, China Mobile, or so forth).

For example, an operation 5002 may include an operation 5004 of accepting at least one proffered guaranty transaction using at least one server operated by at least one wireless service provider. For instance, at least one device 200 (e.g., a guarantor server device 1060, such as virtual server functionality carved from cloud computing hardware resources) may accept (e.g., receive, process, take in, confirm receipt of, or a combination thereof, etc.) at least one proffered guaranty transaction 1050 (e.g., a request to provide a guaranty) using at least one server 1060 (e.g., of FIG. 1L), such as a wireless service provider guarantor server device 1060WS (e.g., of FIG. 3A), (e.g., virtual server functionality carved from cloud computing hardware resources or a rack of server processors operating jointly) operated by (e.g., owned by, managed by, maintained by, contracted for, or a combination thereof, etc.) at least one wireless service provider 1062WS (e.g., AT&T, Verizon, or T-Mobile, etc.).

For example, an operation 402 may include an operation 5006 of detecting at least one proffered guaranty transaction via at least one application programming interface (API) exposed by at least one financier. For instance, at least one device 200 (e.g., a guarantor server device 1060, such as a server rack) may detect (e.g., discover) at least one proffered guaranty transaction 1050 (e.g., an opportunity to provide a guaranty) via at least one application programming interface (API) 1046 (e.g., of FIG. 1), such as at least one financier application programming interface (API) 1046F (e.g., of FIG. 3A), (e.g., a set of programming instructions, a standard enabling access to software features, a call to obtain or provide information, a library instantiated by one or more hardware components, a framework or protocol implemented by a communication circuitry to enable information exchange, or a combination thereof, etc.) exposed (e.g., presented, made available, implemented, incorporated into server functionality, or a combination thereof, etc.) by at least one financier 1034 (e.g., a bank, a credit card company, an internet payment service, or a combination thereof, etc.).

For example, an operation 5006 may include an operation 5008 of noticing the at least one proffered guaranty transaction by communicating with at least one server operated by the at least one financier. For instance, at least one device 200 (e.g., a guarantor server device 1060, such as a server blade in a rack) may notice (e.g., identify, recognize, realize existence of, learn of after inquiry, confirm parameters of, or a combination thereof, etc.) at least one proffered guaranty transaction 1050 (e.g., an account identification of an end-user or a product transaction identification) by communicating with (e.g., interacting with, sending a message to, retrieving an indication from, or a combination thereof, etc.) at least one server 1036 (e.g., a portion of a server farm) operated by (e.g., owned by, managed by, maintained by, contracted for, or a combination thereof, etc.) at least one financier 1034 (e.g., Visa, Chase, PayPal, Google Wallet Card, or a combination thereof, etc.).

For example, an operation 402 may include an operation 5010 of detecting at least one opportunity to attempt to form a guaranty transaction. For instance, at least one device 200 (e.g., a guarantor server device 1060, such as a distributed cloud server) may detect (e.g., ascertain) at least one opportunity (e.g., chance, capability that has been extended, access that has been granted, prospect, or a combination thereof, etc.) to attempt to form (e.g., an invitation to participate in a guaranty transaction marketplace, a request to provide a guaranty, an inquiry as to fee or other terms to determine if a match is feasible, a response to a proffered transaction characteristic, or a combination thereof, etc.) a guaranty transaction 1068 (e.g., an agreement to reimburse a financier for at least a portion of losses, a contingent contract to pay a vendor if a customer does not, a promise to pay if a particular transaction characteristic is falsified, or a combination thereof, etc.).

For example, an operation 5010 may include an operation 5012 of detecting at least one request for one or more bids to at least partially guarantee payment with respect to at least one product transaction. For instance, at least one device 200 (e.g., a guarantor server device 1060, such as part of a server farm) may detect (e.g., receive from an external source or investigate to discover) at least one request 3001 (e.g., transmitted inquiry, invitation, received notification, or a combination thereof, etc. as part of a message 1044) for one or more bids 1082 (e.g., submitted guaranty offer, cost for a guaranty, terms for a guaranty, or a combination thereof, etc.) to at least partially guarantee payment (e.g., promise to reimburse vendor or financier at least a portion of an unpaid valuation with or without a contingency on at least one transaction characteristic) with respect to at least one product transaction 1018 (e.g., purchase of a car).

For example, an operation 402 may include an operation 5014 of receiving at least one message that at least references the at least one proffered guaranty transaction. For instance, at least one device 200 (e.g., a guarantor server device 1060, such as a geographically distributed server apparatus) may receive (e.g., accept an incoming wireless or wired electromagnetic signal having one or more packets forming) at least one message 1044 (e.g., an internet protocol (IP)-compliant communication) that at least references (e.g., includes, provides a link to, identifies, gives a mechanism to retrieve, or a combination thereof, etc.) at least one proffered guaranty transaction 1050 (e.g., one or more transaction characteristics that are potentially capable of being corroborated).

For example, an operation 402 may include an operation 5016 of retrieving at least one indication that at least references the at least one proffered guaranty transaction. For instance, at least one device 200 (e.g., a guarantor server device 1060, such as an Intel Xeon-based computing device or an Ericsson-made telecommunications node) may retrieve (e.g., pull from a remote internet location—such as another's web site) at least one indication 3002 (e.g., a sign, evidence, a showing, a description, a communication, an informative data structure, a code, an alpha or numeric set of one or more characters, or a combination thereof, etc.) that at least references (e.g., includes, provides a link to, identifies, gives a mechanism to retrieve, or a combination thereof, etc.) at least one proffered guaranty transaction 1050 (e.g., a key to access an encrypted network location describing a product transaction).

FIG. 5B illustrates a flow diagram 500B having any one or more of example operations 5020-5034. For example, an operation 402 may include an operation 5020 of detecting one or more transaction characteristics corresponding to at least one product transaction. For instance, at least one device 200 (e.g., a guarantor server device 1060, such as cloud computing infrastructure) may detect (e.g., receive an incoming communication providing notice of) one or more transaction characteristics 1026 (e.g., attribute of a product transaction—such as a party, a location, a product identification, or a combination thereof, etc.) corresponding to (e.g., related to, affiliated with, representative of, determined from, or a combination thereof, etc.) at least one product transaction 1018 (e.g., car rental agreement).

For example, an operation 5020 may include an operation 5022 of detecting at least one party identifier. For instance, at least one device 200 (e.g., a guarantor server device 1060, such as a Dell server operated by a telecom company) may detect (e.g., learn of by accessing an API at a remote server) at least one party identifier 1020 (e.g., name, abbreviation, numeric code, or a combination thereof, etc. of a customer, a vendor, or a combination thereof, etc.).

For example, an operation 5022 may include an operation 5024 of detecting at least one customer identifier. For instance, at least one device 200 (e.g., a guarantor server device 1060, such as a virtual server implemented on general-purpose computing hardware or telecommunications switching node hardware) may detect (e.g., receive a transaction marketplace submission (TMS) 1038 (e.g., of FIG. 1) from a vendor) at least one customer identifier 1020C (e.g., name, account number, social security number, code, account or user name, phone number, email address, international mobile subscriber identity (IMSI), integrated circuit card identifier (ICCID), equipment identification number (EIN), international mobile station equipment identity (IMEI), mobile subscriber integrated services digital network-number (MSISDN), mobile equipment identifier (MEID), or a combination thereof, etc.).

For example, an operation 5022 may include an operation 5026 of detecting at least one vendor identifier. For instance, at least one device 200 (e.g., a guarantor server device 1060, such as multiple processing nodes distributed over at least one server rack) may detect (e.g., extract from a message) at least one vendor identifier 1020V (e.g., name, abbreviation, code, store number, street address, uniform resource locator (URL), or a combination thereof, etc.).

For example, an operation 5020 may include an operation 5028 of detecting at least one product identification. For instance, at least one device 200 (e.g., a guarantor server device 1060, such as cloud-based leased server computing cycles) may detect (e.g., accept an API-based network communication including) at least one product identification 1022 (e.g., name, description, stock keeping unit (SKU), manufacturer, make, catalog number, model identifier, serial number, or a combination thereof, etc.).

For example, an operation 5020 may include an operation 5030 of detecting at least one valuation. For instance, at least one device 200 (e.g., a guarantor server device 1060, such as commodity hardware configured in accordance with an open source server design) may detect (e.g., associate with a file for a potential guaranty) at least one valuation 1024 (e.g., cost of goods, total bill, estimated charge for services, replacement value, insurance cost, or a combination thereof, etc.).

For example, an operation 5020 may include an operation 5032 of detecting at least one transaction location. For instance, at least one device 200 (e.g., a guarantor server device 1060, such as specialized hardware executing proprietary software providing wireless server provider backhaul functionality) may detect (e.g., receive from a financier 1034) at least one transaction location 1028 (e.g., a position, a physical address, a network address, at least one satellite positioning system (SPS) coordinate, a building name, a city, an estimated position with an associated range—such as +/−50 meters, a position of an electronic device of a customer, a position of a scanned UPC or RFID, or a combination thereof, etc. of a customer, a vendor, a product, or a combination thereof, etc.).

For example, an operation 5032 may include an operation 5034 of detecting at least one product location. For instance, at least one device 200 (e.g., a guarantor server device 1060, such as a Rackspace server) may detect (e.g., request as part of a guaranty transaction marketplace 1040 (e.g., of FIG. 1) discovery or investigation protocol) at least one product location 1028P (e.g., a physical address—such as a street address, a network address—such as a URL, at least one satellite positioning system (SPS) coordinate, a place of business, a building name, a stall or store number, an aisle or department, a city, a place of origination for a good, a place of destination for a service, or a combination thereof, etc.).

Figure 5C:
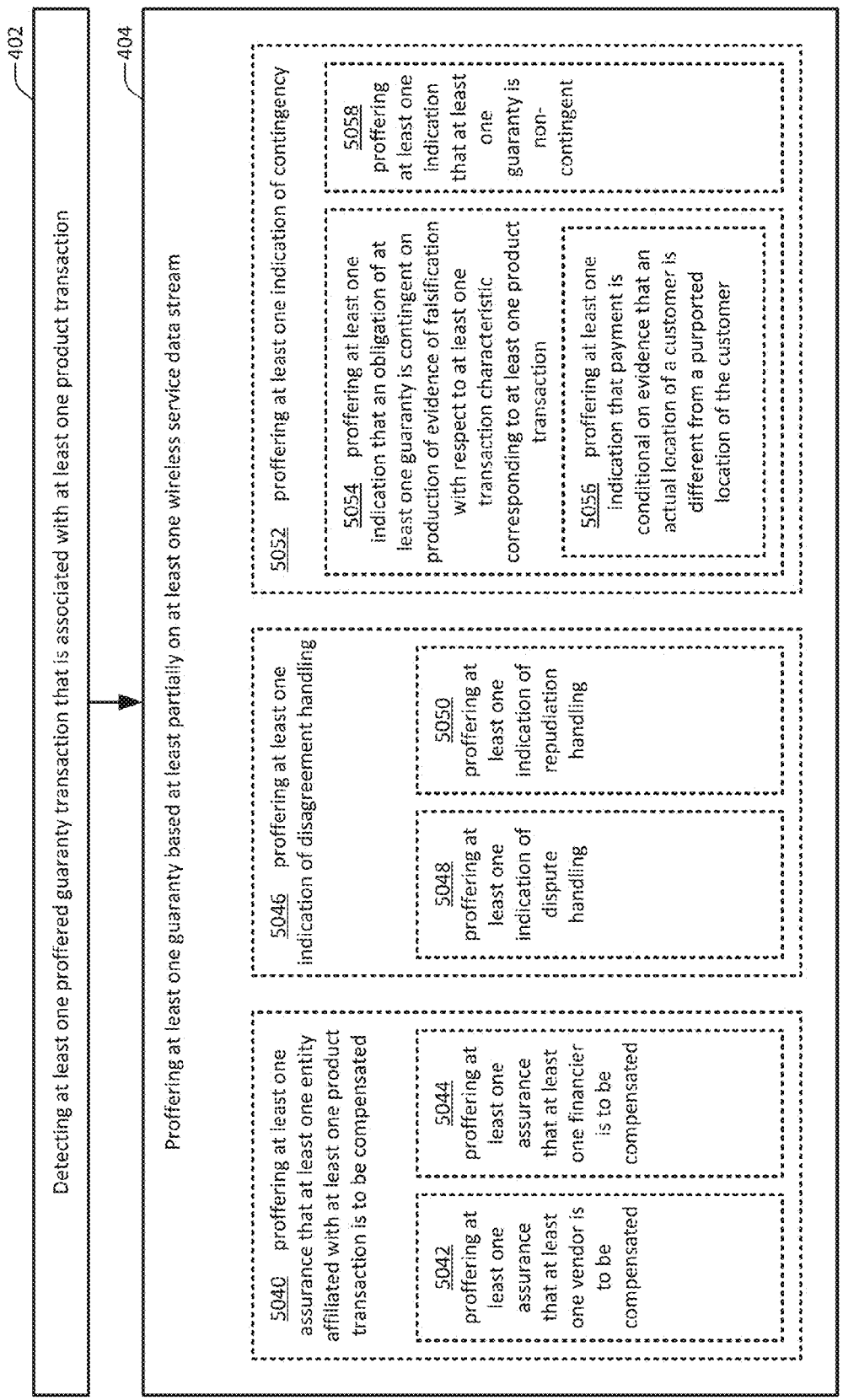

FIG. 5C illustrates a flow diagram 500C having any one or more of example operations 5040-5058. For example, an operation 404 may include an operation 5040 of proffering at least one assurance that at least one entity affiliated with at least one product transaction is to be compensated. For instance, at least one device 200 (e.g., a guarantor server device 1060, such as at least part of a bank of servers) may proffer (e.g., send out over the internet) at least one assurance 3004 (e.g., contract, offer, agreement, promise, guarantee, claim code, instructions for securing a guaranty, or a combination thereof, etc.) that at least one entity 3006 (e.g., customer 1002, vendor 1012, financier 1034, combined financier and guarantor 1108 (e.g., of FIG. 1F), or a combination thereof, etc.) affiliated with (e.g., involved with, a party to, a principle of, a buyer or seller with respect to, a creditor or loan provider with respect to, a provider of a service, or a combination thereof, etc.) at least one product transaction 1018 (e.g., a sale of a meal or providing of a meal service at a restaurant) is to be compensated (e.g., made whole, paid at least a portion of a valuation of a transaction, provided a set amount or percentage of funds if a stipulated contingency occurs, at least partially counterbalanced for a financial loss, given pecuniary encouragement to take a risk, paid in lieu of a customer's or financier's payment, or a combination thereof, etc.).

For example, an operation 5040 may include an operation 5042 of proffering at least one assurance that at least one vendor is to be compensated. For instance, at least one device 200 (e.g., a guarantor server device 1060, such as a data center) may proffer (e.g., extend an offer of) at least one assurance 3004 (e.g., unilateral contract offer) that at least one vendor 1012 (e.g., store, rental agency, web site, restaurant, airline, hotel, service company, or a combination thereof, etc.) is to be compensated (e.g., reimbursed for loss if a specified event occurs or a given assertion is falsified).

For example, an operation 5040 may include an operation 5044 of proffering at least one assurance that at least one financier is to be compensated. For instance, at least one device 200 (e.g., a guarantor server device 1060, such as a server cluster) may proffer (e.g., in response to a proffered guaranty transaction 1050, send a confirmation of or acceptance to provide) at least one assurance 3004 (e.g., electronically-executed bilateral agreement) that at least one financier 1034 (e.g., credit card company—such as American Express, banking institution—such as Wells Fargo, credit issuer—such as a department store, internet payment company—such as PayPal or Amazon Payments, electronic wallet company—such as Google or Apple, or a combination thereof, etc.) is to be compensated (e.g., paid immediately at least a portion of a valuation amount of a product transaction or paid later if sufficient evidence is produced that an alleged customer was not actually present at a given store's physical premises or internet website).

For example, an operation 404 may include an operation 5046 of proffering at least one indication of disagreement handling. For instance, at least one device 200 (e.g., a guarantor server device 1060, such as one or more server blades) may proffer (e.g., make available on a server so as to enable access to external inquiries by a financier or a vendor) at least one indication 3008 (e.g., a sign, evidence, a showing, a description, a communication, an informative data structure, a code, an alpha or numeric set of one or more characters, or a combination thereof, etc.) of disagreement handling 1084-H (e.g., how, who, when, where, a disagreement—such as if a customer does not pay, if a customer and vendor disagree as to whether a product was delivered, if a customer disavows authorizing or requesting a transaction, if a customer asserts that a product was substandard or in violation of agreed-upon terms—is to be handled—such as which entity investigates a disagreement, who settles a disagreement, from where is evidence accumulated, when is a disagreement investigated or arbitrated, when is a final deadline, if/how a decision may be appealed, whether or what part(s) of a disagreement is performed manually or with automation, or a combination thereof, etc.).

For example, an operation 5046 may include an operation 5048 of proffering at least one indication of dispute handling. For instance, at least one device 200 (e.g., a guarantor server device 1060, such as at least one processor and associated memory of a server farm) may proffer (e.g., send via an email or other communication protocol) at least one indication 3008 (e.g., a list of factors—such as neutral party, 72 hours, form XS-7, or a combination thereof, etc.) of dispute handling 1084D-H (e.g., description of addressing, ameliorating, or remedying a disagreement between or among at least one vendor and at least one customer—such as if a customer avers that service failed to meet an agreed-upon quality or that payment was satisfied using a different payment mechanism, such as by using a different credit card or a check, or avers that goods were not delivered).

For example, an operation 5046 may include an operation 5050 of proffering at least one indication of repudiation handling. For instance, at least one device 200 (e.g., a guarantor server device 1060, such as cloud computing resources procured from another entity, like Amazon's Web Services (AWS)) may proffer (e.g., announce a posting that is available via an API 1046 (e.g., of FIG. 1) of a guaranty transaction marketplace 1040 (e.g., of FIG. 1)) at least one indication 3008 (e.g., identification of entity handling, identification of contingent transaction characteristic, description of process, or a combination thereof, etc.) of repudiation handling 1084R-H (e.g., description of how to investigate or settle a situation in which a user or alleged purchaser denies approving, authorizing, requesting, or a combination thereof, etc. a product transaction—such as how to or who verifies a claimed: actual location, device theft, credit card loss, or a combination thereof, etc.).

For example, an operation 404 may include an operation 5052 of proffering at least one indication of contingency. For instance, at least one device 200 (e.g., a guarantor server device 1060, such as a rack of server blades) may proffer (e.g., transmit in accordance with a guaranty transaction marketplace protocol) at least one indication 3008 (e.g., a multivariate or Boolean variable) of contingency 1074-I (e.g., whether a guaranty or payment obligation is automatic, is independent of external factors, is dependent on evidence production, is contingent on an asserted or purported transaction characteristic being accurate or correct, or a combination thereof, etc.).

For example, an operation 5052 may include an operation 5054 of proffering at least one indication that an obligation of at least one guaranty is contingent on production of evidence of falsification with respect to at least one transaction characteristic corresponding to at least one product transaction. For instance, at least one device 200 (e.g., a guarantor server device 1060, such as a server farm) may proffer (e.g., submit to a server device 1056 of a market maker 1058 of a guaranty transaction marketplace 1040 (e.g., each of FIG. 1)) at least one indication 3008 (e.g., code, label, set or cleared bit, format or form selection, transaction characteristic identification, or a combination thereof, etc.) that an obligation of (e.g., promise to pay or reimburse appurtenant to) at least one guaranty 1054 (e.g., contract to guarantee at least a portion of a product transaction, such as a valuation thereof) is contingent 1074C-I (e.g., dependent, set as a precondition, at least partly conditioned on, or a combination thereof, etc.) on production (e.g., presentation, reporting, acquisition, submission, verification, or a combination thereof, etc.) of evidence 3010 (e.g., receipt of purchase of replacement device, police report of theft, eye witness reporting of location, facial recognition from security cameras at transaction location or at location distant from transaction location, location records from a wireless service provider, airline or hotel receipts, product literature, product transaction agreement, further analysis of a biometric signature, or a combination thereof, etc.) of falsification (e.g., discrepancy, difference, inconsistency, incorrectness, error, fraud, impersonation, or a combination thereof, etc.) with respect to (e.g., with regard to, about, pertaining to, defining, dealing with, or a combination thereof, etc.) at least one transaction characteristic 1026 (e.g., product location) corresponding to at least one product transaction 1018 (e.g., agreement to sell three dachshunds in a suburb of Atlanta, Ga.).

For example, an operation 5054 may include an operation 5056 of proffering at least one indication that payment is conditional on evidence that an actual location of a customer is different from a purported location of the customer. For instance, at least one device 200 (e.g., a guarantor server device 1060, such as a Linux-based or Unix-based server) may proffer (e.g., activate or enable to be externally accessible on a server with a password or passcode) at least one indication 3008 (e.g., a flag, a guaranty type description or name, a transaction characteristic identification, or a combination thereof, etc.) that payment 3012 (e.g., dollars, electronic funds transfer (EFT), accounting classification change to accounts payable, portion of valuation of transaction, cost to repossess stolen product, Bitcoins, cost to repair damaged product, or a combination thereof, etc.) is conditional (e.g., at least partially dependent, occurs after production of, becomes due at least partially based on, or a combination thereof, etc.) on evidence 3010 (e.g., receipt of purchase of replacement device, police report of theft, eye witness reporting of location, facial recognition from security cameras or other imaging devices, location records from a wireless service provider, airline or hotel receipts, product literature, product transaction agreement, further analysis of a biometric signature, or a combination thereof, etc.) that an actual location 1028C-A (e.g., true, accurate, correct at time of relevancy, at least one satellite positioning system (SPS) coordinate, store name or address, city, or a combination thereof, etc.) of a customer 1002 (e.g., a person, an end-user of a mobile device, a robotic entity, or a combination thereof, etc.) is different from (e.g., is not identical to, varies from, diverges by a certain distance with respect to, deviates by a given distance with respect to a timestamp of, or a combination thereof, etc.) a purported location 1028C-P (e.g., potentially false, possibly inaccurate, unverified if correct or incorrect at time of relevancy, alleged by product transaction information but unconfirmed, asserted by a vendor or financier, at least one satellite positioning system (SPS) coordinate, mall identification, neighborhood, or a combination thereof, etc.) of a customer 1002 (e.g., a person, an end-user of a mobile device, a company, or a combination thereof, etc.).

For example, an operation 5052 may include an operation 5058 of proffering at least one indication that at least one guaranty is non-contingent. For instance, at least one device 200 (e.g., a guarantor server device 1060, such as a server-stocked container) may proffer (e.g., announce via at least one electronically-communicated message) at least one indication 3008 (e.g., particular set or unset bit, guaranty name, value in table or matrix, guaranty offer formatting, or a combination thereof, etc.) that at least one guaranty 1054 (e.g., promise to cover unpaid bill) is non-contingent 1074N-I (e.g., independent of external factors, not conditional at least on a specified attribute of a customer, automatic, guaranteed, risk-free, not impacted by a veracity of a purported product transaction characteristic, or a combination thereof, etc.).

Figure 5D:
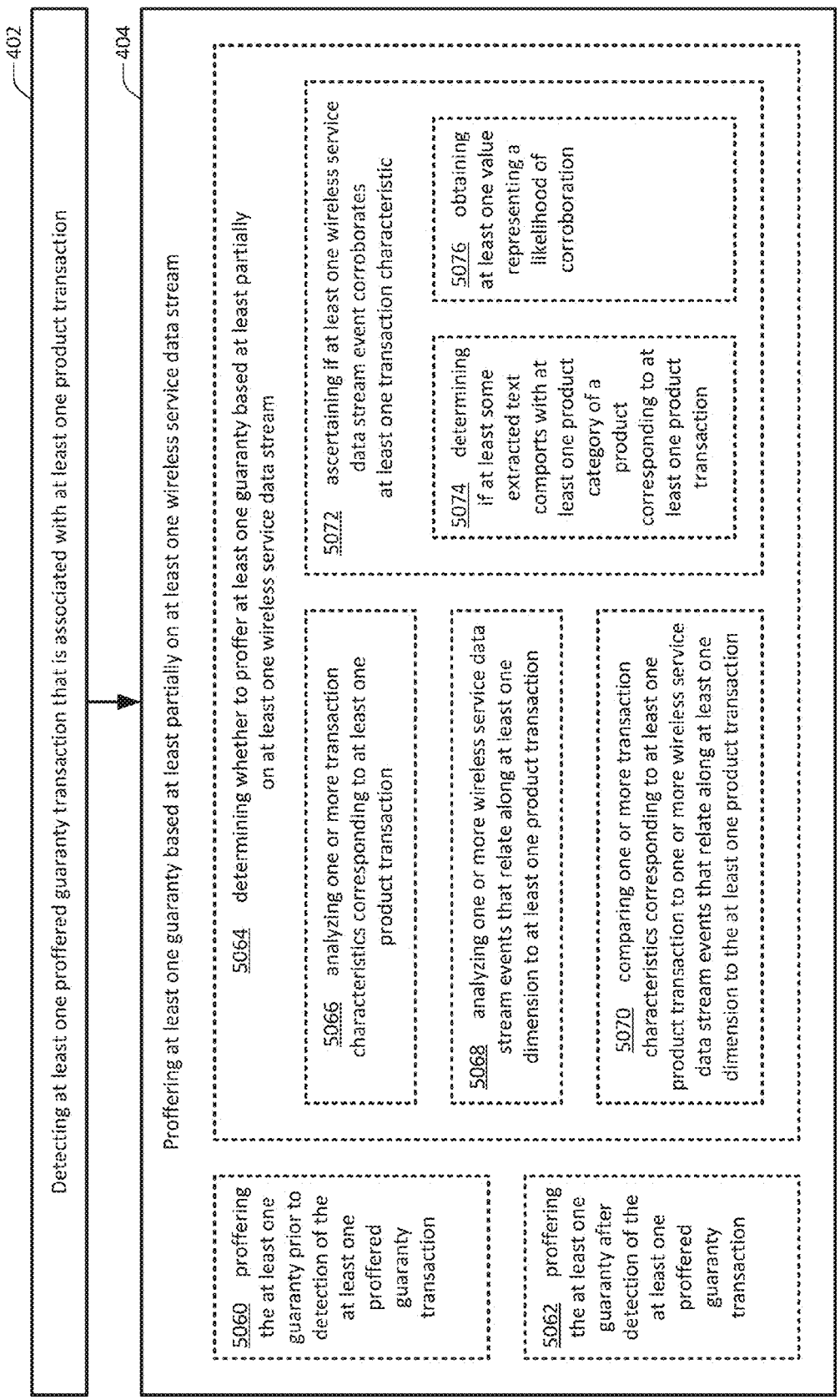

FIG. 5D illustrates a flow diagram 500D having any one or more of example operations 5060-5076. For example, an operation 404 may include an operation 5060 of proffering the at least one guaranty prior to detection of the at least one proffered guaranty transaction. For instance, at least one device 200 (e.g., a guarantor server device 1060, such as proprietary processing hardware functioning as a server) may proffer (e.g., publicize on a web site that is accessible via one or more security protocols or passwords) at least one guaranty 1054 (e.g., an agreement to guarantee an aspect of a transaction based at least on a location of an end-user) prior to detection of (e.g., before noticing, prior to processing, not in response to, before receiving, or a combination thereof, etc.) at least one proffered guaranty transaction 1050 (e.g., an opportunity to earn a fee in exchange for guaranteeing at least part of a valuation of a product transaction).

For example, an operation 404 may include an operation 5062 of proffering the at least one guaranty after detection of the at least one proffered guaranty transaction. For instance, at least one device 200 (e.g., a guarantor server device 1060, such as server hardware distributed over at least a portion of a telecom network) may proffer (e.g., send electronically) at least one guaranty 1054 (e.g., a near-term discounted payment sent to a vendor or a financier in order to subsequently receive a full payment from a financier or a customer, respectively) after detection of (e.g., post receipt of, after processing, in response to a successful confirmation of at least one transaction characteristic related to, or a combination thereof, etc.) at least one proffered guaranty transaction 1050 (e.g., a request, which is sent from a vendor or a financier to a potential guarantor, for a guaranty).

For example, an operation 404 may include an operation 5064 of determining whether to proffer at least one guaranty based at least partially on at least one wireless service data stream. For instance, at least one device 200 (e.g., a guarantor server device 1060, such as commodity server hardware operated by a wireless service provider) may determine (e.g., ascertain, perform an analysis regarding, make one or more comparisons to decide, or a combination thereof, etc.) whether to proffer (e.g., submit for acceptance or bid consideration, announce, publish, respond to a proffered guaranty transaction, or a combination thereof, etc.) at least one guaranty 1054 (e.g., a pledge to meet another's obligation)

based at least partially on (e.g., at least partly responsive to, motivated by, enabled by, using information derived from, powered by corroborating indicia obtained from, supported by, or a combination thereof, etc.) at least one wireless service data stream 1090WS (e.g., one or more of bits, information, discrete or continuous or distributed events, packets, network telemetry, network operational data, or a combination thereof, etc. that is/are stored at a device or detected or obtained using at least a portion of at least one physical network that pertains to enabling wireless communication with cellular, satellite, Wi-Fi, WiMAX, microwave, short-range RF—such as Bluetooth or NFC or iBeacon, or some technology combination thereof, etc. via one or more of packet sniffing, network traffic analysis, a network-provider-specific application of a mobile device, a mobile device operating system communication, network-side monitoring of wireless signals, network data mining, a network element, an internet server, a gateway server, a base station, a Wi-Fi access point (AP), a telecommunications network server, a network switch, a network router, or a combination thereof, etc.).

For example, an operation 5064 may include an operation 5066 of analyzing one or more transaction characteristics corresponding to at least one product transaction. For instance, at least one device 200 (e.g., a guarantor server device 1060, such as an open source server box or telecommunications node) may analyze (e.g., consider, parse, link to a category, find analogous aspects to, ascertain synonymous terms, compare or contrast, or a combination thereof, etc.) one or more transaction characteristics 1026 (e.g., product category, customer identity, transaction location, product description, or a combination thereof, etc.) corresponding to (e.g., relating to, characterizing, defining, providing attribute of, or a combination thereof, etc.) at least one product transaction 1018 (e.g., a hotel room for two nights, plus room service and spa treatments, in Paris, Tex.).

For example, an operation 5064 may include an operation 5068 of analyzing one or more wireless service data stream events that relate along at least one dimension to at least one product transaction. For instance, at least one device 200 (e.g., a guarantor server device 1060, such as at least a portion of a server farm operated by Verizon) may analyze (e.g., consider, link from one to another, find analogous aspects to, ascertain synonymous terms of, localize, compare or contrast, determine a differential between or appurtenant to, or a combination thereof, etc.) one or more wireless service data stream events 1090WS-E (e.g., communicating with a cell tower, communicating wirelessly with a Wi-Fi access point, making a voice call, conducting a search, mapping a location with a wireless service provider app, sending a communication using telecommunications infrastructure with a browser or an app of a mobile device with the communication having data that is accessible to a wireless service provider or a propagating network node, visiting a physical location with a mobile device, downloading an app, using an app, taking a picture, sending a text via telecommunications infrastructure, or a combination thereof, etc.) that relate along (e.g., that match, that correspond to, that pertain to, that fit within a same category, that have common words or synonyms, that demonstrate overlapping concepts, that are geographically proximate, that belong to a same subject-matter, that travel at a similar speed, or a combination thereof, etc.) at least one dimension (e.g., a category, a location, a travel path, a person, a hobby category, a transaction characteristic, a habit, an activity, or a combination thereof, etc.) to at least one product transaction 1018 (e.g., a purchase of a camera at 6:05 pm at a retail store in Chicago, Ill., located at a stop along an elevated train route that a person takes home after work each day between 5:30 and 6:30 pm after exchanging texts about a photography class).

For example, an operation 5064 may include an operation 5070 of comparing one or more transaction characteristics corresponding to at least one product transaction to one or more wireless service data stream events that relate along at least one dimension to the at least one product transaction. For instance, at least one device 200 (e.g., a guarantor server device 1060, such as a bank of servers operating as a network gateway between a telecommunications network and the internet) may compare (e.g., determine differences, ascertain similarities, find one or more semantic correlations, apply a machine learning mechanism, identify correspondences or synonymous terms or concepts, detect equivalent or overlapping categories or subject-matters, determine a differential appurtenant to, ascertain a level of temporal proximity, ascertain a level of spatial proximity, or a combination thereof, etc.) one or more transaction characteristics 1026 (e.g., a vendor location, a customer wireless service identification—such as a phone number, a product category, a product use case—such as snow skiing, or a combination thereof, etc.) corresponding to at least one product transaction 1018 (e.g., a car purchase) to one or more wireless service data stream events 1090WS-E (e.g., sending an email, receiving an email, clicking on an advertisement from a wireless service provider app or web page, sending a text identifying a store or naming a product, receiving a text with an address or name of a car dealer, mapping a location to a store, stopping at a restaurant, traveling to a destination, communicating with a fixed node of a wireless network having a known location, or a combination thereof, etc.) that relate along (e.g., that match, that correspond to, that pertain to, that fit within a same category, that have common words or synonyms, that demonstrate overlapping concepts, that are geographically proximate, that belong to a same subject-matter, that are temporally within a given threshold, or a combination thereof, etc.) at least one dimension (e.g., a category, a location, a travel path, a person, a hobby category, a transaction characteristic, a habit, an activity, or a combination thereof, etc.) to at least one product transaction 1018 (e.g., a car purchase at a dealer having a location that terminates a path of a mobile device that started at a user's home).

For example, an operation 5064 may include an operation 5072 of ascertaining if at least one wireless service data stream event corroborates at least one transaction characteristic. For instance, at least one device 200 (e.g., a guarantor server device 1060, such as a rack of servers) may ascertain (e.g., determine, calculate a value representing a likelihood of, analyze, make at least one comparison to conclude, compute a coefficient of coincidence—such as a correlation, or a combination thereof, etc.) if at least one wireless service data stream event 1090WS-E (e.g., sending an email, receiving an email, clicking on an advertisement from a wireless service provider app or web page, sending a text identifying a store or naming a product, receiving a text with an address or name of a car dealer, mapping a location to a store, stopping at a restaurant, traveling to a destination, communicating with a fixed node of a wireless network having a known location, or a combination thereof, etc.) corroborates (e.g., supports, matches, confirms, increases likelihood, leads to expect existence of, synchronizes with, comports with, links to, or a combination thereof, etc.) at least one transaction characteristic 1026 (e.g., transaction type, product location, vendor name, or a combination thereof, etc.).

For example, an operation 5072 may include an operation 5074 of determining if at least some extracted text comports with at least one product category of a product corresponding to at least one product transaction. For instance, at least one device 200 (e.g., a guarantor server device 1060, such as an AT&T server blade for Isis) may determine (e.g., ascertain, perform an analysis regarding, make one or more comparisons to decide, consult a term-to-product category concordance, or a combination thereof, etc.) if at least some extracted text 1090WS-E-ET (e.g., letters, numbers, words, or a combination thereof, etc. that are extracted from at least one communication—such as sniffed from at least one packet—flowing through a wireless or telecommunications network) matches (e.g., is identical to, is a synonym of, equates to in accordance with a thesaurus, is deemed of similar semantic meaning, at least partially overlaps a subject-matter of, or a combination thereof, etc.) at least one product category 1022C (e.g., store department, intended use of product, sporting goods, automotive, restaurant food type, manufacturer name, electronics, style—such as contemporary or classical, apparel, targeted demographic—such as child or woman, Google product taxonomy, governmental established categories, accounting services, IRS tax code categories, animal husbandry services, general contractor services, plumbing services, IT services, or a combination thereof, etc.) of a product 1016 (e.g., a good, a service, a retail item, a manufacturing input, a rental car, a hotel room, an airline flight, a restaurant meal, a mobile phone, a video game, a lawn mower, a lawn mowing, or a combination thereof, etc.) corresponding to (e.g., relating to, acquired as a result of, ordered via, or a combination thereof, etc.) at least one product transaction 1018 (e.g., a ceiling fan purchase, a ceiling fan installation, a spa treatment, color-safe shampoo, or a combination thereof, etc.).

For example, an operation 5072 may include an operation 5076 of obtaining at least one value representing a likelihood of corroboration. For instance, at least one device 200 (e.g., a guarantor server device 1060, such as a portion of a server farm coupled to at least one telecommunications node operated by Sprint) may obtain (e.g., calculate, retrieve from memory, receive from a companion division—such as a subsidiary or parent company, determine using a statistical mechanism, or a combination thereof, etc.) at least one value 3014 (e.g., a number, a percentage, a correlation coefficient, a statistical numeral, a level such as high, a color code, a probability, a distance, a proximity indicator, or a combination thereof, etc.) representing (e.g., estimating, embodying, standing for, connoting, or a combination thereof, etc.) a likelihood (e.g., probability, relative indication, level of possibility, extent of reasonable expectation, correlation, result of a Bayesian mechanism, relative distance ring, position error range, or a combination thereof, etc.) of corroboration (e.g., supporting, matching, confirmation, expectation of existence, synchronization with, comportment, linkages between or among, or a combination thereof, etc.).

FIG. 5E illustrates a flow diagram 500E having any one or more of example operations 5080-5098. For example, an operation 404 may include an operation 5080 of comparing at least one activity indicium that is isolated from at least one wireless service data stream to at least one transaction characteristic corresponding to at least one product transaction. For instance, at least one device 200 (e.g., a guarantor server device 1060, such as a telecommunications gateway) may compare (e.g., determine differences, ascertain similarities, find one or more semantic correlations, apply a machine learning mechanism, identify correspondences or synonymous terms or concepts, ascertain a spatial distance or difference, or a combination thereof, etc.) at least one activity indicium 1090WS-AI (e.g., user interest based on intercepted text, interpersonal plans based on remote communication participant, intended destination based on navigation instructions, location based on interaction with a wireless node, path of travel based on series of wireless node interactions, or a combination thereof, etc.) that is isolated from (e.g., extracted from, identified using, intercepted from, sniffed from packets that are part of, derived using network elements facilitating, tapped as information for is transferred between or among two or more network nodes, acquired by interrogating a mobile app involved with, filtered out of log files of, or a combination thereof, etc.) at least one wireless service data stream 1090WS (e.g., one or more of bits, information, discrete or continuous or distributed events, packets, network telemetry, network operational data, or a combination thereof, etc. that is/are stored at a device or detected or obtained using at least a portion of at least one physical network that pertains to enabling wireless communication with cellular, satellite, Wi-Fi, WiMAX, microwave, short-range RF—such as Bluetooth or NFC or iBeacon, or some technology combination thereof, etc. via one or more of packet sniffing, network traffic analysis, a network-provider-specific application of a mobile device, a mobile device operating system communication, network-side monitoring of wireless signals, network data mining, a network element, an internet server, a gateway server, a base station, a Wi-Fi access point (AP), a telecommunications network server, a network switch, a network router, or a combination thereof, etc.) to at least one transaction characteristic 1026 (e.g., a product category such as Mediterranean restaurants, a product location such as within 3 miles of city center, a customer location, a vendor identifier such as Luigi's, a product beneficiary such as a recipient of a meal or massage, or a combination thereof, etc.) corresponding to at least one product transaction 1018 (e.g., a massage for "Helen Henderson" at 1320 Main St./Ste. 110C).

For example, an operation 404 may include an operation 5082 of proffering based at least partially on at least one wireless service data stream event. For instance, at least one device 200 (e.g., a guarantor server device 1060, such as a server farm performing telecommunications network management) may proffer (e.g., send electronically in response to a proffered guaranty transaction) based at least partially on (e.g., powered by corroborating indicia obtained from) at least one wireless service data stream event 1090WS-E (e.g., communicating with a cell tower, communicating wirelessly with a Wi-Fi access point, making a voice call, conducting a search, mapping a location with a wireless service provider app, sending a communication using telecommunications infrastructure with a browser or an app of a mobile device with the communication having data that is accessible to a wireless service provider or a propagating network node, visiting a physical location with a mobile device, downloading an app, using an app, taking a picture, sending a text via telecommunications infrastructure, navigating to a destination using a mobile device, communicating with a fixed node of a wireless network having a known location, or a combination thereof, etc.).

For example, an operation 5082 may include an operation 5084 of proffering based at least partially on at least one receipt of at least one satellite positioning system (SPS) coordinate corresponding to at least one mobile device. For instance, at least one device 200 (e.g., a guarantor server device 1060, such as a switching node of a telecommunications network) may proffer (e.g., post to a website accessible via at least one API) based at least partially on at least one receipt of (e.g., electronic reception of, processing for placement in a log file storing, sniffing of packet moving through network and containing, or a combination thereof, etc.) at least one satellite positioning system (SPS) coordinate 1090WS-E-SC (e.g., GPS value, coordinate from Galileo or GLONASS or Beidou satellite system, latitude or longitude representation of position acquired at least partially using at least one satellite, or a combination thereof, etc.) corresponding to (e.g., at least apparently representing at least an approximate position of) at least one mobile device 1004 (e.g., a smart phone).

For example, an operation 5082 may include an operation 5086 of proffering based at least partially on at least one propagation of at least one wireless signal acquired via at least one wireless access point (AP). For instance, at least one device 200 (e.g., a guarantor server device 1060, such as a virtualized server coupled to the internet) may proffer (e.g. email a code having at least one link) based at least partially on at least one propagation of (e.g., reception, transmission, forwarding, routing, signal demodulation, switching, carrying, or a combination thereof, etc. of a signal before, during, or after it is or becomes) at least one wireless signal 1110a (e.g., radio frequency (RF) electromagnetic radiation carrying data modulated thereon without a wired medium) acquired via (e.g., received using, obtained over an air interface with, routed from, or a combination thereof, etc.) at least one wireless access point (AP) 1090WS-E-AP (e.g., a Wi-Fi router, a device providing wireless network access—such as internet access—via IEEE 802.11, a machine that provides a Wi-Fi hotspot and that is managed by a telecom company such as AT&T, an example of a network element 1104 (e.g., of FIG. 1R), or a combination thereof, etc.).

For example, an operation 5082 may include an operation 5088 of proffering based at least partially on at least one propagation of at least one wireless signal acquired via at least one base station (BS). For instance, at least one device 200 (e.g., a guarantor server device 1060, such as a node supporting a communications backbone) may proffer (e.g., submit to an external site using an API exposed by the external site) based at least partially on at least one propagation of (e.g., reception, transmission, forwarding, routing, signal demodulation, switching, carrying, or a combination thereof, etc. of a signal before, during, or after it is or becomes) at least one wireless signal 1110b (e.g., radio frequency (RF) electromagnetic radiation carrying data modulated thereon over the air) acquired via (e.g., received using, obtained over an air interface with, routed from, or a combination thereof, etc.) at least one base station (BS) 1090WS-E-BS (e.g., a base transceiver station (BTS), a node B, a radio base station (RBS), an evolved node B (eNB), a machine that provides Long Term Evolution (LTE) cell coverage and that is managed by a telecom company such as Verizon, an example of a network element 1104 (e.g., of FIG. 1R), or a combination thereof, etc.).

For example, an operation 5082 may include an operation 5090 of proffering based at least partially on at least one handoff from one base station to another base station. For instance, at least one device 200 (e.g., a guarantor server device 1060, such as a base station controller (BSC)) may proffer (e.g., post to a guaranty transaction marketplace) based at least partially on at least one handoff 1090WS-E-HO (e.g., at least partially switching a call or other connection as a mobile device moves from one cell coverage area to another, full handoff, partial handoff, shifting at least some bandwidth of a wireless connection gradually from one BS to another BS, or a combination thereof, etc.) from one base station (BS) 1104-BS-1 to another base station (BS) 1104-BS-2 (e.g., a base transceiver station (BTS), a node B, a radio base station (RBS), an evolved node B (eNB), a machine that provides Long Term Evolution (LTE) cell coverage and that is managed by a telecom company such as Orange, or a combination thereof, etc.).

For example, an operation 5082 may include an operation 5092 of proffering based at least partially on at least one intercepted mobile device communication. For instance, at least one device 200 (e.g., a guarantor server device 1060, such as a media gateway (MGw)) may proffer (e.g., respond to a proffered guaranty transaction with at least one bid) based at least partially on at least one intercepted mobile device (MD) communication 1090WS-E-IC (e.g., a sniffed packet originating at a smart phone, a sniffed packet destined for a tablet computer, an unencrypted wireless communication having content that is inspected for semantic meaning—such as from a browser or email app, a text message that is analyzed, or a combination thereof, etc.).

For example, an operation 404 may include an operation 5094 of proffering based at least partially on at least two wireless service data stream events. For instance, at least one device 200 (e.g., a guarantor server device 1060, such as a portion of a server farm) may proffer (e.g., send an electronic description of a guaranty offer) based at least partially on at least two wireless service data stream events 1090WS-E (e.g., communicating with a cell tower, communicating wirelessly with a Wi-Fi access point, making a voice call, conducting a search, mapping a location with a wireless service provider app, sending a communication using telecommunications infrastructure with a browser or an app of a mobile device with the communication having data that is accessible to a wireless service provider or a propagating network node, visiting a physical location with a mobile device, downloading an app, using an app, taking a picture, sending a text via telecommunications infrastructure, navigating to a destination using a mobile device, communicating with a fixed node of a wireless network having a known location, or a combination thereof, etc.).

For example, an operation 5094 may include an operation 5096 of proffering based at least partially on at least two mutually-corroborative wireless service data stream events. For instance, at least one device 200 (e.g., a guarantor server device 1060, such as a gateway server) may proffer (e.g., communicate a description of a guaranty counter-offer) based at least partially on at least two mutually-corroborative 3016 (e.g., tending, likely, militating toward, or a combination thereof, etc. to being simultaneously, jointly, likewise, separately but also, or a combination thereof, etc. supportive of, matching with, confirming of, increasing a likelihood of, leading to expect existence of, synchronized with, linking to, or a combination thereof, etc. something, such as a transaction characteristic) wireless service data stream events 1090WS-E (e.g., a phone voice call with a person and ascertained geographic proximity to the person).

For example, an operation 5094 may include an operation 5098 of proffering based at least partially on at least one text message and at least one location indication. For instance, at least one device 200 (e.g., a guarantor server device 1060, such as an internet-facing server) may proffer (e.g., submit via at least one guaranty-specific API to a server associated with a proffered guaranty transaction) based at least partially on at least one text message 3018 (e.g., a Short Message Service (SMS) textual communication, a Multimedia Messaging Service (MMS) communication including at least one image, a short text communication transmitted or received using telecommunications signaling bandwidth resources, or a combination thereof, etc.) and at least one location indication 3020 (e.g., one or more SPS coordinates, a Service Set Identification (SSID), a wireless network name, a base station identification, coordinates of a base station, an address, a city, an approximate position, a range or radius to a network element, an area corresponding to a trilateration operation, or a combination thereof, etc.).

Figure 5F:
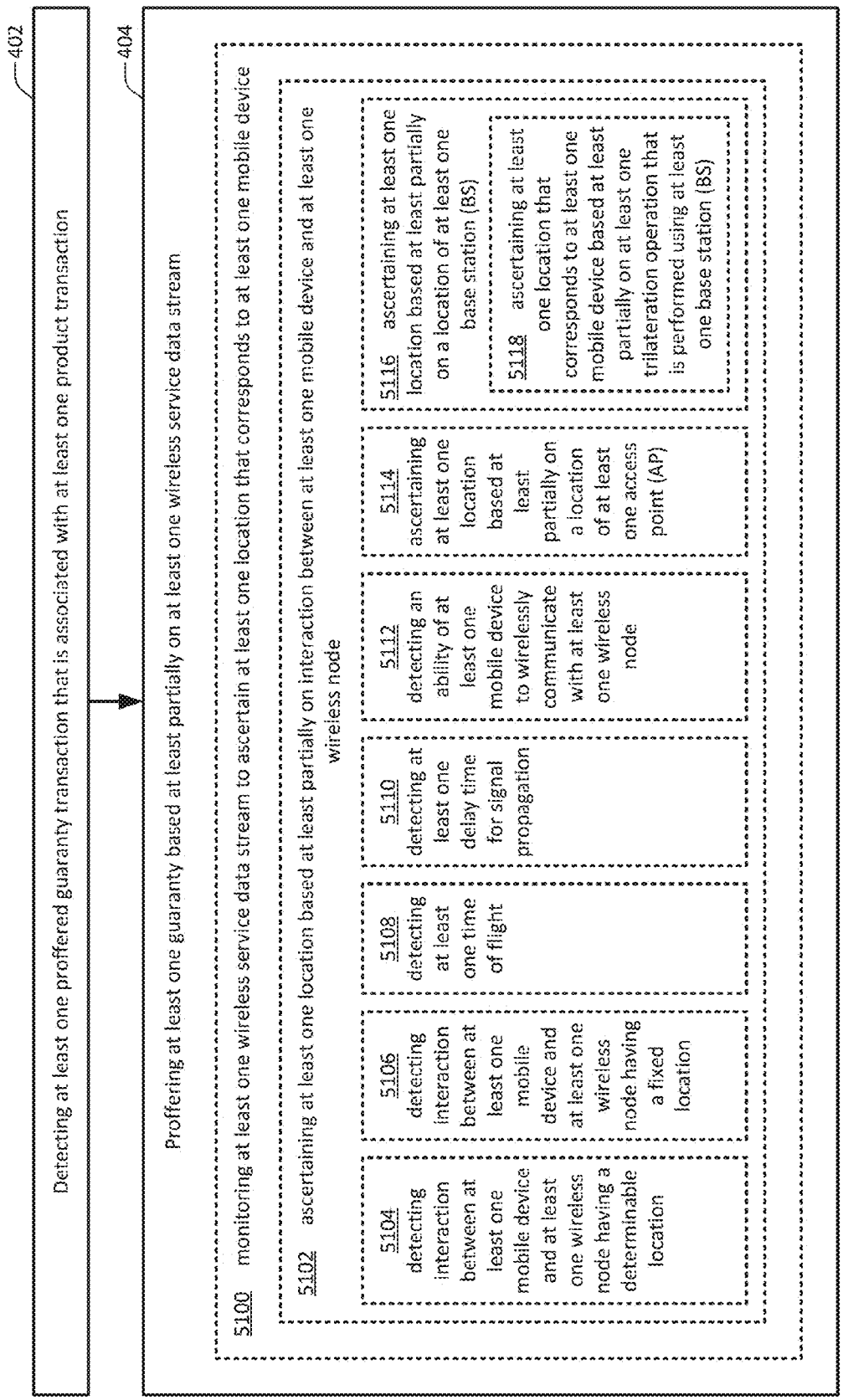

FIG. 5F illustrates a flow diagram 500F having any one or more of example operations 5100-5118. For example, an operation 404 may include an operation 5100 of monitoring at least one wireless service data stream to ascertain at least one location that corresponds to at least one mobile device. For instance, at least one device 200 (e.g., a guarantor server device 1060, such as a server rack operated by Verizon) may monitor (e.g., observe, tap, divert, access data at a mobile device, route a copy of data from another server, request an application at a mobile device to forward, filter, analyze for semantic meaning, retrieve from another server location, interrogate an operating system of a mobile device, receive from a network element—such as a base station (BS) or mobile switching center (MSC), extract service data from a log file, or a combination thereof, etc.) at least one wireless service data stream 1090WS (e.g., one or more of bits, information, discrete or continuous or distributed events, packets, network telemetry, network operational data, or a combination thereof, etc. that is/are stored at a device or detected or obtained using at least a portion of at least one physical network that pertains to enabling wireless communication with cellular, satellite, Wi-Fi, WiMAX, microwave, short-range RF—such as Bluetooth or NFC or iBeacon, or some technology combination thereof, etc. via one or more of packet sniffing, network traffic analysis, a network-provider-specific application of a mobile device, a mobile device operating system communication, network-side monitoring of wireless signals, network data mining, a network element, an internet server, a gateway server, a base station, a Wi-Fi access point (AP), a telecommunications network server, a network switch, a network router, or a combination thereof, etc.) to ascertain (e.g., divine, determine via semantic analysis, discern through comparison, detect, distinguish, identify via a learned machine, calculate from data, compute via look-up table, or a combination thereof, etc.) at least one location 3022 (e.g., one or more satellite positioning system (SPS) coordinates, an address, a neighborhood, a business name, a city, an approximate position, a range to or radius with respect to a network element, an area corresponding to a trilateration operation, a network element identification associated with a determinable position, a latitude value, a longitude value, or a combination thereof, etc.) that corresponds to (e.g., that is representative of, that reflects, that at least approximately connotes a position of, or a combination thereof, etc.) at least one mobile device 1004 (e.g., a smart phone, a tablet computer, a laptop or notebook computer, a smart watch, intelligent glasses, or a combination thereof, etc.).

For example, an operation 5100 may include an operation 5102 of ascertaining at least one location based at least partially on interaction between at least one mobile device and at least one wireless node. For instance, at least one device 200 (e.g., a guarantor server device 1060, such as a distributed computing system) may ascertain (e.g., divine, determine via semantic analysis, discern through comparison, detect, distinguish, identify via a learned machine, calculate from data, compute via look-up table, or a combination thereof, etc.) at least one location 3022 (e.g., at least an approximate position, a geographic region, one or more coordinates, or a combination thereof, etc.) based at least partially on (e.g., at least partly responsive to, enabled by, using information derived from, powered by data obtained from, supported by, induced by events extracted from, or a combination thereof, etc.) interaction 3024 between (e.g., transmitting a signal between, receiving a signal between, exchanging a signal between, performing a distance ranging operation between, handing off to, handing off from, registering with, registering through, requesting a channel, being assigned a cell or associated base station, detecting a signal or identity indicator emanating from, reporting a signal received from, joining a network provided by one of, or a combination thereof, etc.) at least one mobile device 1004 (e.g., a convertible tablet-laptop computer with a 4G radio) and at least one wireless node 1104WN (e.g., e.g., a Wi-Fi router, a device providing wireless network access—such as Internet access—via IEEE 802.11, a machine that provides a Wi-Fi hotspot and that is managed by a telecom company such as AT&T, a base transceiver station (BTS), a node B, a radio base station (RBS), an evolved node B (eNB), a machine that provides Long Term Evolution (LTE) cell coverage and that is managed by a telecom company such as Verizon, an example of a network element 1104 (e.g., of FIG. 1R) that is capable of transmitting or receiving radio frequency (RF) signals, a device that has a wireless-signal-capable antenna or radio and that is coupled to and provides access to a wired network—such as a cellular data network, or a combination thereof, etc.).

For example, an operation 5102 may include an operation 5104 of detecting interaction between at least one mobile device and at least one wireless node having a determinable location. For instance, at least one device 200 (e.g., a guarantor server device 1060, such as a media gateway linking a telecommunications network and the internet) may detect (e.g., receive information about a received signal that has been frequency down-converted at a base station and pertains to) interaction 3024 (e.g., an exchange of at least one wireless signal) between at least one mobile device 1004 (e.g., a smart phone) and at least one wireless node 1104WN (e.g., a cellular base station) having a determinable (e.g., capable of being acquired, known, retrievable from a look-up table or database, able to be acquired through inquiry with another entity or with an internet search, or a combination thereof, etc.) location 3026 (e.g., one or more SPS coordinates, an address, a neighborhood, a city, an approximate position, a code indicating a geographical position of a network element, a distance to a landmark or waypoint or address, a latitude value, a longitude value, or a combination thereof, etc.).

For example, an operation 5102 may include an operation 5106 of detecting interaction between at least one mobile device and at least one wireless node having a fixed location. For instance, at least one device 200 (e.g., a guarantor server device 1060, such as a portion of a cloud computing resource) may detect (e.g., receive notice of) interaction 3024 (e.g., transmitting data) between at least one mobile device 1004 (e.g., a smart watch) and at least one wireless node 1104WN (e.g., an enhanced Node B) having a fixed (e.g., non-mobile, secured to a building or ground, stationary, installed for an indefinite period of time, or a combination thereof, etc.) location 3026 (e.g., one or more SPS coordinates, an address, a neighborhood, a city, an approximate position, a code indicating a geographical position of a network element, a distance to a landmark or waypoint or address, a latitude value, a longitude value, or a combination thereof, etc.).

For example, an operation 5102 may include an operation 5108 of detecting at least one time of flight. For instance, at least one device 200 (e.g., a guarantor server device 1060, such as a mobile switching center (MSC)) may detect (e.g., calculate, observe, receive from a base station, or a combination thereof, etc.) at least one time of flight 3028 (e.g., duration between transmission and reception, time for a signal to propagate from one device to another, length of period from signal emanation to signal collection, or a combination thereof, etc.).

For example, an operation 5102 may include an operation 5110 of detecting at least one delay time for signal propagation. For instance, at least one device 200 (e.g., a guarantor server device 1060, such as a billing or management server of Sprint) may detect (e.g., compute from two time stamps, receive from a home location register (HLR), coordinate with a base transceiver station (BTS) to determine, or a combination thereof, etc.) at least one delay time 3030 (e.g., difference between time of departure and time of arrival, a number of milliseconds a communication is shifted in time due to travel duration, time that elapses while an electromagnetic wave travels through a medium such as air, or a combination thereof, etc.) for signal propagation (e.g., radio frequency (RF) signal traveling from one device to another, electromagnetic (EM) wave moving through a medium such as air, communicating data from one antenna to another antenna over the air, or a combination thereof, etc.).

For example, an operation 5102 may include an operation 5112 of detecting an ability of at least one mobile device to wirelessly communicate with at least one wireless node. For instance, at least one device 200 (e.g., a guarantor server device 1060, such as a distributed server configured for interoperability with a guaranty transaction marketplace) may detect (e.g., receive a report from a mobile device about, receive a report from a wireless node operator about, ask a mobile device to determine and list those wireless nodes about which there is, or a combination thereof, etc.) an ability (e.g., capability to receive a signal from or transmit a signal to, receipt of a confirmation or acknowledgment to a transmitted signal or inquiry, successful detection of a broadcast identifier—such as a base station identity code (BSIC) or a service set identifier (SSID)) of at least one mobile device 1004 (e.g., an Apple iPad) to wirelessly communicate (e.g., transfer data over the air, exchange radio frequency (RF) signals via antenna, send or receive an EM wave modulated with data, or a combination thereof, etc.) with at least one wireless node 1104WN (e.g., hardware providing cellular coverage in at least one segment of a cell).

For example, an operation 5102 may include an operation 5114 of ascertaining at least one location based at least partially on a location of at least one access point (AP). For instance, at least one device 200 (e.g., a guarantor server device 1060, such as a rack of servers accessible via the World Wide Web (WWW)) may ascertain (e.g., compute via look-up table) at least one location 3022 (e.g., an approximate position of smart glasses with respect to or a range around an address) based at least partially on a location 3026 (e.g., an address) of at least one access point (AP) 1104WN-AP (e.g., a Wi-Fi router, a device providing wireless network access—such as internet access—via IEEE 802.11, a machine that provides a Wi-Fi hotspot and that is managed by a telecom company such as T-Mobile, an example of a network element 1104 (e.g., of FIG. 1R), or a combination thereof, etc.).

For example, an operation 5102 may include an operation 5116 of ascertaining at least one location based at least partially on a location of at least one base station (BS). For instance, at least one device 200 (e.g., a guarantor server device 1060, such as hardware associated with a telecommunications switch) may ascertain (e.g., calculate from data) at least one location 3022 (e.g., a range to a tablet computer or radius within which a tablet computer resides with respect to a network element) based at least partially on a location 3026 (e.g., one or more satellite positioning system (SPS) coordinates) of at least one base station (BS) 1104WN-BS (e.g., a base transceiver station (BTS), a node B, a radio base station (RBS), an evolved node B (eNB), a machine that provides Long Term Evolution (LTE) cell coverage and that is managed by a telecom company such as Sprint, an example of a network element 1104 (e.g., of FIG. 1R), or a combination thereof, etc.).

For example, an operation 5116 may include an operation 5118 of ascertaining at least one location that corresponds to at least one mobile device based at least partially on at least one trilateration operation that is performed using at least one base station (BS). For instance, at least one device 200 (e.g., a guarantor server device 1060, such as a virtualized server that is capable of communicating with the internet and one or more telecommunications network nodes) may ascertain (e.g., receive from a telecommunications nodes, such as a home location register (HLR)) at least one location 3022 (e.g., a latitude coordinate or a longitude coordinate) that corresponds to (e.g., that represents a geospatial position of) at least one mobile device 1004 (e.g., a smart phone) based at least partially on at least one trilateration operation 3032 (e.g., determining a relative location using three points, determining an absolute location using at least three circles, finding an intersecting area of two or more circles, or a combination thereof, etc.) that is performed using at least one base station (BS) 1104WN-BS (e.g., an antenna and associated receiver chain and baseband processing hardware for a node B of a cellular network).

FIG. 5G illustrates a flow diagram 500G having any one or more of example operations 5120-5130 (plus operation 5100). For example, an operation 5100 may include an operation 5120 of ascertaining at least one path of travel that corresponds to at least one mobile device. For instance, at least one device 200 (e.g., a guarantor server device 1060, such as a server built from commodity hardware) may ascertain (e.g., divine, discern through comparison, detect, distinguish, identify via a learned machine, calculate from data, compute via look-up table, receive from another machine or entity, coordinate to or with geographical data, or a combination thereof, etc.) at least one path (e.g., two or more points or locations, a length of distance, a straight or curved line, or a combination thereof, etc.) of travel 3034 (e.g., movement, velocity, spatial translocation, or a combination thereof, etc.) that corresponds to at least one mobile device 1004 (e.g., mobile phone).

For example, an operation 5120 may include an operation 5122 of ascertaining at least two locations that correspond to at least one mobile device. For instance, at least one device 200 (e.g., a guarantor server device 1060, such as a server associated with a home location register (HLR)) may ascertain (e.g., receive from a base station controller (BSC) or other network element) at least two locations 3022 (e.g., one or more satellite positioning system (SPS) coordinates, an address, a neighborhood, a business name, a city, an approximate position, a range to or radius with respect to a network element, an area corresponding to a trilateration operation, a network element identification—such as a base station identity code (BSIC) or a service set identifier (SSID)—associated with a determinable position, a latitude value, a longitude value, or a combination thereof, etc.) that correspond to at least one mobile device 1004 (e.g., a Nexus table computer).

For example, an operation 5122 may include an operation 5124 of associating at least one time stamp to a location that corresponds to at least one mobile device. For instance, at least one device 200 (e.g., a guarantor server device 1060, such as a portion of a server farm) may associate (e.g., link, store together, note or recognize a correspondence between/among, or a combination thereof, etc.) at least one time stamp 3036 (e.g., a time at which something occurs, a GMT value, code or characters indicating when something happened, or a combination thereof, etc.) to a location 3022 (e.g., a designated geospatial location of a cell tower) that corresponds to at least one mobile device 1004 (e.g., a navigation device attached to or incorporated into a vehicle).

For example, an operation 5120 may include an operation 5126 of ascertaining at least one rate of travel that corresponds to at least one mobile device. For instance, at least one device 200 (e.g., a guarantor server device 1060, such as hardware providing media gateway functionality for a telecommunications network) may ascertain (e.g., calculate from positional data) at least one rate of travel 3038 (e.g., speed, velocity, change in position with respect to time, how quickly a device moves between at least two points of a determinable distance apart, or a combination thereof, etc.) that corresponds to at least one mobile device 1004 (e.g., a phablet).

For example, an operation 5120 may include an operation 5128 of identifying at least one place that is associated with at least one mobile device along at least one path of travel that corresponds to the at least one mobile device. For instance, at least one device 200 (e.g., a guarantor server device 1060, such as a server farm providing web-connected services to telecommunications customers) may identify (e.g., recognize, discover, notice, detect, label, or a combination thereof, etc.) at least one place 3040 (e.g., address, home, office, place of work, frequently-visited establishment or house, or a combination thereof, etc.) that is associated with at least one mobile device 1004 (e.g., John's Apple iPhone) along (e.g., at origin of, at termination of, in middle of, that is part of a stop or cessation of motion during, or a combination thereof, etc.) at least one path of travel 3034 (e.g., journey from John's house in City 'A' to mall in City 'B' of his mother's house) that corresponds to at least one mobile device 1004 (e.g., John's Apple iPhone).

For example, an operation 5120 may include an operation 5130 of comparing at least one path of travel that corresponds to at least one mobile device to one or more historical paths of travel. For instance, at least one device 200 (e.g., a guarantor server device 1060, such as a server rack dedicated to guaranty transaction handling) may compare (e.g., determine differences, determine similarities, calculate a value representing a likelihood of substantial equivalence, check endpoints, identify overlapping segments, or a combination thereof, etc.) at least one path of travel 3034 (e.g., a trip from Point 'A' to Point 'B' that includes a car drive and a light rail ride) that corresponds to at least one mobile device 1004 (e.g., Sally's Samsung Galaxy smart phone) to one or more historical (e.g., recurring, daily, repeated, previously occurred, recorded past movement events, or a combination thereof, etc.) paths of travel 3034 (e.g., a daily weekday commute from home to work that includes a car drive and a light rail ride for Sally's Samsung Galaxy smart phone).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to a human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats-tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en [dot] wikipedia [dot] org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en [dot] wikipedia [dot] org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en [dot] wikipedia [dot] org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en [dot] wikipedia [dot] org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en [dot] wikipedia [dot] org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood, with the apparatus powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, Verizon, AT&T, etc.), or (g) a wired/wireless services entity (e.g., Sprint, AT&T, Verizon, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user/customer 1002, a merchant/vendor 1012, a financier 1034, a guarantor 1062, a market maker 1058, a data provider 1102, or a combined funding source and wireless service provider 1108 may be shown/described herein as a single illustrated figure of a person or building, those skilled in the art will appreciate that a user/customer 1002, a merchant/vendor 1012, a financier 1034, a guarantor 1062, a market maker 1058, a data provider 1102, or a combined funding source and wireless service provider 1108 may be representative of a human user, a robotic user (e.g., computational entity), a legal entity, and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   detecting at least one location of at least one proffered guaranty transaction that is associated with at least one product transaction;
   monitoring at least one wireless service data stream to ascertain at least one location that corresponds to at least one mobile device associated with at least one party to the at least one product transaction, the circuitry for monitoring including at least circuitry for analyzing at least one image captured via the at least one mobile device associated with the at least one party to the at least one product transaction, the analyzing including at least:
      determining, via facial recognition, whether the at least one image includes the at least one party;
      detecting at least some location data associated with the at least one image; and
      determining whether the at least one image corroborates the at least one location of the at least one product transaction based at least partially on the determining whether the at least one image includes the at least one party and based at least partially on the detected at least some location data associated with the at least one image; and
   proffering at least one guaranty based at least partially on the at least one location ascertained from the at least one wireless service data stream and based at least partially on the determination that the at least one image corroborates the at least one location of the at least one product transaction,
   wherein at least one of the detecting at least one proffered guaranty transaction or the proffering at least one guaranty is at least partially implemented using one or more processors.

2. A system comprising:
   circuitry for detecting at least one location of at least one proffered guaranty transaction that is associated with at least one product transaction;
   circuitry for monitoring at least one wireless service data stream to ascertain at least one location that corresponds to at least one mobile device associated with at least one party to the at least one product transaction, the circuitry for monitoring including at least circuitry for analyzing at least one image captured via the at least one mobile device associated with the at least one party to the at least one product transaction, the analyzing including at least:
      circuitry for determining, via facial recognition, whether the at least one image includes the at least one party;
      circuitry for detecting at least some location data associated with the at least one image; and
      circuitry for determining whether the at least one image corroborates the at least one location of the at least one product transaction based at least partially on the determining whether the at least one image includes the at least one party and based at least partially on the detecting at least some location data associated with the at least one image; and
   circuitry for proffering at least one guaranty based at least partially on the at least one location ascertained from the at least one wireless service data stream and based at least partially on the determination that the at least one image corroborates the at least one location of the at least one product transaction.

3. The system of claim 2, wherein the circuitry for detecting at least one proffered guaranty transaction that is associated with at least one product transaction comprises:
   circuitry for detecting at least one proffered guaranty transaction via at least one application programming interface (API) exposed by at least one wireless service provider.

4. The system of claim 2, wherein the circuitry for detecting at least one proffered guaranty transaction that is associated with at least one product transaction comprises:
   circuitry for detecting at least one opportunity to attempt to form a guaranty transaction.

5. The system of claim 4, wherein the circuitry for detecting at least one opportunity to attempt to form a guaranty transaction comprises:
   circuitry for detecting at least one request for one or more bids to at least partially guarantee payment with respect to at least one product transaction.

6. The system of claim 2, wherein the circuitry for detecting at least one proffered guaranty transaction that is associated with at least one product transaction comprises:
   circuitry for retrieving at least one indication that at least references the at least one proffered guaranty transaction.

7. The system of claim 2, wherein the circuitry for detecting at least one proffered guaranty transaction that is associated with at least one product transaction comprises:
   circuitry for detecting one or more transaction characteristics corresponding to at least one product transaction.

8. The system of claim 7, wherein the circuitry for detecting one or more transaction characteristics corresponding to at least one product transaction comprises:
   circuitry for detecting at least one of a party identifier or a product identification.

9. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering at least one assurance that at least one entity affiliated with at least one product transaction is to be compensated.

10. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering at least one indication of at least one of disagreement handling or repudiation handling.

11. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering at least one indication of contingency.

12. The system of claim 11, wherein the circuitry for proffering at least one indication of contingency comprises:
   circuitry for proffering at least one indication that an obligation of at least one guaranty is contingent on production of evidence of falsification with respect to at least one transaction characteristic corresponding to at least one product transaction.

13. The system of claim 12, wherein the circuitry for proffering at least one indication that an obligation of at least one guaranty is contingent on production of evidence of falsification with respect to at least one transaction characteristic corresponding to at least one product transaction comprises:
   circuitry for proffering at least one indication that payment is conditional on evidence that an actual location of a customer is different from a purported location of the customer.

14. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for analyzing one or more wireless service data stream events that relate along at least one dimension to at least one product transaction.

15. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for ascertaining if at least one wireless service data stream event corroborates at least one transaction characteristic.

16. The system of claim 15, wherein the circuitry for ascertaining if at least one wireless service data stream event corroborates at least one transaction characteristic comprises:
   circuitry for determining if at least some extracted text comports with at least one product category of a product corresponding to at least one product transaction.

17. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering based at least partially on at least one receipt of at least one satellite positioning system (SPS) coordinate corresponding to at least one mobile device.

18. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering based at least partially on at least one propagation of at least one wireless signal acquired via at least one wireless access point (AP).

19. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering based at least partially on at least one propagation of at least one wireless signal acquired via at least one base station (BS).

20. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering based at least partially on at least one handoff from one base station to another base station.

21. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering based at least partially on at least one intercepted mobile device communication.

22. The system of claim 2, wherein the circuitry for proffering at least one guaranty based at least partially on the at least one location ascertained from the at least one wireless service data stream and based at least partially on the determination that the at least one image corroborates the at least one location of the at least one product transaction comprises:
   circuitry for proffering based at least partially on at least two wireless service data stream events.

23. The system of claim 22, wherein the circuitry for proffering based at least partially on at least two wireless service data stream events comprises:
   circuitry for proffering based at least partially on at least one text message and at least one location indication.

24. The system of claim 2, wherein the circuitry for monitoring at least one wireless service data stream to ascertain at least one location that corresponds to at least one mobile device associated with at least one party to the at least one product transaction comprises:
   circuitry for detecting at least one time of flight.

25. The system of claim 2, wherein the circuitry for monitoring at least one wireless service data stream to ascertain at least one location that corresponds to at least one mobile device associated with at least one party to the at least one product transaction comprises:
 circuitry for detecting at least one delay time for signal propagation.

26. The system of claim 2, wherein the circuitry for monitoring at least one wireless service data stream to ascertain at least one location that corresponds to at least one mobile device associated with at least one party to the at least one product transaction comprises:
 circuitry for detecting an ability of at least one mobile device to wirelessly communicate with at least one wireless node.

27. The system of claim 2, wherein the circuitry for monitoring at least one wireless service data stream to ascertain at least one location that corresponds to at least one mobile device associated with at least one party to the at least one product transaction comprises:
 circuitry for ascertaining at least one location based at least partially on a location of at least one access point (AP).

28. The system of claim 2, wherein the circuitry for monitoring at least one wireless service data stream to ascertain at least one location that corresponds to at least one mobile device associated with at least one party to the at least one product transaction comprises:
 circuitry for ascertaining at least one location based at least partially on a location of at least one base station (BS); and
 circuitry for detecting that the at least one mobile device has connected to the at least one base station.

29. The system of claim 2, wherein the circuitry for monitoring at least one wireless service data stream to ascertain at least one location that corresponds to at least one mobile device associated with at least one party to the at least one product transaction comprises:
 circuitry for ascertaining at least one path of travel that corresponds to at least one mobile device.

30. The system of claim 29, wherein the circuitry for ascertaining at least one path of travel that corresponds to at least one mobile device comprises:
 circuitry for ascertaining at least two locations that correspond to at least one mobile device.

31. The system of claim 29, wherein the circuitry for ascertaining at least one path of travel that corresponds to at least one mobile device comprises:
 circuitry for ascertaining at least one rate of travel that corresponds to at least one mobile device.

32. The system of claim 29, wherein the circuitry for ascertaining at least one path of travel that corresponds to at least one mobile device comprises:
 circuitry for identifying at least one place that is associated with at least one mobile device along at least one path of travel that corresponds to the at least one mobile device.

33. The system of claim 29, wherein the circuitry for ascertaining at least one path of travel that corresponds to at least one mobile device comprises:
 circuitry for comparing at least one path of travel that corresponds to at least one mobile device to one or more historical paths of travel.

34. The system of claim 2, wherein the circuitry for detecting at least one location of at least one proffered guaranty transaction that is associated with at least one product transaction at least one product transaction comprises:
 circuitry for detecting interaction between the at least one mobile device and at least one wireless node having a fixed location.

35. The system of claim 2, wherein the circuitry for detecting at least one location of at least one proffered guaranty transaction that is associated with at least one product transaction at least one product transaction comprises:
 circuitry for detecting at least one product location within a defined proximity to at least one network element.

36. The system of claim 2, wherein the circuitry for proffering at least one guaranty based at least partially on the at least one location ascertained from the at least one wireless service data stream comprises:
 circuitry for proffering based at least partially on an indication that the at least one image corroborates the at least one location of the at least one product transaction.

37. The system of claim 2, wherein the circuitry for detecting at least one location of at least one proffered guaranty transaction that is associated with at least one product transaction at least one product transaction comprises:
 circuitry for determining that the at least one mobile device is within communication range of at least one wireless node having a determinable location at the time the at least one product transaction is initiated.

38. The system of claim 2, wherein the circuitry for monitoring at least one wireless service data stream to ascertain at least one location that corresponds to at least one mobile device associated with at least one party to the at least one product transaction, the circuitry for monitoring including at least circuitry for analyzing at least one image captured via the at least one mobile device associated with the at least one party to the at least one product transaction comprises:
 circuitry for detecting that at least one party to the at least one product transaction has made at least one post on at least one social media account associated with the at least one party;
 circuitry for determining, via facial recognition, whether the at least one image includes the at least one party;
 circuitry for determining whether the social media account associated with the at least one party was accessed via the at least one mobile device associated with the at least one party;
 circuitry for determining, via at least some location data obtained from the at least one mobile device, at least one location associated with the at least one social media post; and
 circuitry for proffering the at least one guaranty based at least partially on a determination that the at least one social media post corroborates the at least one location of the at least one product transaction.

39. The system of claim 2, wherein the circuitry for detecting at least one location of at least one proffered guaranty transaction that is associated with at least one product transaction comprises:
 circuitry for detecting that at least one product transaction has been initiated in at least one location,
 wherein the circuitry for monitoring at least one wireless service data stream to ascertain at least one location that corresponds to at least one mobile device associated with at least one party to the at least one product transaction, the circuitry for monitoring including at least circuitry for analyzing at least one image captured via the at least one mobile device associated with the at least one party to the at least one product transaction includes at least:
    circuitry for determining whether the at least one location of the initiated at least one product transaction is inconsistent with historical location data of the at least one mobile device associated with the at least one party to the at least one product transaction; and
    circuitry for prompting the at least one party to capture at least one image of the at least one party based at least partially on the determining whether the at least one location of the initiated at least one product transaction is inconsistent with historical location data of the at least one mobile device associated with the at least one party to the at least one product transaction.

40. The system of claim 2, wherein the circuitry for monitoring at least one wireless service data stream to ascertain at least one location that corresponds to at least one mobile device associated with at least one party to the at least one product transaction, the circuitry for monitoring including at least circuitry for analyzing at least one image captured via the at least one mobile device associated with the at least one party to the at least one product transaction comprises:
    circuitry configured for accessing at least one image stored on the at least one mobile device.

41. The system of claim 2, wherein the circuitry for monitoring at least one wireless service data stream to ascertain at least one location that corresponds to at least one mobile device associated with at least one party to the at least one product transaction, the circuitry for monitoring including at least circuitry for analyzing at least one image captured via the at least one mobile device associated with the at least one party to the at least one product transaction comprises:
    circuitry configured for determining whether at least one time of capture associated with the at least one image corroborates at least one time associated with the at least one product transaction.

42. The system of claim 2, wherein the circuitry for monitoring at least one wireless service data stream to ascertain at least one location that corresponds to at least one mobile device associated with at least one party to the at least one product transaction, the circuitry for monitoring including at least circuitry for analyzing at least one image captured via the at least one mobile device associated with the at least one party to the at least one product transaction comprises:
    circuitry configured for accessing at least one image uploaded to at least one social media account associated with the at least one party; and
    circuitry configured for determining whether the at least one image uploaded to the at least one social media account was uploaded via the at least one mobile device.

43. A system, comprising:
    a computing device; and
    instructions that, when executed on the computing device, cause the computing device to:
        detect at least one location of at least one proffered guaranty transaction that is associated with at least one product transaction;
        monitor at least one wireless service data stream to ascertain at least one location that corresponds to at least one mobile device associated with at least one party to the at least one product transaction, the instructions to monitor including at least instructions to analyze at least one image captured via the at least one mobile device associated with the at least one party to the at least one product transaction, the instructions to analyze including instructions to at least:
            determine, via facial recognition, whether the at least one image includes the at least one party;
            detect at least some location data associated with the at least one image; and
            determine whether the at least one image corroborates the at least one location of the at least one product transaction based at least partially on the determination whether the at least one image includes the at least one party and based at least partially on the detected at least some location data associated with the at least one image; and
        proffer at least one guaranty based at least partially on the at least one location ascertained from the at least one wireless service data stream and based at least partially on the determination that the at least one image corroborates the at least one location of the at least one product transaction.

\* \* \* \* \*